US006415004B1

(12) United States Patent
Fujimura et al.

(10) Patent No.: US 6,415,004 B1
(45) Date of Patent: Jul. 2, 2002

(54) PHASE DETECTOR, TIMING RECOVERY DEVICE USING THE SAME, AND A DEMODULATOR USING THE TIMING RECOVERY DEVICE

(75) Inventors: Akinori Fujimura; Toshiharu Kojima, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/364,041

(22) Filed: Jul. 30, 1999

(30) Foreign Application Priority Data

Jun. 4, 1999 (JP) .................... PCT/JP99/02993

(51) Int. Cl.[7] .............................. H04L 27/14
(52) U.S. Cl. ................. 375/324; 375/326; 375/327; 375/329; 375/355; 375/373; 375/375; 375/376; 329/307; 329/346; 329/306
(58) Field of Search ................ 375/324, 326, 375/327, 329, 355, 371, 373, 375, 376; 329/304, 307, 306, 346; 370/516, 518

(56) References Cited

U.S. PATENT DOCUMENTS

| | | | | |
|---|---|---|---|---|
| 5,179,907 A | * | 1/1993 | Galbraith | 116/173 |
| 5,235,622 A | * | 8/1993 | Yoshida | 329/306 |
| 5,671,257 A | * | 9/1997 | Cochran et al. | 327/141 |
| 5,905,767 A | * | 5/1999 | Fujimura | 375/355 |
| 6,104,762 A | * | 8/2000 | Fujimura | 375/324 |

FOREIGN PATENT DOCUMENTS

| | | |
|---|---|---|
| JP | 6252969 | 9/1994 |
| JP | 6261088 | 9/1994 |

OTHER PUBLICATIONS

Fujimura, A., et al., "Timing Recovery Scheme Using Received Signal Phase Information for QPSK Modulation", Proceedings of Electronic Information Communication Association, vol. J81–B–II, No. 6, Jun. 1998, pp. 665–668.

* cited by examiner

Primary Examiner—Don N. Vo
Assistant Examiner—Khanh Cong Tran
(74) Attorney, Agent, or Firm—Rothwell, Figg, Ernst & Manbeck

(57) ABSTRACT

In the present invention, the amplitude subtracting type of phase detector of the timing recovery section outputs a difference $\gamma_i$ of a synthesized amplitude deviation at ½ of a symbol time. The averaging section computes an average value of this difference $\gamma_i$ and outputs a phase control signal $V_i$ corresponding to the average value to the phase controller. The phase controller controls a timing phase of the sampling clock according to this phase control signal $V_i$. Dichotomizer generates a recovered symbol clock by dichotomizing the sampling clock that has been timing phase controlled. Removal of DC offset from and demodulation of the sampled baseband signal is executed in parallel to the above processing using the recovered symbol clock with the Nyquist data extracting section, the offset detector, the offset correcting section, and the data determining section.

17 Claims, 28 Drawing Sheets

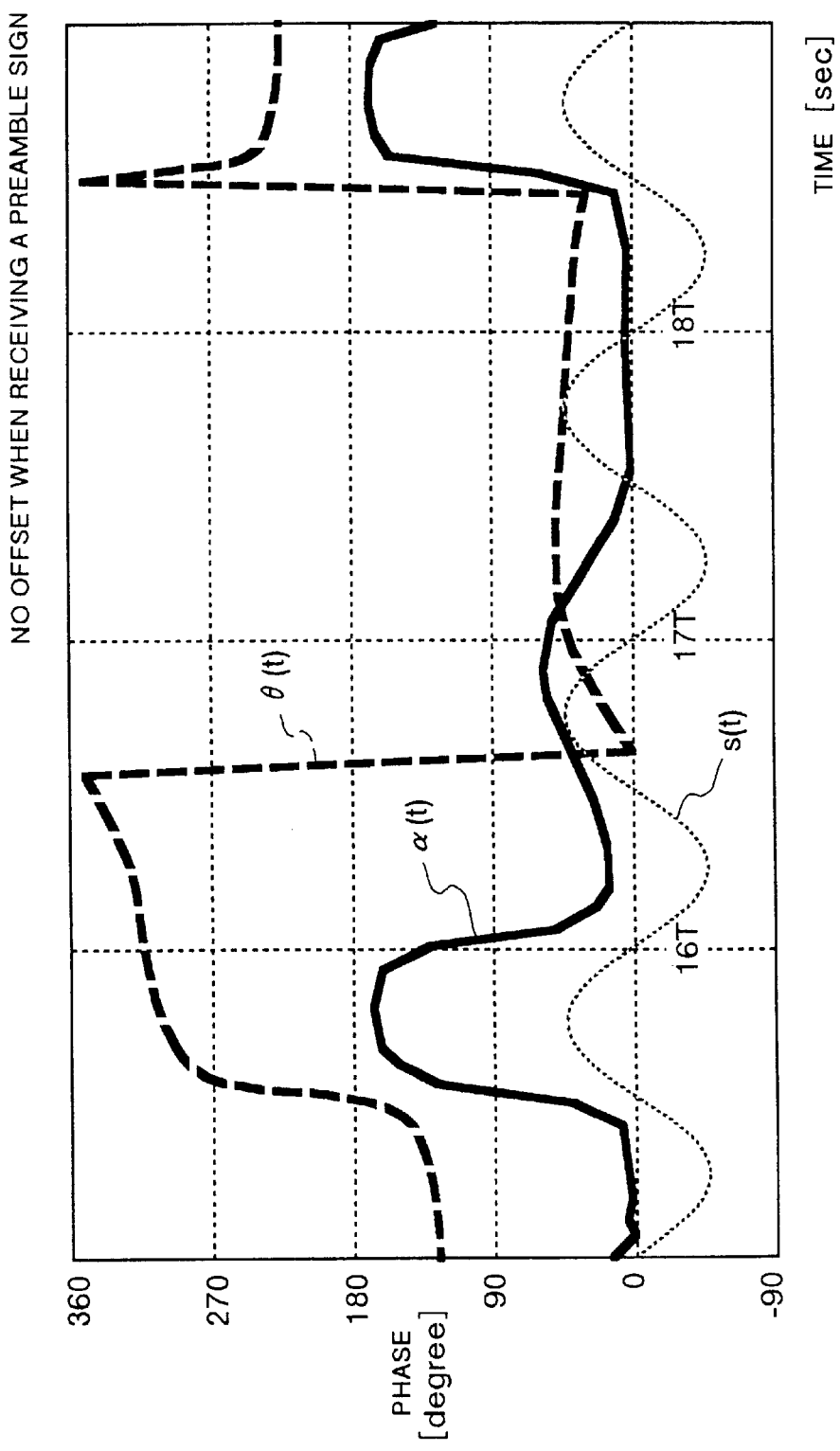

WHEN DC OFFSET IS ABSENT

WHEN DC OFFSET IS PRESENT

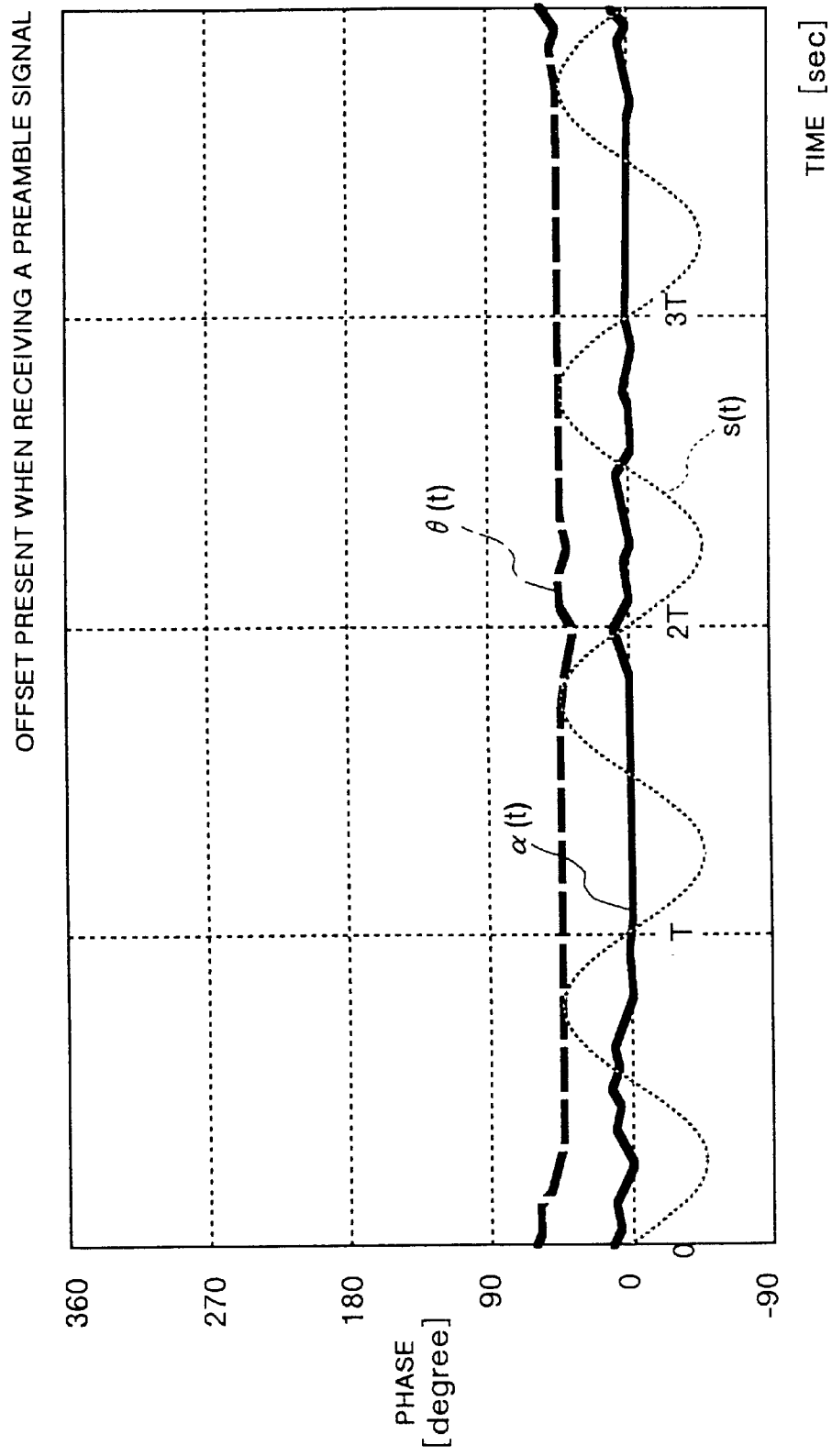

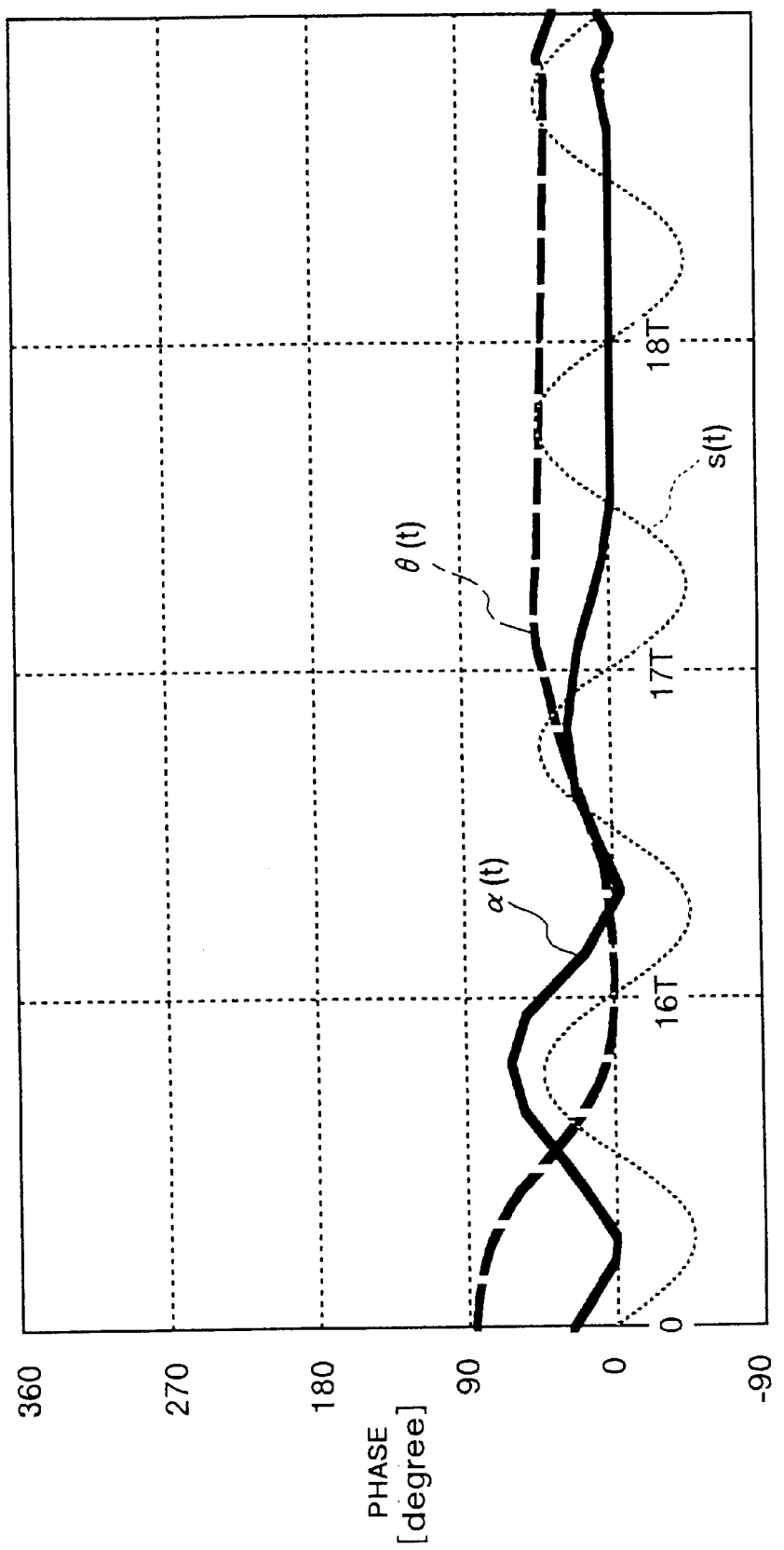
FIG.28 OFFSET PRESENT WHEN RECEIVING A RANDAM PATTERN

PHASE DETECTOR, TIMING RECOVERY DEVICE USING THE SAME, AND A DEMODULATOR USING THE TIMING RECOVERY DEVICE

FIELD OF THE INVENTION

The present invention relates to a phase detector used for various types of digital Communications such as satellite communications or mobile communications and capable of realizing rapid timing phase synchronization within a preamble and low phase-timing jitter in a data section and also capable of promoting reduction of a size and a weight of a device. This invention also relates to a timing recovery device which uses the phase detector, and a demodulator which uses the timing recovery device.

BACKGROUND OF THE INVENTION

As a timing recovery device in a demodulator for digital radio communications based on the conventional technology, there is a feedback type of device which detects advance or delay in phase from the information on the absolute value of phase data whose difference has been taken as described in the reference "Timing Recovery Scheme Using Received Signal Phase Information for QPSK Modulation" (by Fujimura, in Proceedings of Electronic Information Communication Association, Vol. J81-B-II No. 6, pp.665–668, June, 1998).

FIG. 22 is a block diagram showing a general configuration of a receiver containing a demodulator having a timing recovery device based on the conventional technology. As shown in FIG. 22, an antenna 101 receives RF signal containing a QPSK demodulation signal, and a frequency converting section 102 outputs a baseband signal comprising an in-phase component and an orthogonal component by successively subjecting this RF signal to amplification, band restriction, and frequency conversion.

A/D converter 111a samples the in-phase component and an A/D converter 111b samples the orthogonal component of the baseband signal at each time $t=\tau+iT/2$. The A/D converter 111a outputs the sampled data array $I_i$ (in-phase amplitude component) and while the A/D converter 111b outputs sampled data array $Q_i$ (orthogonal amplitude component). Herein T indicates a symbol duration and $\tau$ indicates a timing error in a range of $-T/2 \leq \tau \leq 2$. Here i is a natural number such as 1, 2, 3 . . . It should be noted that sampling of a baseband signal by the A/D converters 111a, 111b is executed in a first transitional edge of a sampling clock SSK outputted from a timing recovery section 112 described later.

A coordinate transform section 110 computes a baseband signal phase data array $\theta_i$ by executing coordinate transformation, namely inverse tangent computing using the data array $I_i$ and $Q_i$ outputted from the A/D converters 111a, 111b respectively.

$$\theta_i = \tan^{-1}(Q_i/I_i) \quad (1)$$

A timing recovery section 112 executes phase control, namely timing recovery processing for generating a sampling clock SSK and a recovered symbol clock RRC each phase-synchronized with the inputted baseband signal using the phase data array $\theta_i$ outputted from the coordinate transform section 110.

Nyquist data extracting section 113 extracts a data array at an Nyquist point using the recovered symbol clock RRC from the data arrays $I_i$ and $Q_i$ sampled with the sampling clock SSK. A data determining section 116 determines data according to the data arrays at the Nyquist point, and outputs the data as demodulated data to a decoder 104. The decoder 104 executes decode processing according to the demodulated data. It should be noted that data determination by the data determining section 116 is executed based on a coherent detection scheme or a differential detecting scheme compatible with the modulating system.

Herein detailed description is made for the timing recovery processing by the timing recovery section 112 by referring to FIG. 23 to FIG. 25A. Herein description is made for a case when a bust signal comprising a preamble section used for timing recovery or the like and a data section including a message as a random pattern is received. FIG. 23 is a view showing temporal change in the phase $\theta(t)$ of a baseband signal when a $0\pi$ demodulated signal repeating a phase fluctuation of $\pm 180$ (degree) for one symbol is received and a temporal change in the absolute signal $\alpha(t)$ of deviation for T/2 of this phase $\theta(t)$ (½ of symbol duration). FIG. 24 is a view showing a temporal change in the phase $\theta(t)$ of the baseband signal when a random pattern of a data section in which the phase $\theta(t)$ changes at random is received and a temporal change of an absolute signal $\alpha(t)$ of deviation for T/2 of this phase $\theta(t)$. FIG. 25A and FIG. 25B are constellation views showing amplitude shift of a baseband signal at a Nyquist point. In these figures the horizontal axis indicates an in-phase component (I channel) of a baseband signal, while the vertical axis indicates an orthogonal component (Q channel) of the baseband signal. FIG. 25A is a constellation view showing a state when there is no DC offset, and FIG. 25B is a constellation view showing a state where DC offset is added.

The preamble signal shown in FIG. 23 is a signal alternately shifting at the point A or the point C in FIG. 25A, while the random pattern signal shown in FIG. 24 is a signal shifting at random at any point between the points A and D in FIG. 25A. In otherwords, the phase $\theta(t)$ of the preamble signal shown in FIG. 23 repeats fluctuation of 180 degrees in one symbol duration, and the $\theta(t)$ of the random pattern signal shown in FIG. 24 repeats fluctuations of 0, $\pm 90$, $\pm 180$ degrees in one symbol duration. It should be noted that the time t=0, T, 2T, 3T, . . . on the time axis indicates a Nyquist point, and that t=0 indicates arrival of the first burst signal. T indicates a symbol duration.

An absolute value signal $\alpha(t)$ of a deviation of T/2 time is defined by the following equation (2).

$$\alpha(t) = \min\ [|\theta(t)-\theta(t-T/2)|,\ 360-|\theta(t)-\theta(t-T/2)|] \quad (2)$$

This absolute value signal $\alpha(t)$ is a signal obtained based on the fact that the change in the phase $\theta(t)$ is rather moderate around the Nyquist point (t=0, T, 2T, 3T, . . . ) and is sharp around points at T/2 symbol time after the Nyquist point (t=T/2, 3T/2, 5T/2, 7T/2, . . . ). The absolute value signal $\alpha(t)$ shown in FIG. 23 and FIG. 24 includes a symbol frequency component s(t) and a DC component as shown in the following equation (3) whether or not the signal is a preamble signal or a random pattern signal. Namely, the signal $\alpha(t)$ includes a symbol frequency component $$s(t) = -\sin\ 2\pi t/T \quad (3)$$

and a DC component. Especially, when a preamble signal is received, lot of symbol frequency components s(t) are included in the signal $\alpha(t)$.

Herein a difference signal $\Delta\alpha(t)$ for the absolute value signal $\alpha(t)$ with ½ symbol time interval is defined as indicated by the following equation:

$$\Delta\alpha(t)=\alpha(t)-\alpha(t-T/2) \quad (4)$$

Following relation exists between an average value $M[\Delta\alpha(ta)]$ of this difference signal $\Delta\alpha(t)$ at the time $ta=\tau+jT$ and the timing error $\tau$. Herein, j is a natural number such as 1, 2, 3 . . .

when $M[\Delta\alpha(ta)]<0$ then $0<\tau<T/2$ when $M[\Delta\alpha(ta)]>0$ then $-T/2<\tau<0$ \quad (5)

It should be noted that, when $M[\Delta\alpha(ta)]$ is equal to zero, $\tau$ is also equal to zero.

Similarly the following relation as expressed by the equation (6) exists between the average value $[\Delta\alpha(t)\times(-1)^i]$ of values each obtained by multiplying the difference signal $\Delta\alpha(t)$ at the time $tb=\tau+iT/2$ and the timing error $\tau$:

when $M[\Delta\alpha(tb)\times(-1)^i]<0$ then $0<\tau<T/2$ when $M[\Delta\alpha(tb)\times(-1)^i]>0$ then $-T/2<\tau<0$ \quad (6)

It should be noted that when $M[\Delta\alpha(tb)\times(-1)^i]$ is equal to zero, $\tau$ is also equal to zero.

Accordingly, timing synchronicity with a baseband signal can be established by controlling a phase of the sample timing SSK according to information on the average value $M[\Delta\alpha(ta)]$ or the average value $M[\Delta\alpha(tb)\times(-1)^i]$, namely according to information including a symbol frequency component and providing feedback controls so that the value of the average value $M[\Delta\alpha(ta)]$ or the average value $M[\Delta\alpha(tb)\times(-1)^i]$ is convoluted to 0.

Actual controls over this timing synchronicity is executed by an equal timing recovery section 112, and description is made hereinafter for controls when information on the average value $M[\Delta\alpha(tb)\times(-1)^i]$ at T/2 time is used.

In FIG. 22, a phase subtracting type of phase detector 121 computes a phase deviation data array ai expressed by the following equation (7) corresponding to the equation (2) according to a phase data array $\theta_i$ outputted from the coordinate transform section 110. Namely, $\alpha_i$ is computed through the following equation:

$$\alpha_i=\min[|\theta_i-\theta_{i-1}|, 360-|\theta_i-\theta_{i-1}|] \quad (7)$$

Herein i is an integer (i=0, ±1, ±2, ±3, . . . ).

Further, the phase subtracting type of phase detector 121 computes a phase detection data array as expressed by the following equation (8) corresponding to the equation (4) according to the phase deviation data array $\alpha_i$. Namely, the $\delta_i$ is computed through the following equation:

$$\delta_i=(\alpha_i-\alpha_{i-1})\times(-1)^i \quad (8)$$

Herein i is an integer (i=0, ±1, ±2, ±3, . . . ).

An averaging section 122 comprises a random walk filter. The averaging section 122 averages the phase detection data array $\delta_i$ outputted from the phase subtracting type of phase detector 121 and outputs a control signal $V_i\epsilon[1, 0, -1]$. Namely, the averaging section 122 outputs the control signal $V_i=1$ when an average value of the phase detection data array $\delta_i$ is positive, outputs the control signal $V_i=-1$ when the average value is negative, and outputs the control signal $V_i=0$ when the average value of the phase detection data array $\delta_i$ is zero.

A phase controller 123 controls the phase of the sampling clock SSK outputted from this phase controller 123 according to the control signal $V_i$ outputted from the averaging section 122. Namely, the phase control section 123 delays the sampling clock SSK when the control signal $V_i=1$ is inputted, advances the sampling clock SSK when the control signal $V_i=-1$ is inputted, and maintains the sampling clock SSK as it is when the control signal $V_i=0$ is inputted. This phase-controlled sampling clock SSK is used as a sampling clock by the A/D converters 111a, 111b. It should be noted that step width of phase control by the phase control section 123 is, for instance, T/16 (¹⁄₁₆ of the symbol duration).

Further, a dichotomizer 124 dichotomizes the sampling clock SSK phase-controlled by the phase control section 123. The dichotomizer 124 outputs the dichotomized signal as a recovered symbol clock RRC and this recovered symbol clock RRS is used for latching a Nyquist point in the Nyquist data extracting section 113. The recovered symbol clock RRS is also used as a clock for the decoder 104.

In recent years, however, to achieve reduction in size and weight of a decoder, hot attention is being drawn on a direct conversion system in which a baseband signal is obtained by directly multiplying a radio frequency signal (RF signal) by a local frequency signal which is the same as this radio frequency signal. When this direct conversion system is used, there is a problem that a DC offset is added to the baseband signal and hence the BER (bit error rate) is substantially degraded.

To solve this problem, for instance, in Japanese Patent Laid-Open Publication No. HEI 6-261088, there is described a decoder offset removing circuit in which a baseband signal is inputted into a low-pass filter where the a DC offset component is detected and this detected DC offset component is removed by correction from the baseband signal.

FIG. 26 is a block diagram showing configuration of a receiver based on the conventional technology in which a mechanism for removing the DC offset is added to the demodulator in the receiver shown in FIG. 22. Namely, the receiver shown in FIG. 26 comprises an offset detector 131 and an offset correcting section 132 provided between the A/D converters 111a, 111b and the coordinate transform section 110 in the receiver shown in FIG. 22.

The offset detector 131 inputs data arrays $I_k$, $Q_k$ outputted from the A/D converters 111a, 111b into a low-pass filter and detects DC offset components ID, QD respectively. When the low-pass filter has an moving average circuit, the moving average is detected as DC offset components ID, QD. The DC offset component ID is the DC offset component corresponding to the data array $I_k$, and the DC offset component QD is a DC offset component corresponding to the data array $Q_k$.

The offset correcting section 132 subtracts the DC offset components ID, QD outputted from the offset detector 131 from data arrays $I_k$, $Q_k$ respectively to correct the data arrays each with a DC offset component having been removed therefrom, and outputs the corrected data to the coordinate transform section 110.

With the conventional type of demodulator for a receiver as described above, it is possible to remove a DC offset component, however, until this DC offset component is removed to some extent by the offset correcting section 132, timing synchronicity can not be established by the timing recovery section 112. A time required until the timing synchronicity is established and demodulation can be executed is equal to a sum of the time after a header section of data indicated by a baseband signal is inputted until the DC offset is removed and the time after the DC offset is removed to some extent until timing phase synchronization is completed. Since a longer time is required to remove the DC offset a long time is disadvantageously required after a header of data is inputted into the demodulating section until data is normally demodulated.

When this DC offset is not removed demodulation of data can not be performed correctly. A state in which data can not be demodulated correctly is explained here. When the DC offset is still appended to data the points A to D on the constellation view shown in FIG. 25B are shifted in the direction of the first quadrant.

FIG. 27 is a view showing a temporal change in the phase θ(t) when a preamble is received in the state when the DC offset is still appended and a temporal change in the absolute value signal α(t) for a deviation of this phase θ(t) for T/2 time. As described above, when a preamble is received, the phase is shifted at the point A to point D alternately on the constellation diagram in FIG. 25B. Accordingly, the phase θ(t) when receiving a preamble does not repeat between the phase 45 degrees and the phase 225 degrees in a state when DC offset is not present, and always have a value around the phase 45 degrees. Namely, the phase θ(t) changes little. Therefore, even if the absolute value signal α(t) is computed, because the phase θ(t) itself does not change, much the absolute value signal α(t) also does not change much and the value is close to zero. As a result, a symbol frequency component s(t) is not present in the absolute value signal α(t) at all.

On the other hand, FIG. 28 is a view showing a temporal change in the phase θ(t) when a random pattern is received in the state where DC offset is still offset, and a historical change of the absolute value signal α(t) for a deviation of this θ(t) for T/2 time. When a random pattern is being received, the phase shifts between the points A to D on the constellation diagram shown in FIG. 25B randomly. When a random pattern is being received, the phase θ(t) only shifts among the phase 0 degree, phase 45 degree and phase 90 degree, and as compared to a case where DC offset is not present, the phase change is drastically reduced. Further, even if the absolute value signal α(t) is computed, as a deviation of the phase θ(t) itself becomes smaller, so that a section in which the symbol frequency component s(t) in the absolute value signal α(t) becomes substantially smaller. A percentage of a symbol frequency component s(t) included in this absolute value signal α(t) becomes smaller as the DC offset increases.

As a timing phase corresponding to a symbol frequency can not be detected in the state where a DC offset is included as described above, advance or delay in the timing phase of the baseband signal can not be detected, which makes it impossible to establish timing synchronicity, and also a period of time until this DC offset is removed is added as a period of time required until the timing synchronicity is established.

Further, the demodulator 103 based on the conventional technology as described above requires a mechanism for computing a data array θ_i by using the coordinate transforming section 110. Because a volume of operations for this coordinate transformation is large, a long period of time is required for demodulation processing, which in turn requires a long period of time until a timing synchronicity is established. Even if this coordinate transformation is executed by using a ROM, a scale of the transform circuit can not be ignored, and as a result a scale of a demodulator or that of the entire receiver becomes disadvantageously large.

The demodulator 103 for a receiver based on the conventional technology as described above generally executes feedback processing by using a PLL (phase Synchronicity Loop) type of synchronizing circuit. Because a time delay due to a register in a loop in this PLL is shorter, the characteristics of more rapid timing phase synchronization and low phase jitter can be realized. However, as the coordinate transform section 110 which executes a vast amount of calculations is present inside the PLL loop, a time delay in the PLL loop tends to become larger, and timing phase synchronization in the subsequent steps and phase jitter disadvantageously degrade the characteristics.

SUMMARY OF THE INVENTION

To solve the problems as described above, it is an object of the present invention to provide a phase detector capable of detecting a timing phase of a baseband signal regardless of whether DC offset is included in the baseband signal or not, execution demodulation by executing the timing phase adjustment using this detected timing phase, and realizing rapid timing phase synchronization and low phase jitter with simple computing processing as well as simple configuration, a timing recovery device using this phase detector, and also a demodulator using this timing recovery device.

It is another object of the present invention to provide a phase detector capable of detecting a timing phase by means of simple addition and subtraction using information on a baseband signal having an amplitude restricted into a specified range with a limiter amplifier, executing demodulation processing by executing timing phase adjustment using this detected timing phase, and also realizing rapid timing phase synchronization and low phase jitter with simple computing processing as well with simple configuration, a timing recovery device using this phase detector, and a demodulator using this timing recovery device.

It is still another object of the present invention to provide a phase detector capable of shortening a period of time until a baseband signal is normally demodulated by executing removal of DC offset and timing phase synchronization concurrently, a timing recovery device using this phase detector, and a demodulator using this timing recovery device.

With the present invention, a in-phase amplitude deviation computing unit computes in-phase amplitude deviation which is an absolute value of a value obtained when the inphase amplitude components at 1/n (where n is a natural number greater than 1) of a symbol duration of a baseband signal are subtracted from each other; a orthogonal amplitude deviation computing unit computes orthogonal amplitude deviation which is an absolute value of a value obtained when the orthogonal amplitude components at 1/n (where n is a natural number greater than 1) of a symbol duration of a baseband signal are subtracted from each other; and a synthesized amplitude deviation computing unit computes a synthesized amplitude deviation obtained by adding the in-phase amplitude deviation and the orthogonal amplitude deviation; and a timing phase of the baseband signal is detected according to the synthesized amplitude deviation. Therefore, timing phase can be detected with simple configuration. Further, the synthesized amplitude deviation is obtained through simple addition or subtraction between an in-phase amplitude component and an orthogonal amplitude component, so that high speed processing and size and weight reduction of a mechanism for detecting phase can be realized.

With the present invention, a difference value computing unit computes a difference between the synthesized amplitude deviations at ½ symbol time; and a phase detection signal indicating detection of advance or delay in the timing phase of the baseband signal is outputted according to the difference. Therefore, even if a DC offset is included in the baseband signal or the amplitude of the baseband signal is limited into a specified range with a limiter amplifier or the like, a timing phase for the baseband signal can accurately be detected.

With the present invention, the synthesized amplitude deviation computing unit outputs a value obtained by adding a square of the in-phase amplitude deviation to a square of the orthogonal amplitude deviation as the synthesized amplitude deviation. Therefore, more precise synthesized amplitude deviation can be obtained and also timing phase detection can be executed with high precision.

With the present invention, the synthesized amplitude deviation computing unit outputs a square root of a value obtained by adding a square of the in-phase amplitude deviation to the orthogonal amplitude deviation as the synthesized amplitude deviation. Therefore, more precise synthesized amplitude deviation can be obtained and timing phase detection can be made with higher precision.

With the present invention, a first weightage unit computes an in-phase amplitude symbol time deviation which is an absolute value of a value obtained when the in-phase amplitude components at symbol duration time of a baseband signal are subtracted from each other, and provides a weightage to the in-phase amplitude deviation using the computed in-phase amplitude symbol time deviation; and a second weightage unit computes an orthogonal amplitude symbol time deviation which is an absolute value of a value obtained when the orthogonal amplitude components at symbol cycle time of a baseband signal are subtracted from each other, and provides a weightage to the orthogonal amplitude deviation using the computed orthogonal amplitude symbol time deviation. Therefore, more precise timing phase detection can be executed and more rapid timing phase synchronization and reduction of phase jitter can be promoted.

With the present invention, a first signal shift amount computing unit computes an in-phase amplitude symbol time deviation which is an absolute value of a value obtained when the in-phase amplitude components at symbol cycle time of a baseband signal are subtracted from each other; a second signal shift amount computing unit computes an orthogonal amplitude symbol time deviation which is an absolute value of a value obtained when the orthogonal amplitude components at symbol cycle time of a baseband signal are subtracted from each other; a shift determining unit determines whether the in-phase amplitude symbol time deviation and the orthogonal amplitude symbol time deviation have a value which is less than a specified value or not; and an inverting unit inverts the phase detection signal when it is determined by the shift determining unit that the in-phase amplitude symbol time deviation and the orthogonal amplitude symbol time deviation have a value which is less than the specified value and outputting this inverted phase detection signal. Therefore, timing phase can be detected more precisely and rapid timing phase synchronization and reduction of phase jitter can be realized.

With the present invention, a first multiplying unit generates a cosine multiplication signal by multiplying the synthesized amplitude deviation by cosine of the free symbol frequency signal; a second multiplying unit generates a sine multiplication signal by multiplying the synthesized amplitude deviation by sine of the free symbol frequency signal; and a timing difference computing unit computes a inverse tangent of the sine multiplication signal against the cosine multiplication signal and outputting the inverse tangent as a timing phase for the free symbol frequency signal against the baseband signal. Therefore, timing phase can be detected under stable conditions regardless of an initial timing phase value.

With the present invention, a phase detecting unit outputs a phase detection signal indicating advance or delay in the timing phase of the baseband signal from a difference of a synthesized amplitude deviation at ½ of a symbol duration, which synthesized amplitude deviation is obtained by adding an in-phase amplitude deviation which is an absolute value of a value obtained when the in-phase amplitude components at ½ of a symbol duration of a baseband signal sampled at a sampling clock that is two times faster than a symbol rate are subtracted from each other to an orthogonal amplitude deviation which is an absolute value of a value obtained when the orthogonal amplitude components at ½ of a symbol duration of the baseband signal are subtracted from each other; an averaging unit outputs an average value of phase detection signals outputted from the phase detecting unit as a phase control signal; a phase control unit provides phase control over the sampling clock according to the phase control signal outputted from the averaging unit; and a dichotomizing unit dichotomizes the sampling clock having been subjected to phase control by the phase control unit and outputs this dichotomized clock as a recovered symbol clock. Therefore, regardless of whether a DC offset is present in a baseband signal or an amplitude of a baseband signal is limited or not, rapid timing phase synchronization when receiving a preamble and low phase jitter when receiving a random pattern in a data section can be realized. A synthesized amplitude deviation can be obtained with simple addition or subtraction, so that it is possible to minimize a circuit scale and further promote downsizing. Further, a delay time within a PLL feedback group can be made smaller which enables high speed processing. Further, the phase detecting unit operates by using information on in-phase and orthogonal amplitudes of a baseband signal sampled two times higher than the symbol rate, so that a operating speed two times higher than the symbol rate can be realized and the phase detecting unit can easily be applied to a high speed radio communication system for multimedia with the symbol rate of several tens MHz or more.

With the present invention, a phase detecting unit computes a value obtained by adding a square of the in-phase amplitude deviation to a square of the orthogonal amplitude deviation as the synthesized amplitude deviation. Therefore, timing phase can be detected more precisely and as a result rapid timing phase synchronization and low phase jitter can be realized.

With the present invention, a phase detecting unit computes a square root of a value obtained by adding a square of the in-phase amplitude deviation to a square of the orthogonal amplitude deviation as the synthesized amplitude deviation. Therefore, timing phase can be detected more precisely and as a result rapid timing phase synchronization and low phase jitter can be realized.

With the present invention, a first weightage unit computes an in-phase amplitude symbol time deviation which is an absolute value of a value obtained when the in-phase amplitude components at symbol cycle time of a baseband signal are subtracted from each other, and provides a weightage to the in-phase amplitude deviation using the computed in-phase amplitude symbol time deviation; and a second weightage unit computes an orthogonal amplitude symbol time deviation which is an absolute value of a value obtained when the orthogonal amplitude components at symbol cycle time of a baseband signal are subtracted from each other, and provides a weightage to the orthogonal amplitude deviation using the computed orthogonal amplitude symbol time deviation for deleting information when a phase inversion is generated in the symbol frequency component when signal sift does not occur. Therefore, timing phase can be detected more precisely and rapid timing phase synchronization and reduction of phase jitter can be promoted.

With the present invention, a quartering unit quarters a free sampling clock which is four times faster than a symbol rate and outputs this quartered clock as a free symbol clock; a phase detecting unit a) obtains a synthesized amplitude deviation by adding an in-phase amplitude deviation which is an absolute value of a value obtained when the in-phase amplitude components at 1/n (where n is equal to 2 or 4) of a symbol duration of a baseband signal sampled at the free symbol clock are subtracted from each other to an orthogonal amplitude deviation which is an absolute value of a value obtained when the orthogonal amplitude components at 1/n (where n is equal to 2 or 4) of a symbol duration of a baseband signal are subtracted from each other, b) obtains a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and c) outputs the cosine multiplication signal and the sine multiplication signal as a phase detection signal indicating advance or delay in the timing phase of the baseband signal; an averaging unit outputs a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by the phase detecting unit; and a clock generating unit computes a timing phase which is a inverse tangent of the cosine multiplication control signal and the sine multiplication control signal of the phase control signals outputted from the averaging unit, and generates a recovered symbol clock by phase-shifting the free symbol clock by the timing phase. Therefore, regardless of whether a DC offset is present in a baseband signal or not or whether the amplitude of the baseband signal is limited or not, rapid timing phase synchronization when receiving a preamble and low phase jitter when receiving a random pattern can be realized. As the synthesized amplitude deviation can be obtained with simple addition and subtraction, so that a circuit scale can be made smaller and downsizing of the device can be promoted. Further, delay time within a PLL feedback loop can be reduced, which enables high speed processing. Further, a recovered symbol clock is generated with a feed forward, so that regardless of the value of the initial timing phase, a time required for timing phase synchronization is decided according to a time constant or the like of a filter in the averaging unit, which enables a stable timing phase synchronization operation.

With the present invention, a phase detecting unit computes a value obtained by adding a square of the in-phase amplitude deviation to a square of the orthogonal amplitude deviation as the synthesized amplitude deviation to obtain a synthesized amplitude deviation with higher precision. Therefore, timing phase can be detected more precisely and as a result rapid timing phase synchronization and low phase jitter can be realized.

With the present invention, phase detecting unit computes a square root of a value obtained by adding a square of the in-phase amplitude deviation to a square of the orthogonal amplitude deviation as the synthesized amplitude deviation to obtain a synthesized amplitude deviation with higher precision. Therefore, timing phase can be detected more precisely, and as a result rapid timing phase synchronization and low phase jitter can be realized.

With the present invention, a first weightage unit computes an in-phase amplitude symbol time deviation which is an absolute value of a value obtained when the in-phase amplitude components at symbol cycle time of a baseband signal are subtracted from each other, and provides a weightage to the in-phase amplitude deviation using the computed in-phase amplitude symbol time deviation; and a second weightage unit computes an orthogonal amplitude symbol time deviation which is an absolute value of a value obtained when the orthogonal amplitude components at symbol cycle time of a baseband signal are subtracted from each other, and provides a weightage to the orthogonal amplitude deviation using the computed orthogonal amplitude symbol time deviation to delete information when phase reversion in the symbol frequency component occurs in a state where signal shift does not occur. Therefore, timing phase can be detected more precisely and rapid timing phase synchronization and reduction of phase jitter can be promoted.

With the present invention, a sampling unit samples a baseband signal with a sampling clock which is two times faster than a symbol rate; a phase detecting unit outputs a phase detection signal indicating advance or delay in the timing phase of the baseband signal from a difference of a synthesized amplitude deviation at ½ of a symbol duration, which synthesized amplitude deviation is obtained by adding an in-phase amplitude deviation which is an absolute value of a value obtained when the in-phase amplitude components at ½ of a symbol duration of the baseband signal are subtracted from each other to an orthogonal amplitude deviation which is an absolute value of a value obtained when the orthogonal amplitude components at ½ of a symbol duration of the baseband signal are subtracted from each other; an averaging unit outputs an average value of phase detection signals outputted from the phase detecting unit as a phase control signal; a phase control unit provides phase controls over a sampling clock used by the sampling unit according to the phase control signal outputted from the averaging unit; a dichotomizing unit dichotomizes the sampling clock phase-controlled by the phase control unit and outputs the dichotomized clock as a recovered symbol clock; a Nyquist point data extracting unit extracts Nyquist point data for the baseband signal sampled by the sampling unit using the recovered symbol clock; an offset detecting unit averages the Nyquist point data extracted by the Nyquist point data extracting unit and detects a DC offset from the average data; a correcting unit corrects the Nyquist point data by subtracting the DC offset detected in the offset detecting unit from the Nyquist point data extracted in the Nyquist point data extracting unit; and a determining unit determines data for the baseband signal according to the Nyquist point data corrected by the correcting unit. Therefore, regardless of whether a DC offset is present in a baseband signal or the amplitude of the baseband signal is limited or not, rapid timing phase synchronization when receiving a preamble and low phase jitter when receiving a random pattern in a data section can be realized and degradation of BER can also be reduced. As a synthesized amplitude deviation can be obtained with simple addition and subtraction, the circuit scale can be made smaller and downsizing of the device can be promoted. Further, as a delay time within a PLL feedback loop can be reduced, high speed processing becomes possible. Further, as the device operates using information on in-phase and orthogonal amplitudes of a baseband signal sampled at a rate two times higher than a symbol rate, so that operation speed two times faster than the symbol rate can be realized. Further, the demodulator according to the present invention can easily be applied to a high speed radio communication system for multimedia with the symbol rate of several tens MHz or more. Further, the processing for synchronizing a timing phase and processing for removing DC offset are concurrently executed in the demodulator, so that even when a DC offset is present in the baseband signal, time required until demodulation is correctly executed can be shortened, and as a result the transmission efficiency can be improved.

With the present invention, a free clock unit generates a free sampling clock which is four times faster than a symbol rate; a quartering unit quarters the free sampling clock generated by the free clock unit and outputs the quartered clock as a free symbol clock; a sampling unit samples a baseband signal with the free sampling clock generated by the free clock unit; a phase detecting unit a) obtains a synthesized amplitude deviation by adding an in-phase amplitude deviation which is an absolute value of a value obtained when the in-phase amplitude components at 1/n (where n is equal to 2 or 4) of a symbol duration of a baseband signal sampled at the free symbol clock are subtracted from each other to an orthogonal amplitude deviation which is an absolute value of a value obtained when the orthogonal amplitude components at 1/n (where n is equal to 2 or 4) of a symbol duration of a baseband signal are subtracted from each other, b) obtains a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and c) outputs the cosine multiplication signal and the sine multiplication signal as a phase detection signal indicating advance or delay in the timing phase of the baseband signal; an averaging unit outputs a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by the phase detecting unit; a clock generating unit computes a timing phase which is a inverse tangent of the cosine multiplication control signal and the sine multiplication control signal of the phase control signals outputted from the averaging unit, and generates a recovered symbol clock by phase-shifting the free symbol clock by the timing phase; a Nyquist point data extracting unit extracts Nyquist point data for the baseband signal sampled by the sampling unit using the recovered symbol clock; an offset detecting unit averages the Nyquist point data extracted by the Nyquist point data extracting unit and detects a DC offset from the average data; a correcting unit corrects the Nyquist point data by subtracting the DC offset detected in the offset detecting unit from the Nyquist point data extracted in the Nyquist point data extracting unit; and a determining unit determines data for the baseband signal according to the Nyquist point data corrected by the correcting unit. Therefore, regardless of whether a DC offset is present in a baseband signal or the amplitude of the baseband signal is limited or not, rapid timing phase synchronization when receiving a preamble and low phase jitter when receiving a random pattern in a data section can be realized and degradation of BER can be reduced. As a synthesized amplitude deviation can be obtained with simple addition and subtraction, the circuit scale can be made smaller and downsizing of the device can be promoted. Further, as a delay time within a PLL feedback loop can be reduced, high speed processing becomes possible. Further, as the device operates using information on in-phase and orthogonal amplitudes of a baseband signal sampled at a rate two times higher than a symbol rate, so that operation speed two times faster than the symbol rate can be realized. Further, the demodulator according to the present invention can easily be applied to a high speed radio communication system for multimedia with the symbol rate of several tens MHz or more. Further, the processing for synchronizing a timing phase and processing for removing DC offset are concurrently executed in the demodulator, so that even when a DC offset is present in the baseband signal, time required until demodulation is correctly executed can be shortened, and as a result the transmission efficiency can be improved.

Other objects and features of this invention will become apparent from the following description with reference to the accompanying drawings.

BRIEF DESCRIPTION OF THE DRAWINGS

FIG. 24 is a view showing a temporal change in the phase of a baseband signal not including a DC offset when receiving a random pattern and a temporal change in the phase deviation;

FIG. 27 is a view showing a temporal change in the phase of a baseband signal when receiving a preamble in the state where a DC offset is appended thereto and a temporal change in the phase deviation; and FIG. 28 is a view showing temporal change in the phase of a baseband signal when receiving a random pattern in the state where a DC offset is appended thereto and a temporal change in the phase deviation.

DESCRIPTION OF THE PREFERRED EMBODIMENTS

More detailed description of the present invention is made below with reference to the attached drawings.

Figure 1:
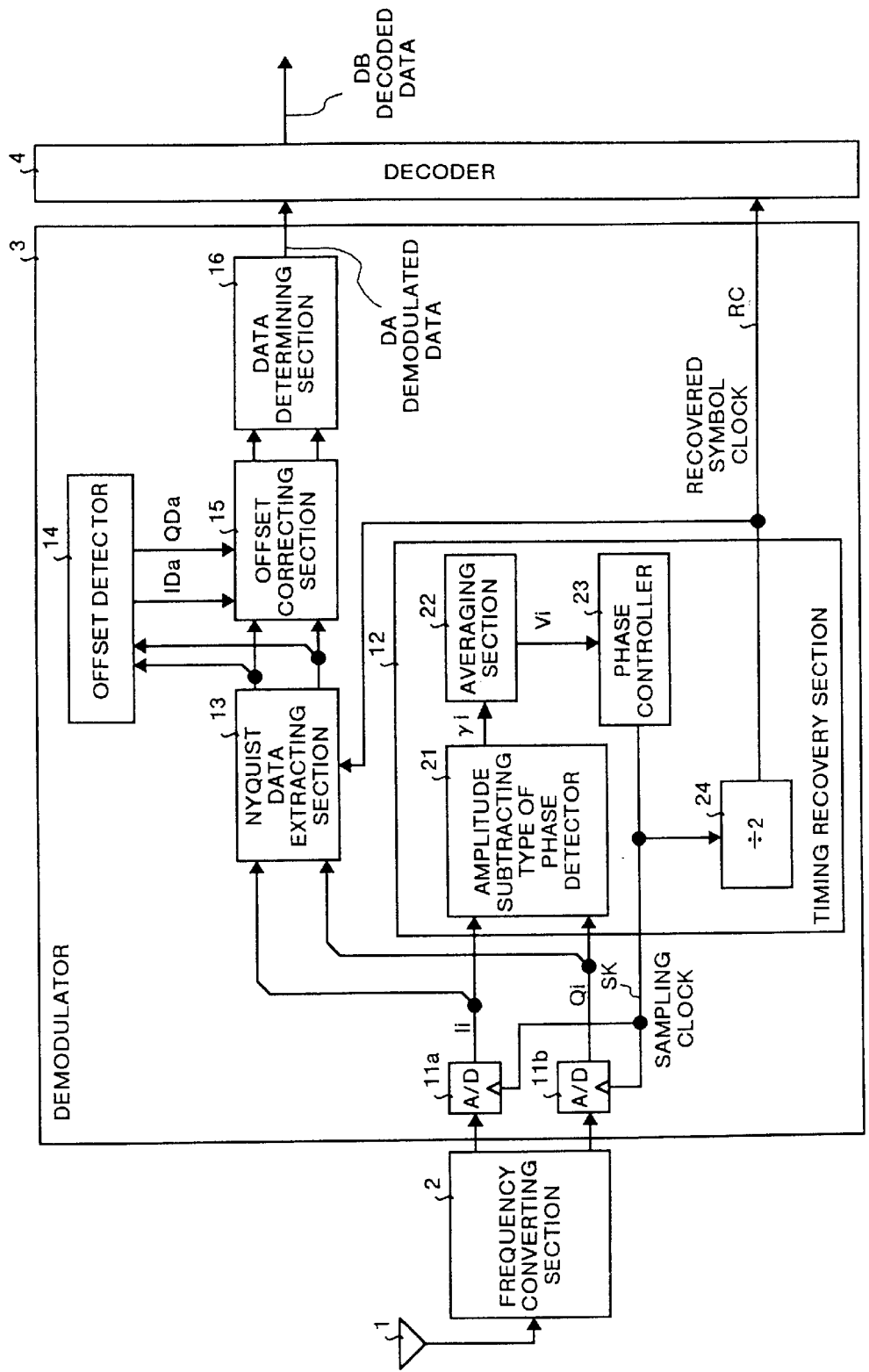
FIG. 1 is a view showing a general configuration of a receiver having a demodulator according to Embodiment 1 of the present invention, and especially shows detailed configuration of a demodulator employed in this receiver.

At first description is made for Embodiment 1 of the present invention. FIG. 1 is a view showing a general configuration of a receiver having a demodulator according to Embodiment 1 of the present invention and especially shows detailed configuration of a demodulator employed in this receiver.

In FIG. 1 an antenna 1 receives RF signal including a QPSK modulation signal, and a frequency converting section 2 subjects this RF signal to such processing as limitation of an amplitude and a frequency band and frequency conversion, and outputs a baseband signal including an in-phase component and an orthogonal component to a demodulator 3. The demodulator 3 regenerates a sampling clock SK for sampling a baseband signal and a recovered symbol clock from this baseband signal, demodulates data indicated by the baseband signal using this recovered symbol clock, and outputs the demodulated data DA and the recovered symbol clock RC to a decoder 4. The decoder 4 decodes the demodulated data DA and outputs the decoded data DB.

A/D converters 11a, 11b of the demodulator 3 sample the in-phase component and the orthogonal component of the baseband signal with the sampling clock SK at the time $t=\tau+iT/2$ respectively, and output the sampled in-phase amplitude component data array $I_i$ and orthogonal amplitude component data array $Q_i$ to a timing recovery section as well as to a Nyquist data extracting section 13. Herein T indicates a symbol duration, $\tau$ indicates a timing error and has a value in the range of $-T/2 \leq 2 \leq T/2$, i is a natural number such as 1, 2, 3, . . . It should be noted that sampling in the A/D converters 11a, 11b is executed at a first transitional edge of the sampling clock SK.

The timing recovery section 12 executes timing recovery processing for providing phase controls, namely for generating a sampling clock SK and a recovered symbol clock RC each phase-synchronized to the inputted baseband signal by using the in-phase amplitude component data array $I_i$ and orthogonal amplitude component data array Qi outputted from the A/D converters 11a, 11b.

The Nyquist data extracting section 13 extracts the data arrays $I_j$ and $Q_j$ at the Nyquist point using the in-phase amplitude component data array $I_i$ and orthogonal amplitude component data array $Q_i$ sampled with the sampling clock SK and recovered symbol clock RC. Here i is a natural number such as of 1, 2, 3 . . . The offset detector 14 detects DC offset components IDa, QDa from the data arrays $I_j$ and $Q_j$ extracted at the Nyquist point respectively and outputs the DC offset components IDa, QDa to an offset correcting section 15. The DC offset components IDa, QDa can be detected by suing a low-pass filter, and can be realized, for instance, with a moving average circuit. When the offset detector 14 is formed with this moving average circuit, moving average of in-phase and orthogonal components becomes the DC offset components IDa, QDa.

The offset correcting section 15 corrects the DC offset of the data arrays $I_j$ and $Q_j$ at the Nyquist point by subtracting the DC offset components IDa and QDa detected in the offset detector from the data arrays $I_j$ and $Q_j$ at the Nyquist point, and outputs these corrected data arrays $I_j$ and $Q_j$ to the data determining section 16.

The data determining section 16 makes data determination to a data array with the DC offset therein corrected by the offset correcting section 15 and outputs the data array as demodulated data DA to a decoder 4. The decoder 4 executes decode processing according to this demodulated data DA. Data determination by the data determining section 16 is executed according to a coherent detection scheme or a differential detecting scheme corresponding to the modulating scheme.

Figure 2:
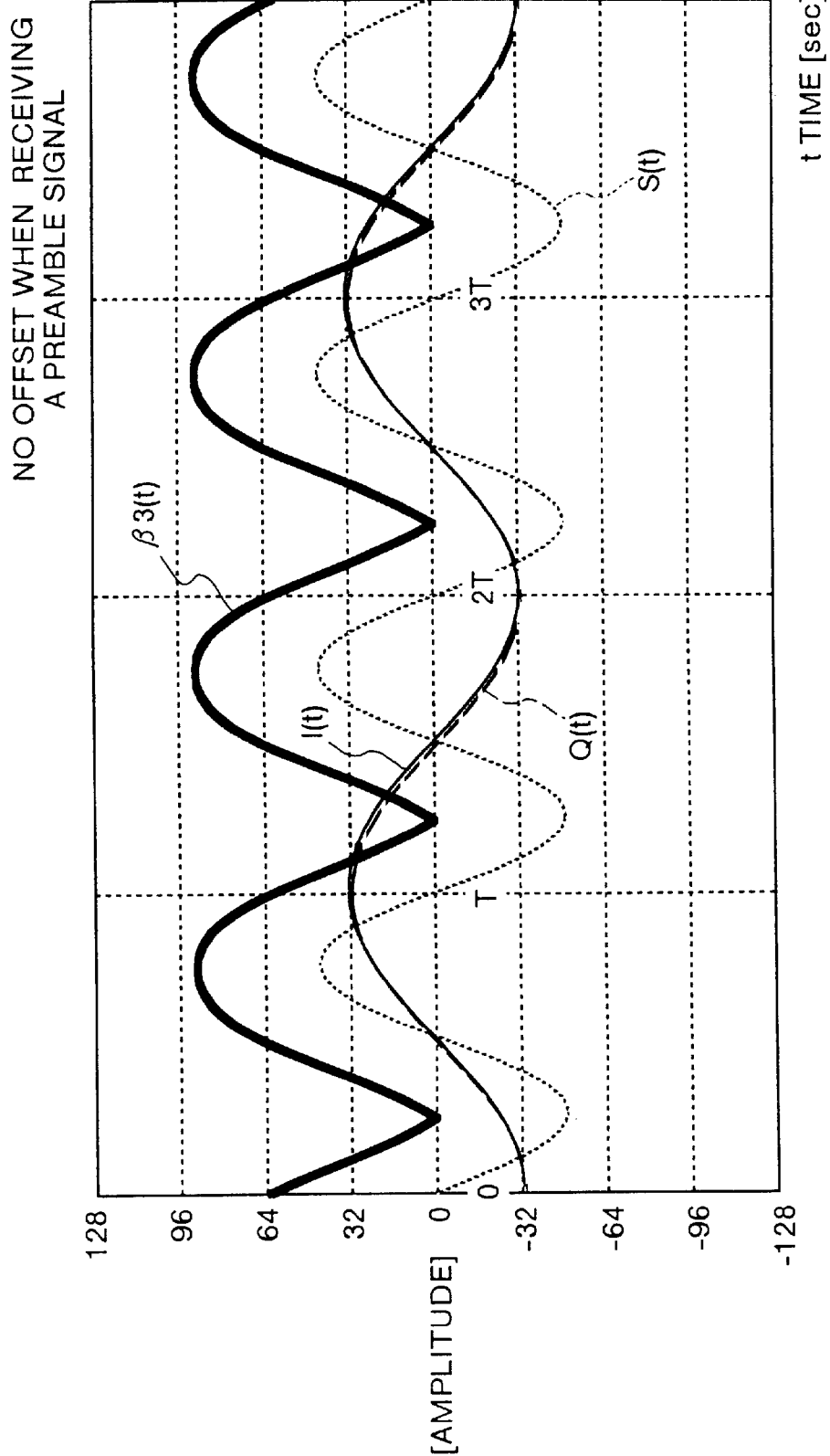
FIG. 2 is a view showing a temporal change in the in-phase amplitude component and an orthogonal amplitude component of a baseband signal not including a DC offset when receiving a preamble and a temporal change in the synthesized amplitude deviation.
Figure 3:
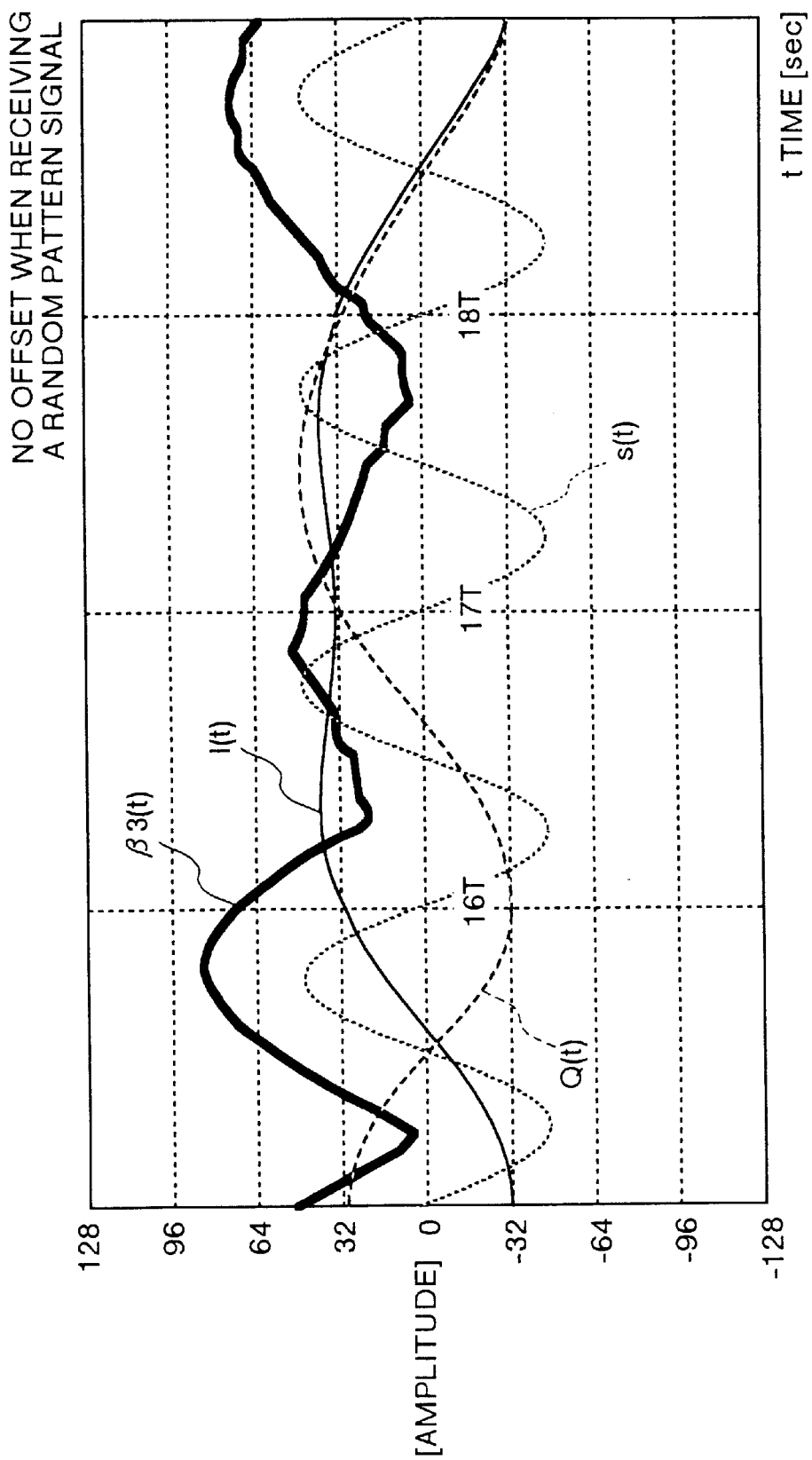
FIG. 3 is a view showing a temporal change in the in-phase amplitude component and an orthogonal amplitude component of a baseband signal not including a DC offset when receiving a random pattern and a temporal change in the synthesized amplitude deviation.
Figure 25A:
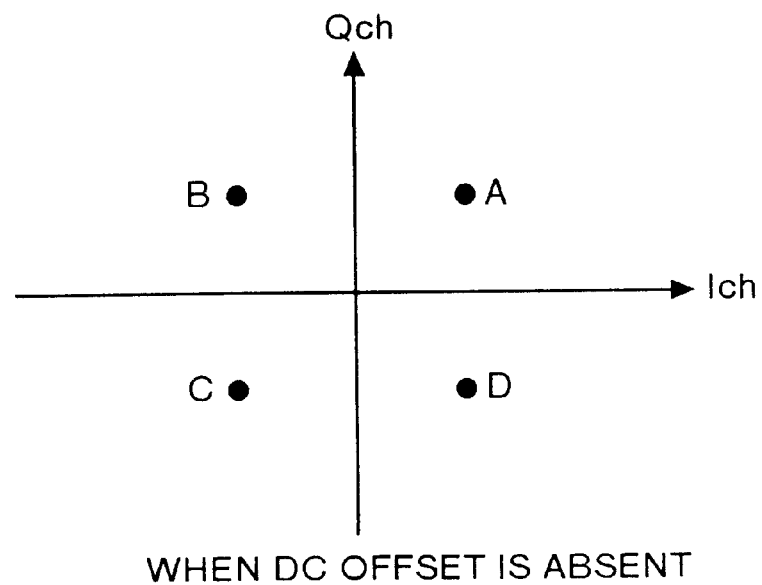
FIG. 25A and FIG. 25B are constellation views showing cases where a DC offset is included in the QPSK demodulation system and where a DC offset is not included therein.

The timing recovery processing by the timing recovery section 12 is explained here with reference to FIG. 2 and FIG. 3. It is assumed that, a burst signal comprising a preamble pattern used for timing recovery or the like and a random pattern as a message is received. FIG. 2 is a view showing temporal change in the in-phase amplitude component I (t) and orthogonal amplitude component Q(t) of a baseband signal when a 0π modulation signal repeating a phase shift of ±180 degrees for each symbol is received as a preamble. FIG. 2 also shows temporal change in the signal β3(t) indicating a sum of the absolute value of the deviation of the in-phase amplitude component I(t) for T/2 time (½ of the symbol duration) and the absolute value of the deviation of the orthogonal amplitude component Q(t). FIG. 3 is a view showing temporal change in the in-phase amplitude component I(t) and an orthogonal amplitude component Q(t) when a random pattern of a data section in which the in-phase amplitude component I(t) and orthogonal amplitude component Q(t) change at random is received. FIG. 3 also shows a temporal change in the signal β3(t) indicating a sum of the absolute value of the deviation of the in-phase amplitude component I(t) for T/2 time (½ of the symbol duration) and the absolute value of the deviation of the orthogonal component Q(t). Both FIG. 2 and FIG. 3 show a case where a DC offset is not appended to the baseband signal, and the phase shifts alternately between the point A and point C shown in FIG. 25A when a preamble is received, and among the points A to D shown in FIG. 25A at random when a random pattern is received. Time t=0, T, 2T, 3T, . . . on the time axis indicate Nyquist points respectively, and t=0 indicates a header of the baseband signal. T indicates a symbol duration as described above. Further, the vertical axis of FIG. 2 and FIG. 3 indicates an amplitude expressed as a value quantized with 8 bits, and the amplitude has a range from −128 to +127.

Deviations of the in-phase amplitude component I(t) and orthogonal amplitude component Q(t) of the baseband signal shown in FIG. 2 and FIG. 3, namely the differentiation values are defined as expressed by the following equations (9) and (10) respectively:

$$\Delta I(t)=|dI(t)/dt| \quad (9)$$

$$\Delta Q(t)=|dQ(t)/dt| \quad (10)$$

Referring to FIG. 2 and FIG. 3, it is understood that each of the deviation ΔI(t) of the in-phase amplitude component I(t) and the deviation ΔQ(t) of the orthogonal amplitude component Q(t) have a small value near the time for Nyquist point (t=0, T, 2T, 3T, . . . ), and a large value in T/2 symbol time after the Nyquist point (t=T/2, 3T/2, 5T/2, 7T/2, . . . ).

An absolute value signal β1(t) indicating an absolute value of a vector deviation of the baseband signal for T/2 time namely a distance and not the differentiation value, is defined as a deviation of the baseband signal in response to the deviations ΔI(t), ΔQ(t) with the following equation (11):

$$\beta 1(t)=(|I(t)-I(t-T/2)|^2+|Q(t)-Q(t-T/2)|^2)^{1/2} \quad (11)$$

The calculation of this absolute value signal β1(t) includes a square root, so that, in order to make the calculation time of the absolute value signal β1(t) shorter and a scale of hardware smaller, an absolute value signal β2(t) approximately the same as the absolute value signal β1(t) may be expressed as indicated by the equation (12). Namely $$\beta 2(t)=|I(t)-I(t-T/2)|^2+|Q(t)-Q(t-T/2)|^2 \quad (12)$$

The calculation of the absolute value signal β2(t) includes a square, so that, an absolute value β3(t) approximately the same as absolute the value signal β2(t) as indicated in the equation (13) may be used for shortening the calculation time as well as to minimize the hardware scale.

$$\beta 3(t)=|I(t)-I(t-T/2)|+|Q(t)-Q(t-T/2)| \quad (13)$$

The absolute value signal β3(t) as shown in this equation (13) can be obtained only by addition and subtraction between the in-phase amplitude component I(t) and orthogonal amplitude component Q(t).

FIG. 2 and FIG. 3 each show the absolute value signal β3(t) shown in the equation (13), and this absolute value signal β3(t) includes a symbol frequency component s(t) expressed by the following equation (14); namely $$s(t)=-\sin 2\pi t/T \quad (14)$$

and a DC component. Accordingly, by calculating the absolute value β3(t), the symbol frequency can be detected, and also a timing phase of a baseband signal can be detected.

Figure 4:
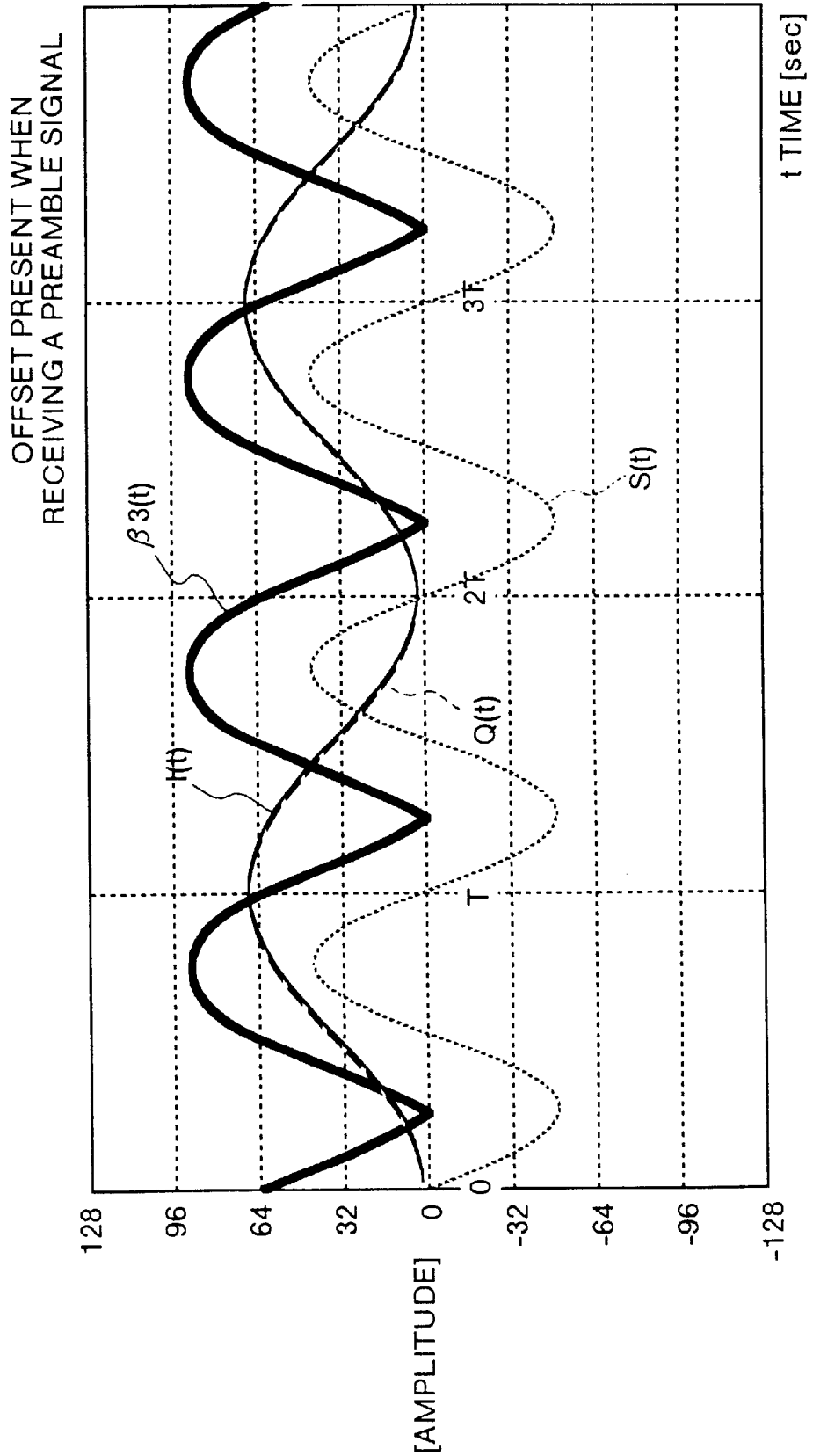
FIG. 4 is a view showing a temporal change in the in-phase amplitude component and an orthogonal amplitude component of a baseband signal including a DC offset when receiving a preamble and a temporal change in the synthesized amplitude deviation.
Figure 5:
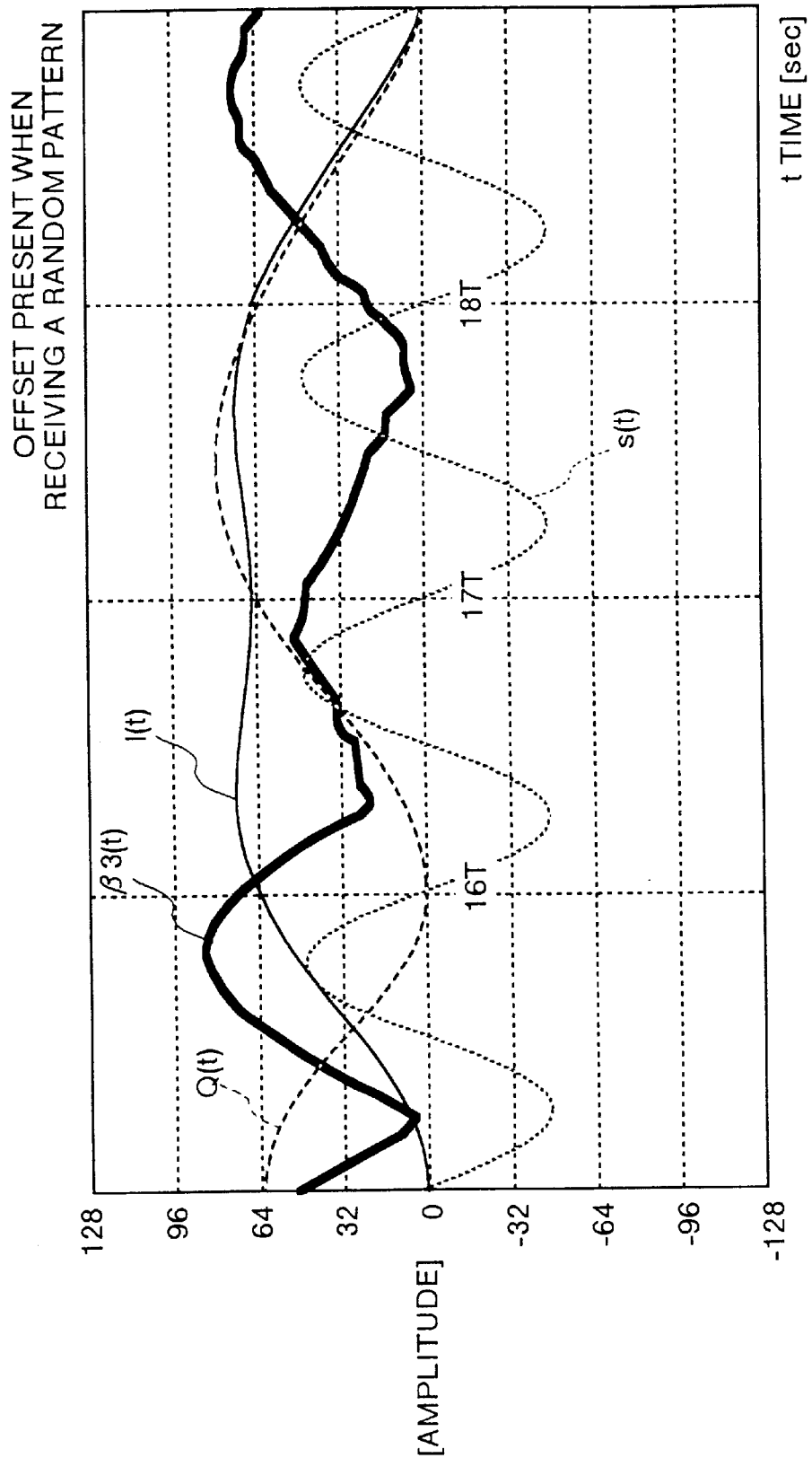
FIG. 5 is a view showing a temporal change in the in-phase amplitude component and an orthogonal amplitude component of a baseband signal including a DC offset when receiving a random pattern and a temporal change in the synthesized amplitude deviation.
Figure 25B:
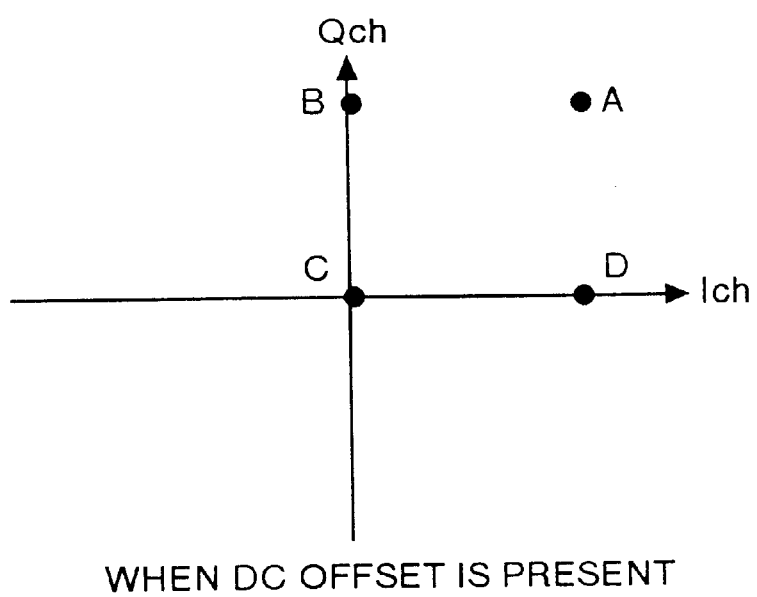

FIG. 4 and FIG. 5 correspond to FIG. 2 and FIG. 3 respectively, and show absolute value signal β3(t) when the DC offset is appended to the baseband signal shown in FIG. 2 and FIG. 3 when receiving a preamble and when receiving a random pattern respectively. The state where DC offset is appended to a baseband signal is as shown in the constellation view shown in FIG. 25B, and the phase alternately shifts between the point A and point C shown in FIG. 25B when receiving a preamble, or shifts among the points A to D shown in FIG. 25B at random when receiving a random pattern, and the phase change is smaller as compared to a case where the DC offset is not appended to the baseband signal.

However, the absolute value signal β3(t) shown in FIG. 4 and FIG. 5 includes a symbol frequency component s(t) and a DC component like in the case of absolute value signal β3(t) shown in FIG. 2 and FIG. 3 each showing the state where the DC offset is not appended thereto. The symbol frequency can be detected by calculating the absolute value signal β3(t), and further a timing phase of the baseband signal can be detected.

Namely the absolute value signal β3(t) includes a symbol frequency component s(t) regardless of whether the DC offset is included therein or not. The reason is that the absolute value signal β3(t) is calculated from each difference values of the orthogonal amplitude component I(t) and orthogonal amplitude component Q(t). It should be noted that the absolute value signals β1(t) and β2(t) include a symbol frequency component in a similar manner as the absolute value signal β3(t) s(t) regardless of whether the DC offset is included therein or not.

A phase of the absolute value signal β3(t) from the time 17 T to the time 18 T when receiving a random pattern shown in FIG. 3 and FIG. 5 is inverted by 180 degrees against the symbol frequency component s(t). The phase inversion phenomenon in which a phase of this absolute value signal β3(t) is inverted occurs when shift of a baseband signal in one symbol is not executed. At the time point 17 T and time point 18 T shown in FIG. 3 and FIG. 5, the inversion phenomenon occurs when the Nyquist point is present at the point A shown in FIG. 25A and at the point A shown in FIG. 25B, and this phenomenon causes timing phase jitter, namely fluctuations of a phase to increase. However, generally when receiving a random pattern, the probability of occurrence of the state in which a baseband signal shifts in one symbol, namely the state in which a phase of the baseband signal shifts from the point A shown in FIG. 25A or FIG. 25B to any of other points B to D is larger than the probability of a state in which a phase of the baseband resides at the point A.

To solve this problem, the absolute value signal $\beta3(t)$ indicating the state where a phase of the symbol component s(t) is inverted is selectively removed by averaging a value of the absolute value signal $\beta3(t)$ to obtain a sampling clock with the timing synchronized to the symbol frequency component s(t) and a recovered symbol clock.

Here, a ½ symbol subtraction signal $\Delta\beta3(t)$ for the absolute value signal $\beta3(t)$ is defined as shown in the equation (15). Namely, $$\Delta\beta3(t)=\beta3(t)-\beta3(t-T/2) \quad (15)$$

The following relation as expressed by the following equation (16) is satisfied, regardless of whether the DC offset is present or not, between an average value $M[\Delta\beta3(ta)]$ at the time $\tau a=\tau+jT$ (where j is a natural number such as 1, 2, 3, . . . ) for this ½ symbol subtraction signal $\Delta\beta3(t)$ and a timing error $\tau$. Namely, $$M[\Delta\beta3(ta)]<0 \text{ then } 0<\tau<T/2$$
$$M[\Delta\beta3(ta)]>0 \text{ then } -T/2<\tau<0$$
$$M[\Delta\beta3(ta)]=0 \text{ then } \tau=0 \quad (16)$$

Similarly, the following relation as indicated by the equation (17) is satisfied, regardless of whether the DC offset is present or not, between an average value $M[\Delta\beta3(tb)\times(-1)^i]$ of values each obtained by multiplying $\Delta\beta3(ta)$, a value of the ½ symbol subtraction signal $\Delta\beta3(t)$ at the time $\tau a=\tau+iT$ (where i is a natural number such as 1, 2, 3, . . . ) by $(-1)^i$ and a timing error. Namely, $$M[\Delta\beta3(tb)\times(-1)^i]<0 \text{ then } 0<\tau<T/2$$
$$M[\Delta\beta3(tb)\times(-1)^i]>0 \text{ then } -T/2<\tau<0$$
$$M[\Delta\beta3(tb)\times(-1)^i]=0 \text{ then } \tau=0 \quad (17)$$

Accordingly, timing synchronicity can be established by providing feedback control for converging a value of the average value $M[\Delta\beta3(ta)]$ or $[\Delta\beta3(tb)\times(-1)^i]$ to zero by means of controlling a sampling phase of data indicated by a baseband signal according to the value of $M[\Delta\beta3(ta)]$ or $[\Delta\beta3(tb)\times(-1)^i]$.

Operations of the timing recovery section 12 shown in FIG. 1 in which the operating principles of the above-described timing recovery processing is applied is described here. It should be noted that the timing recovery section 12 executes the processing corresponding to the absolute value signal $\beta3(t)$ expressed by the equation (13) and the averaging processing expressed by the equation (17).

Figure 6:
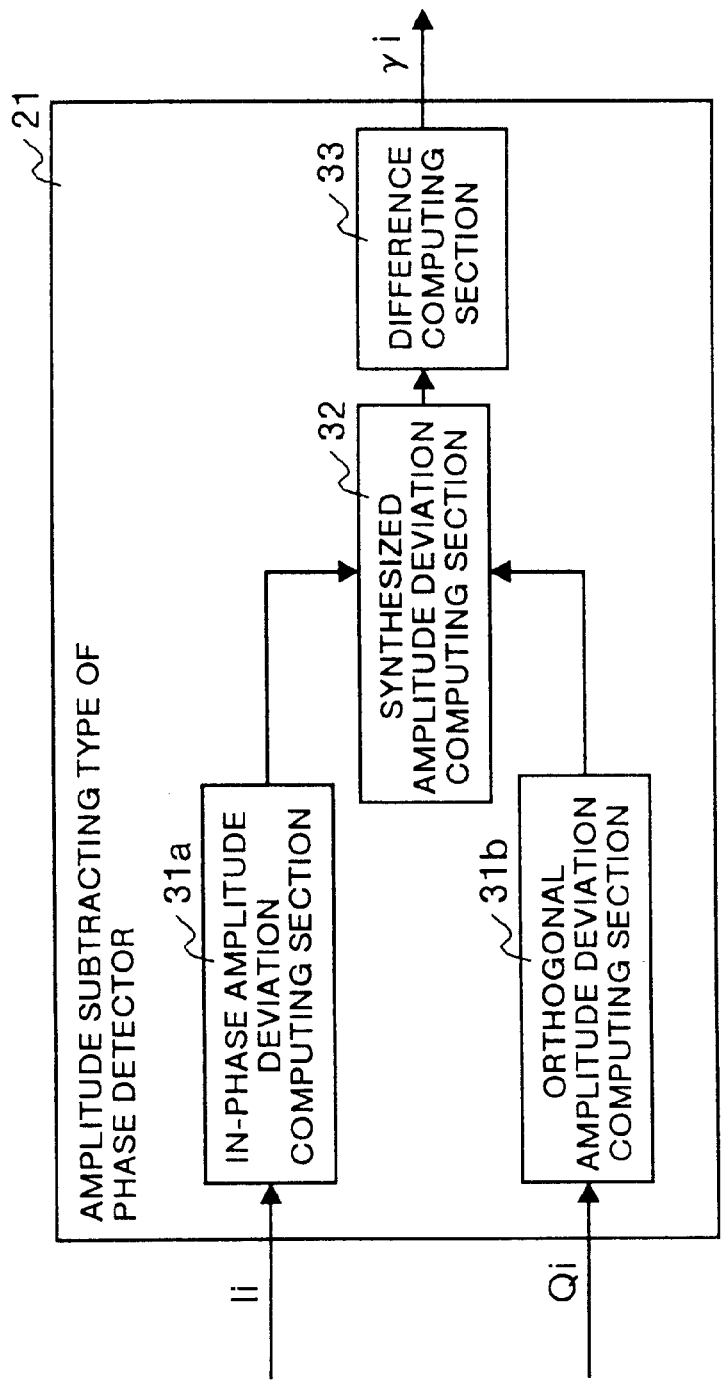
FIG. 6 is a view showing detailed configuration of an amplitude subtracting type of phase detector shown in FIG. 1.

As shown in FIG. 1, the timing recovery section 12 has an amplitude-subtracting type of phase detector 21, an averaging section 22, a phase controller 23, and a dichotomizing section 24. As shown in FIG. 6, the amplitude subtracting type of phase detector 21 has in-phase amplitude deviation computing section 31a, an orthogonal amplitude deviation computing section 31b, a synthesized amplitude deviation computing section 32, and a difference computing section 33.

The in-phase amplitude deviation computing section 31a computes an in-phase amplitude deviation $|I_i-I_{i-1}|$, which is an absolute value of deviation of an in-phase amplitude component data array $I_i$ sampled by the A/D converter 11a. The orthogonal amplitude deviation computing section 31b computes an orthogonal amplitude component deviation $|Q_i-Q_{i-1}|$, which is an absolute value of deviation of the orthogonal amplitude component data array $Q_i$ sampled by the A/D converter 11b. The sampling cycle is ½ of the symbol duration.

The synthesized amplitude deviation computing section 32 adds the in-phase amplitude deviation $|I_i-I_{i-1}|$ to the orthogonal amplitude deviation $|Q_i-Q_{i-1}|$, and computes the synthesized amplitude deviation $\beta3_i$ as expressed by the following equation (18).

$$\beta3_i=|I_i-I_{i-1}|+|Q_i-Q_{i-1}| \quad (18)$$

The data array for this synthesized amplitude deviation $\beta3_i$ is a data array corresponding to the absolute value signal 3(t).

The difference computing section 33 computes a phase detection data array $\gamma_i$ which is a difference expressed by the equation (19), to compute a average value of the synthesized amplitude deviation $\beta3_i$ corresponding to the equation (18), and outputs this phase detection data array $\gamma_i$ to the averaging section 22. Namely, $$\gamma_i=(\beta3_i-\beta3_{i-1})\times(-1)^i \quad (19)$$

When the absolute value signal $\beta1(t)$ is to be obtained, the in-phase amplitude deviation computing section 31a computes a square of the in-phase amplitude deviation $|I_i-I_{i-1}|$, which is an absolute value of deviation of the in-phase amplitude component data array $I_i$, and the orthogonal amplitude deviation computing section 31b computes a square of the orthogonal amplitude deviation $|Q_i-Q_{i-1}|$, which is an absolute value of deviation of the orthogonal amplitude component data array $Q_i$, while the synthesized amplitude deviation computing section 32 computes a square root of a value obtained by summing the squared values. Namely the synthesized amplitude deviation $\beta1_i$ as expressed by the following equation (20) is computed.

$$\beta1_i=(|I_i-I_{i-1}|^2+|Q_i-Q_{i-1}|^2)^{1/2} \quad (20)$$

Then the phase detection data array $\gamma_i$ according to equation (19) in which the synthesized amplitude deviation $\beta1_i$ is used in place of the synthesized amplitude deviation $\beta3_i$ may be computed and outputted to the averaging section 22.

When the absolute value signal $\beta2(t)$ is to be obtained, the in-phase amplitude deviation computing section 31a computes a square of the in-phase amplitude deviation $|I_i-I_{i-1}|$, which is an absolute value of deviation of the in-phase amplitude component data array $I_i$, the orthogonal amplitude deviation computing section 31b computes a square of the orthogonal amplitude deviation $|Q_i-Q_{i-1}|$, which is an absolute value of deviation of the orthogonal amplitude component data array $Q_i$, and the synthesized amplitude deviation computing section 32 sums the squared values. Namely, the synthesized amplitude deviation $\beta2_i$ as expressed by the following equation (21).

$$\beta2_i=(|I_i-I_{i-1}|^2+|Q_i-Q_{i-1}|^2)^{1/2} \quad (21)$$

Then the phase detection data array $\gamma_i$ according to equation (19) in which the synthesized amplitude deviation $\beta2_i$ is used in place of the synthesized amplitude deviation $\beta3_i$ may be computed and outputted to the averaging section 22.

More specifically, the averaging section 22 is realized with a random walk filter. The averaging section 22 averages the phase detection data array $\gamma_i(\tau)$, and outputs to the phase control section 23 a control signal $V_i \in \{1, 0, -1\}$ which can cancel the timing phase difference. Namely, when an average value of the phase detection data array $\gamma_i(\tau)$ is positive, the averaging section 22 according to the equation (17) outputs the control signal $V_i=1$ to the phase controller 23. When the average value of the phase detection data array $\gamma_i(\tau)$ is a negative, the averaging section 22 according to the equation (17) outputs the control signal $V_i=-1$ to the phase controller 23. Finally, when the average value of the phase detection data array 22 $\gamma_i(\tau)$ is zero, the averaging section 22 according to equation (17) outputs the control signal $V_i=0$ to the phase controller 23.

The averaging section 22 can realize rapid timing phase synchronization when receiving a preamble by making a timing constant smaller, for instance by decreasing a number of steps if a random walk filter is used. On the contrary, by making the time constant larger, for instance by increasing the number of steps if a random walk filter is used, the averaging section 22 can make the phase jitter lower when receiving a random pattern in a data section. Namely, the averaging section 22 can realize rapid timing phase synchronization or low phase jitter by controlling the time constant, or a number of steps when a random walk filter is used, according to characteristics of received data. For changing the time constant or a number of steps, it is allowable that a time constant or a number of steps is initially set to a smaller value for receiving a preamble and the time constant or the number of steps may be increased when a random pattern with established timing phase is received.

The phase controller 23 generates a sampling clock SK according to a value of the control signal $V_i$ inputted from the averaging section 22. Namely, when the control signal $V_i$ is 1, the phase control section 23 delays the phase of the sampling clock SK; when the control signal $V_i$ is −1, the phase control section 23 makes the sampling clock SK faster; and when the control signal $V_i$ is zero, the phase control section 23 maintains a phase of the sampling clock SK as it is. This phase-controlled sampling clock SK is supplied to the A/D converters 11a and 11b, so that the timing synchronicity is established.

The dichotomizer 24 dichotomizes the sampling clock SK with timing synchronicity controlled, generates a recovered symbol clock RC synchronized to the symbol clock, and outputs this recovered symbol clock RC to the Nyquist data extracting section 13 as well as to the decoder 4.

Figure 7:
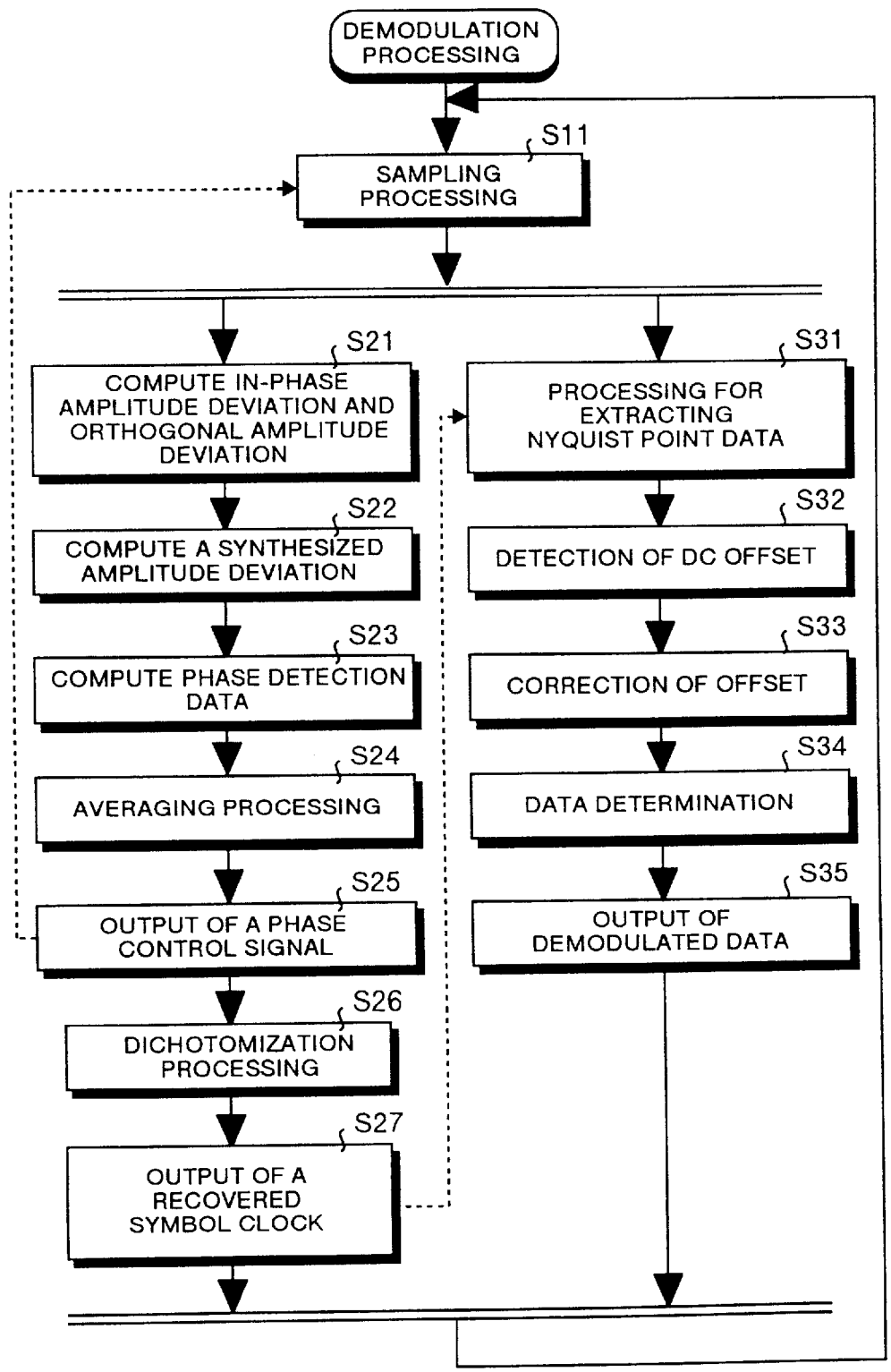
FIG. 7 is a flow chart showing a demodulation processing sequence executed by the demodulator shown in FIG. 1.

A series of operations for a demodulation processing in the demodulator 3 is explained with reference to the flow chart shown in FIG. 7. At first, the A/D converters 11a, 11b samples an in-phase component and an orthogonal component of a baseband signal inputted from the frequency converting section 2, and outputs the sampled in-phase amplitude component data arrays $I_i$ and orthogonal amplitude component data array $Q_i$ to the timing recovery section 12 and Nyquist data extracting section 13 (step S11). Then the timing recovery processing (step S21 to S27) and data determination processing (step S31 to S35) are executed concurrently.

In the timing recovery processing (step S21 to S27), at first the in-phase amplitude deviation converting section 31a computes the in-phase amplitude deviation $|I_i - I_{i-1}|$, and the orthogonal amplitude deviation computing section 31b computes the orthogonal amplitude component deviation $|Q_i - Q_{i-1}|$ (step S21). Further the synthesized amplitude deviation computing section 32 computes the synthesized amplitude deviation $\beta 3_i$ obtained by adding the in-phase amplitude deviation $|I_i - I_{i-1}|$ to the orthogonal amplitude component deviation $|Q_i - Q_{i-1}|$ (step S22). Then the difference computing section 33 computes the phase detection data array $\gamma_i$ from this synthesized amplitude deviation $\beta 3_i$ (step S23). Then the averaging section 22 computes an average value of the phase detection data array $\gamma_i$, and outputs a control signal $V_i$ for controlling the phase based on this average value to the phase controller 23 (step S24), while the phase control section 23 controls a phase of the sampling clock SK according to the control signal $V_i$ (step S25). This phase-controlled sampling clock SK is used as the sampling clock SK for the A/D converters 11a, 11b for sampling a subsequent data array in the baseband signal, thus timing synchronicity being established. Then, the dichotomizer 24 dichotomizes the phase-controlled sampling clock SK (step S26), outputs the sampling clock as a recovered symbol clock RC to the Nyquist data extracting section 13 as well as to the decoder 4, and then repeats the processing sequence described above.

On the other hand, the data determination processing (step S31 to step S35) is executed in parallel to the above mentioned timing recovery processing (step S21 to step S27). Namely, the Nyquist data extracting section 13 extracts data arrays $I_j$, $Q_j$ at the Nyquist point of the in-phase amplitude component data array $I_i$ and orthogonal amplitude component data array $Q_i$ (step S31), while the offset detector 14 outputs a DC offset component IDa for the in-phase component and a DC offset component QDa for an orthogonal component according to the data arrays $I_j$, $Q_j$ at the Nyquist point to the offset correcting section 15 (step S32). Then the offset correcting section 15 corrects DC offset for the data arrays $I_j$, $Q_j$ at the Nyquist point by subtracting the DC offset components IDa, QDa detected in the offset detector 14 from the data arrays $I_j$, $Q_j$ at the Nyquist point, and outputs the corrected data to the data determining section 16 (step S33). The data determining section 16 determines data in the data array with DC offset corrected therein by the offset correcting section 15 (step S34), outputs the data as demodulated data DA to the decoder 4 (step S35), and then repeats the processing sequence described above.

A timing phase of the sampling clock SK as well as of the recovered symbol clock RC has not been synchronized to that of a baseband signal when the demodulating processing is started. However, the timing phase synchronicity is established by repeating the processing sequence from step S21 to S27 described above, and when this timing phase synchronicity is established, demodulated data is correctly outputted through the data determination processing (step S31 to S35).

In Embodiment 1 of the present invention, it is assumed that the baseband signal is within an input range for the A/D converters 11a, 11b. However, the present invention can be applied also to a case where a baseband signal whose amplitude is amplified to a specified range with a limiter amplifier or the like in the frequency converting section 2.

Figure 8:
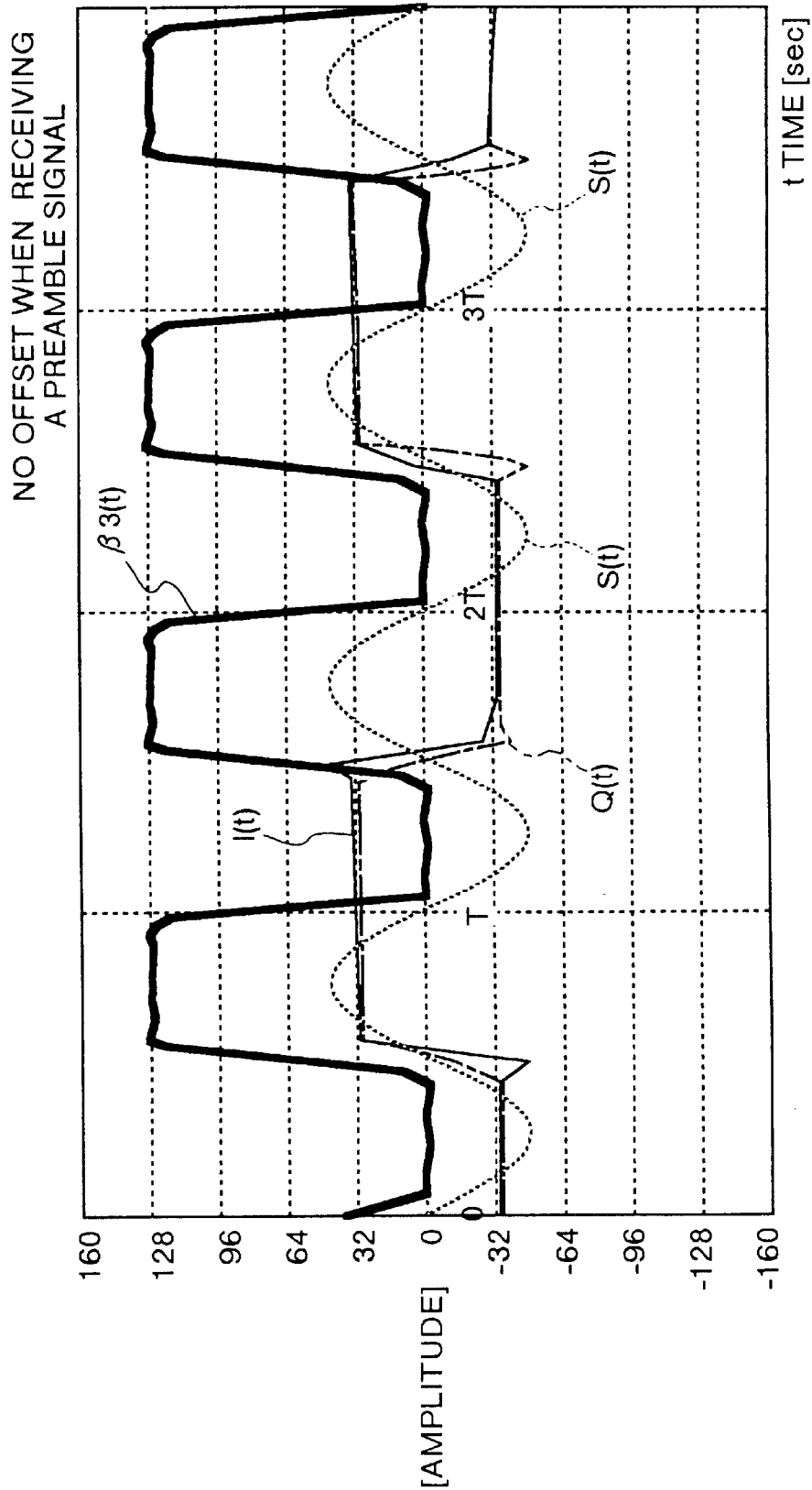
FIG. 8 is a view showing a temporal change in the in-phase amplitude component and an orthogonal amplitude component of a baseband signal not including a DC offset when receiving a preamble with the amplitude limited with a limiter amplifier and a temporal change in the synthesized amplitude deviation.
Figure 9:
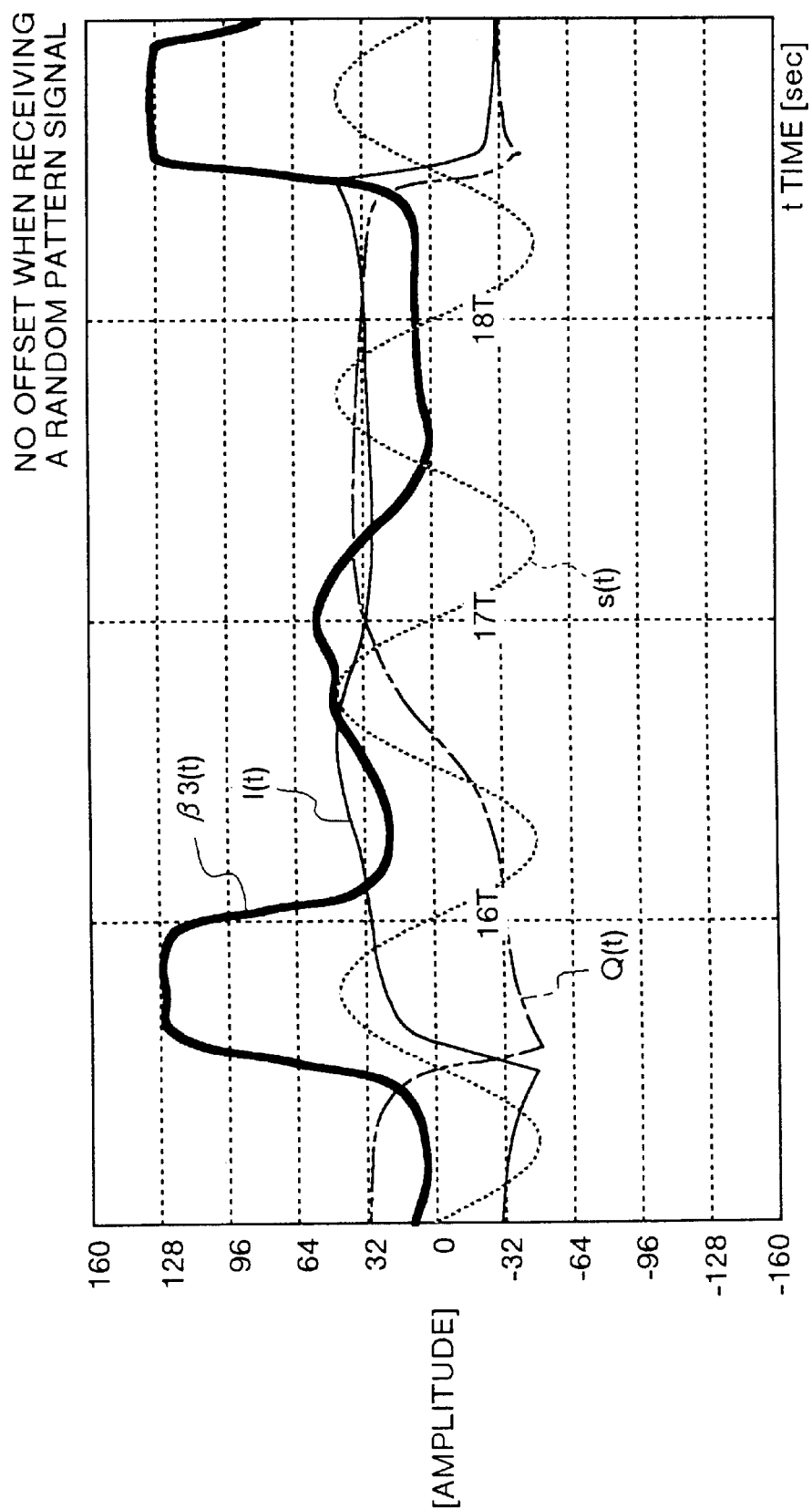
FIG. 9 is a view showing a temporal change in the in-phase amplitude component and an orthogonal amplitude component of a baseband signal not including a DC offset with the amplitude limited with a limiter amplifier when receiving a preamble and a temporal change in the synthesized amplitude deviation.

FIG. 8 and FIG. 9 are views each showing a temporal change in the absolute value signal $\beta 3(t)$ when a baseband signal inputted into the demodulator 3 is amplified to a specified amplitude with a limiter amplifier. FIG. 8 corresponds to FIG. 2 and shows a state where a preamble is received when the DC offset is not included in the baseband signal, while FIG. 9 corresponds to FIG. 3 and shows a state where a random pattern is received when the DC offset is not included in the baseband signal.

Also in FIG. 8 and FIG. 9, like in FIG. 2 and FIG. 3, symbol frequency component s(t) is included in the absolute value signal β3(t). Accordingly, even when a baseband signal inputted into the demodulator 3 according to Embodiment 1 described above is a signal whose amplitude is limited to a specified rage with a limiter amplifier or the like, the same demodulation processing like that in Embodiment 1 can be executed. Even when DC offset is appended thereto, the same processing can be executed without being affected by such a DC offset.

With Embodiment 1, the timing recovery section 12 detects a timing phase by computing the absolute value signal β3(t) including a symbol frequency component s(t) therein or absolute value signals β1(t), β2(t) each equivalent thereto according to information of an absolute value of an amplitude difference value between an in-phase amplitude component I(t) and an orthogonal amplitude component Q(t) each in the baseband signal, so that rapid timing phase synchronization when receiving a preamble or low phase jitter when receiving a random pattern in a data section can be realized regardless of whether the DC offset is present in a baseband signal or not, or whether an amplitude of the baseband signal is limited to a specified range or not.

Further, it is possible to acquire the absolute value signal β3(t) with a simple addition or subtraction, so that a circuit scale of the demodulator 3 can be reduced with size reduction being promoted. Further, time delay in a PLL feedback loop can be made smaller with high speed processing being enabled. Further, the processing is executed using information on an in-phase amplitude component and an orthogonal amplitude component of a baseband signal sampled at a speed two times higher than the symbol rate, so that operating speed two times higher than the symbol rate can be realized and the processing can easily be applied to a high speed radio communication system with a symbol rate of several tens MHz or more.

Further, the processing for timing phase synchronization and the processing for removing the DC offset are executed concurrently in the demodulator, so that, even if the DC offset is appended to a baseband signal, a period of time required until demodulation processing is executed correctly can be shortened, and as a result the transmission efficiency can be improved.

In Embodiment 1 above, absolute values β1(t) to β3(t) each including a symbol frequency component s(t) are acquired from an absolute value of a difference for a ½ symbol time interval as expressed by the equations (11) to (13), but the absolute values β1(t) to β3(t) maybe computed from an absolute value of a difference for a 1/n symbol time interval. It should be noted that n is a natural number of 2 or more. In this case, β11(t) corresponding to the absolute value β1(t) is expressed by the following equation (22):

$$\beta 11(t) = (|I(t) - I(t-T/n)|^2 + |Q(t) - Q(t-T/n)|^2)^{1/2} \quad (22)$$

β2(t) corresponding to the absolute value signal β2(t) is expressed by the following equation:

$$\beta 12(t) = (|I(t) - I(t-T/n)|^2 + |Q(t) - Q(t-T/n)|^2)^2 \quad (23)$$

Further β13(t) corresponding to the absolute value β3(t) is expressed by the following equation:

$$\beta 12(t) = |I(t) - I(t-T/n)| + |Q(t) - Q(t-T/n)| \quad (24)$$

The demodulation processing using the absolute value signals β11(t) to β13(t) can be realized by using a received baseband signal sampled for n times for each one symbol duration and applying the absolute value signals β11(t) to β13(t) each changing at a cycle of 1/n of the symbol duration to the equation (15).

Further, in Embodiment 1, the average value $M[\Delta\beta 3(tb) \times (-1)^i]$ is used, but it is needless to say that the average value $M[\Delta\beta 3(tb)]$ may be used.

Further, in Embodiment 1, configuration of a receiver in a communication system using the QPSK modulation system was described as an example, but the configuration is not limited to this one, and the present invention can be applied to a receiver based on a modulation system in which a deviation of a baseband signal becomes on an average moderate near an Nyquist point time and becomes sharp in ½ times of a symbol duration from the Nyquist point such as the BPSK modulation system, π/4 shift QPSK modulation system, or FSK modulation system.

In Embodiment 1, description was made assuming use of all bits in the sampled in-phase amplitude component data array $I_i$ and sampled orthogonal amplitude component data array $Q_i$, but configuration is not limited this one, and the processing may be executed using only upper n (n≧1) bits in each of the in-phase amplitude component data array $I_i$ and orthogonal amplitude component data array $Q_i$. Even if only the upper bits are used, high speed processing can be executed at a substantially similar precision level.

Next, Embodiment 2 of the present invention is described. In the above Embodiment 1, a phase inversion phenomenon of the absolute value signal β3(t) is stochastically removed by averaging the phase detection data array $\gamma_i$ with the averaging section 22. However in Embodiment 2 explained below, the phase inversion phenomenon is detected and is removed without fail by providing a weightage so that the absolute value signal β(t) when a phase inversion phenomenon is removed when this phenomenon is generated.

Figure 10:
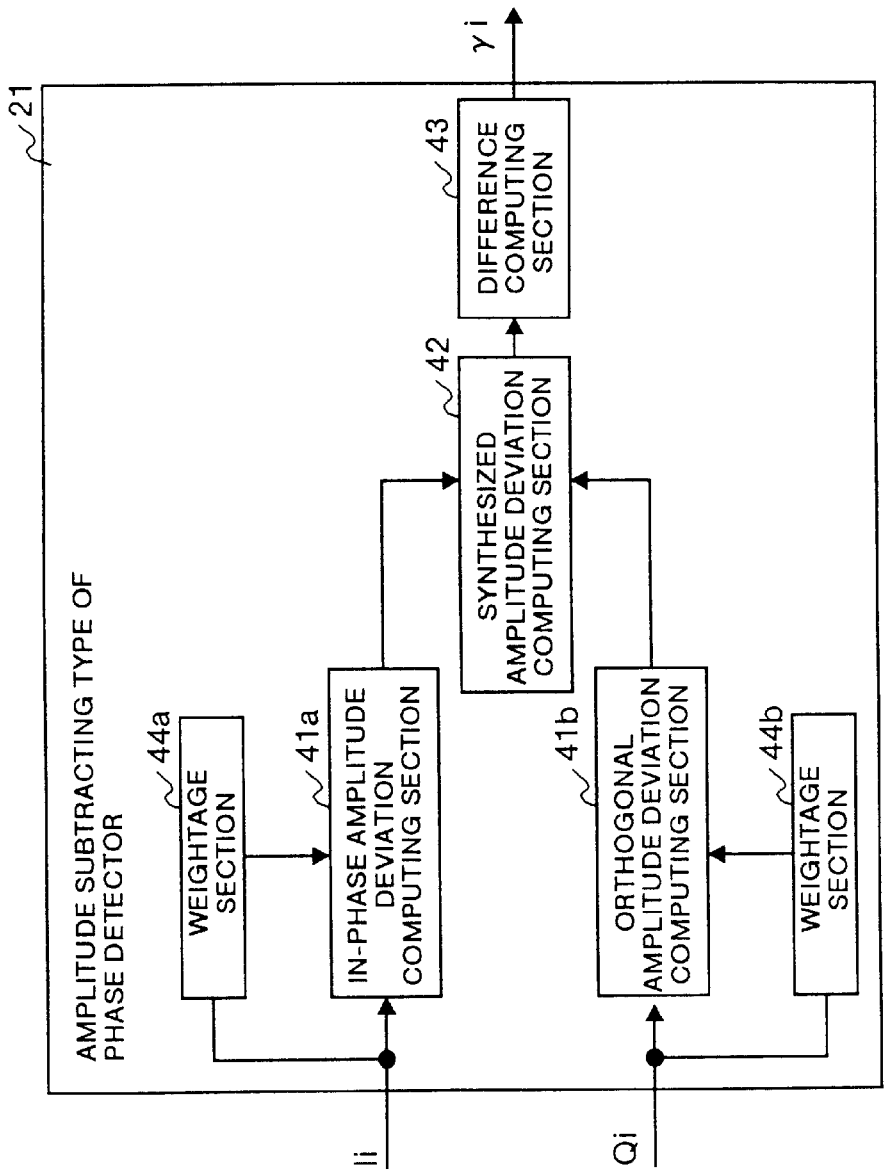
FIG. 10 is a view showing detailed configuration of an amplitude subtracting type of phase detector in a receiver having a demodulator according to Embodiment 2 of the present invention.

FIG. 10 is a block diagram showing configuration of the amplitude subtracting type of phase detector 21 according to Embodiment 2 of the present invention. The configuration other than this amplitude subtracting type of phase detector 21 is the same as that of Embodiment 1 shown in FIG. 1.

In FIG. 10, an in-phase amplitude deviation computing section 41a computes an in-phase amplitude deviation, which is an absolute value of a deviation of the in-phase amplitude component $I_i$ sampled by the A/D converter 11a, while an orthogonal amplitude deviation computing section 41b computes an orthogonal amplitude component deviation, which is an absolute value of a deviation of the orthogonal amplitude component deviation data array $Q_i$ sampled by the A/D converter 11b. The sampling cycle is ½ of the symbol duration.

A weightage section 44a computes an in-phase symbol time deviation $\delta I_i$ as expressed by the following equation (25) according to the in-phase amplitude data array $I_i$:

$$\delta I_i = |I_i - I_{i-2}| \text{ when } i=0, 2, 4 \ldots$$

$$\delta I_i = \delta I_{i-1} \text{ when } i=1, 3, 5 \ldots \quad (25)$$

On the other hand, the weightage section 44b computes the orthogonal amplitude symbol time deviation $\delta Q_i$ as expressed the following expression (26):

$$\delta Q_i = |Q_i - Q_{i-2}| \text{ when } i0, 2, 4 \ldots$$

$$\delta Q_i = \delta Q_{i-1} \text{ when } i=1, 3, 5 \ldots \quad (26)$$

Then the weightage section 44a provides weightage by multiplying the in-phase amplitude deviation $|I_i - I_{i-1}|$ computed by the in-phase amplitude deviation computing section 41a by the in-phase amplitude symbol time deviation $\delta I_i$, while the weightage section 44b provides weightage by multiplying the in-phase amplitude deviation $|Q_i - Q_{i-1}|$ computed by the orthogonal amplitude deviation computing section 41b by the orthogonal amplitude symbol time deviation $\delta Q_i$.

A synthesized amplitude deviation computing section 42 computes a synthesized amplitude deviation $\beta 23_i$ as expressed by the following equation (27) by adding the in-phase amplitude deviation $\delta I_i \times |I_i - I_{i-1}|$ and orthogonal amplitude deviation $\delta Q_i \times |Q_i - Q_{i-1}|$.

$$\beta 23_i = \delta I_i \times |I_i - I_{i-1}| + \delta Q_i \times |Q_i - Q_{i-1}| \qquad (27)$$

This synthesized amplitude deviation $\beta 23_i$ is similar to the data array for synthesized amplitude deviation $\beta 3_i$ described in Embodiment 1, and $\delta I_i$ or $\delta Q_i$ becomes zero when signal shift does not occur within one symbol, and as a result the in-phase amplitude deviation $|I_i - I_{i-1}|$ or orthogonal amplitude deviation $|Q_i - Q_{i-1}|$ when signal shift does not occur is removed.

A difference computing section 43 computes a phase detection data array $\gamma_i$ by applying the equation (19) to this synthesized amplitude deviation $\beta 23_i$. Accordingly, information when a phase inversion phenomenon occurs is not reflected to the averaging processing in the averaging section 22, and as a result low phase jitter can be realized.

When a data array for the synthesized amplitude deviation $\beta 1_i$ in Embodiment 1 is to be calculated, the synthesized amplitude deviation computing section 42 computes a synthesized amplitude deviation $\beta 21_i$ as expressed by the following equation (28):

$$\beta 21_i = (\delta I_i \times |I_i - I_{i-1}|^2 + \delta Q_i \times |Q_i - Q_{i-1}|^2)^{1/2} \qquad (28)$$

Similarly, when the a data array of the synthesized amplitude deviation $\beta 2_i$ in Embodiment 1 is to be calculated, the synthesized amplitude deviation computing section 42 computes the synthesized amplitude deviation $\beta 22_i$ as expressed by the following equation (29).

$$\beta 22_i = \delta I_i \times |I_i - I_{i-1}|^2 + \delta Q_i \times |Q_i - Q_{i-1}|^2 \qquad (29)$$

Also the processing for operations of the in-phase amplitude symbol time deviation $\delta I_i$ and orthogonal amplitude symbol time deviation $\delta Q_i$ may be simplified to make smaller a scale of the processing circuit as well as to realize high speed processing. Namely a data array $IH_i$ (i=1, 2, 3 . . . ) obtained through two-value determination of the in-phase amplitude symbol $\delta I_i$ is defined as expressed by the following equation (30):

$$IH_i = 1 (\delta I_i \geq \epsilon)$$

$$IH_i = 0 (\delta I_i < \epsilon) \qquad (30)$$

and a data array $QH_i$ (i=1, 2, 3 . . . ) obtained through two-value determination of the orthogonal amplitude symbol $\delta Q_i$ is defined as expressed by the following equation (31):

$$QH_i = 1 (\delta I_j \geq \epsilon)$$

$$QH_i = 0 (\delta I_j < \epsilon) \qquad (31)$$

Herein $\epsilon$ is a preset threshold value. When the data array $IH_i$ or data array $QH_i$ is zero, it indicates that signal shift does not occur in one symbol, and that the phase inversion phenomenon has occurred.

The weightage sections 44a, 44b give weightage to the in-phase amplitude deviation $|I_i - I_{i-1}|$ and orthogonal amplitude deviation $|Q_i - Q_{i-1}|$ using the data arrays $IH_i$ and $QH_i$. To expressed in the same way as in the equations (27) to (29), the synthesized amplitude deviations $\beta 1_i$ to $\beta 3_i$ are expressed by the following equations (32) to (34). Namely, $$\beta 33_i = IH_i \times |I_i - I_{i-1}| + QH_i \times |Q_i - Q_{i-1}| \qquad (32)$$

$$\beta 31_i = (IH_i \times |I_i - I_{i-1}|^2 + QH_i \times |Q_i - Q_{i-1}|^2)^{1/2} \qquad (33)$$

$$\beta 32_i = IH_i \times |I_i - I_{i-1}|^2 + QH_i \times |Q_i - Q_{i-1}|^2 \qquad (34)$$

The difference computing section 43 generates a phase detection data array yi using the synthesized amplitude deviations $\beta 1_i$ to $\oplus 3_i$ weighted according to the data arrays $IH_i$ and $QH_i$ having been subjected to two-valued determination, and outputs the phase detection data $\gamma_i$ to the averaging section 22.

Figure 11:
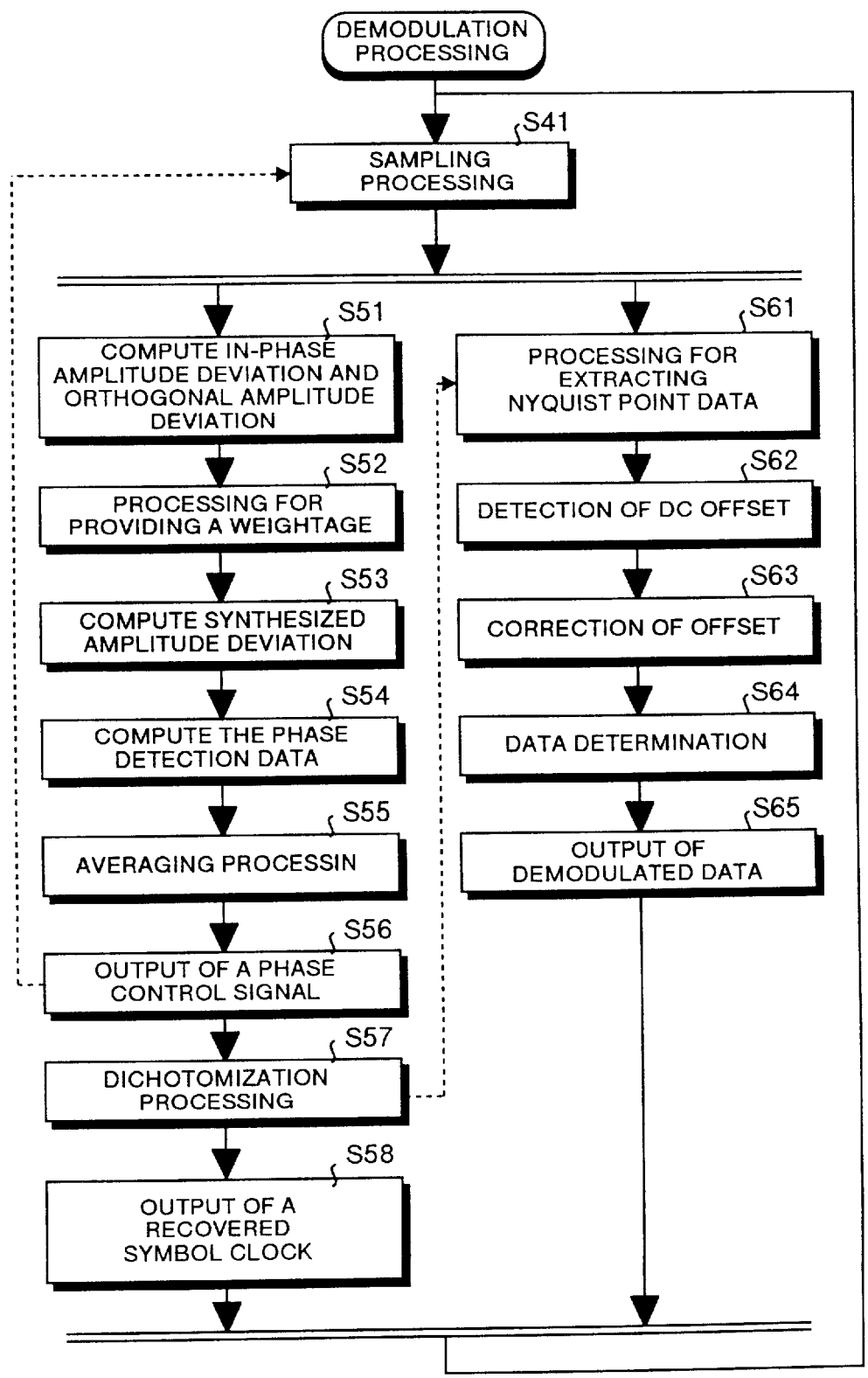
FIG. 11 is a flow chart showing a demodulation processing sequence executed by the demodulator according to Embodiment 2.

A series of operations for a demodulation processing in the demodulator 3 is explained with reference to the flow chart shown in FIG. 11. At first, the A/D converters 11a, 11b samples an in-phase component and an orthogonal component of a baseband signal inputted from the frequency converting section 2 according to a sampling clock SK, and outputs the sampled in-phase amplitude component data array $I_i$ and orthogonal amplitude component data array $Q_i$ to the timing recovery section 12 as well as to the Nyquist data extracting section 13 (step S41). Then the timing recovery processing (step S51 to step S58) by the timing recovery section 12 and the data determination processing (step S61 to step S65) are executed concurrently.

In the timing recovery processing (step S51 to step S58), at first the in-phase amplitude deviation computing section 41a computes an in-phase amplitude deviation $|I_i - I_{i-1}|$, and the orthogonal amplitude deviation $|Q_i - Q_{i-1}|$ (step S51). Then, the eightage sections 44a, 44b provide weightage to the in-phase amplitude deviation $|I_i - I_{i-1}|$ and orthogonal amplitude deviation $|Q_i - Q_{i-1}|$ according to the in-phase amplitude symbol time deviation $\delta I_i$ and orthogonal amplitude symbol time deviation $\delta Q_i$ respectively (step S52). Further, the synthesized amplitude deviation computing section 42 computes a synthesized amplitude deviation $\beta 23_i$ by adding the weighted in-phase amplitude deviation $\delta I_i \times |I_{i-1}|$ and orthogonal amplitude deviation $\delta Q_i \times |Q_i - Q_{i-1}|$ (step S53). Then the difference computing section 43 computes the phase detection data array $\gamma_i$ from the synthesized amplitude deviation $\beta 23_i$ (step S54). Then the average section 22 computes an average value of the phase detection data array $\gamma_i$, and outputs a control signal $V_i$ for controlling the phase based on this average value (step S55), while the phase controller 23 provides phase control for the sampling clock SK according to this control signal $V_i$ (step S56). This phase-controlled sampling clock SK is used as a sampling clock SK for the A/D controllers 11a, 11b each for sampling subsequent data arrays in the baseband signal, so that timing synchronicity is established.

On the other hand, the data determination processing (step S61 to step S65) is executed in parallel to the timing recovery processing (step S51 to step S58). Namely, the Nyquist data extracting section 13 extracts data arrays $I_j$, $Q_j$ for the in-phase amplitude component data array $I_i$ and orthogonal amplitude component data array $Q_i$ (step S61), while the offset detector 14 outputs a DC offset component IDa for an in-phase component and a DC offset component ODa for an orthogonal component to the offset correcting section 15 according to the data arrays $I_j$, $Q_j$ at the Nyquist point (step S62). Then the offset correcting section 15 corrects the DC offset for each of the data arrays $I_j$, $Q_j$ at the Nyquist point by subtracting the DC offset components IDa, QDa detected by the offset detector 14 from the data arrays $I_j$, $Q_j$ at the Nyquist point, and outputs the corrected values to the data determining section 16 (step S63). Further the data determining section 16 makes data determinations for the data arrays with the DC offset corrected by the offset correcting section 15 (step S64), outputs the corrected data as demodulated data DA to the decoder 4 (step S35), and repeats the processing described above.

When the demodulation processing described above is started, synchronicity in a timing phase has not been established between the sampling clock SK and recovered symbol clock RC each in a baseband signal, but the timing phase synchronicity is established by repeating the processing from step S51 to step S58. When the timing phase synchronicity is established, also demodulated data is outputted correctly through the data determination processing (step S61 to step S65).

The possibility of not occurring of a signal shift in one symbol is only in a data section, namely only when receiving a random pattern, so that the weightage processing may be executed only when receiving a random pattern. Namely, a step for determining whether the weighting processing is to be executed or not in step S52 may be provided, and the weighting processing may not be executed when receiving a preamble and is executed only when receiving a random pattern.

With Embodiment 2, in addition to the effects in Embodiment 1, phase jitter can further be reduced when receiving a random pattern and the demodulation processing which can further reduce degradation timing error can be executed.

Next, Embodiment 3 of the present invention is described. In the above Embodiment 2, an absolute value signal $\beta 3(t)$ causing the phase inversion phenomenon is deleted by providing a weightage with the weightage sections 44a, 44b. However, in Embodiment 3 explained below, a value of an absolute value signal $\beta 3(t)$ when the phase inversion phenomenon occurs is effectively utilized.

Figure 12:
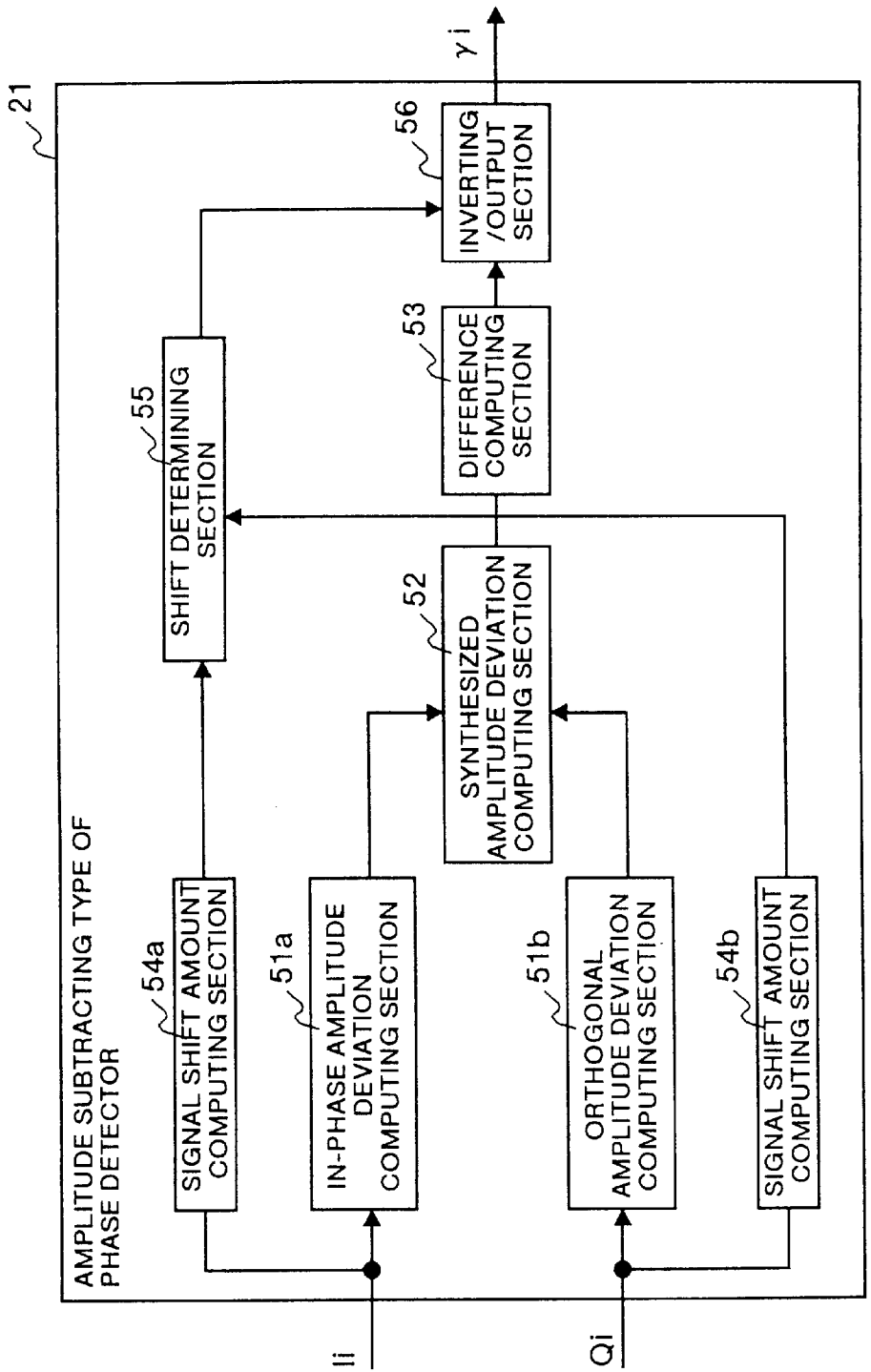
FIG. 12 is a view showing detailed configuration of an amplitude subtracting type of phase detector in a demodulator according to Embodiment 3 of the present invention.

FIG. 12 is a block diagram showing configuration of the amplitude subtracting type of phase detector 21 according to Embodiment 3 of the present invention. The configuration other than this amplitude subtracting type of phase detector 21 are the same as those in Embodiment 1 shown in FIG. 1.

In FIG. 12, an in-phase amplitude deviation computing section 51a computes the in-phase amplitude deviation $|I_i - I_{i-1}|$ which is an absolute value of a deviation of the in-phase amplitude component data array $I_i$ sampled by the A/D converter 11a, while the orthogonal amplitude deviation computing section 51b computes the orthogonal amplitude component deviation $|Q_i - Q_{i-1}|$ which is an absolute value of a deviation of the orthogonal amplitude component data array $Q_i$ sampled by the A/D converter 11b. The sampling cycle is ½ of one symbol duration.

The synthesized amplitude deviation computing section 52 computes the synthesized amplitude deviation $\beta 3_i$ as expressed by the equation (18) by adding the in-phase amplitude deviation $|I_i - I_{i-1}|$ computed by the in-phase amplitude deviation computing section 51a to the orthogonal amplitude deviation $|Q_i - Q_{i-1}|$ computed by the orthogonal amplitude deviation computing section 51b.

The difference computing section 53 computes the phase detection data array $\gamma_i = (\beta 3_i - \beta 3_{i-1}) \times (-1)^i$ expressed by the equation (19) according to the data array for the synthesized amplitude deviation $\beta 3_i$.

On the other hand, the signal shift amount computing section 54a computes, like the weightage section 44a, the in-phase e amplitude symbol time deviation $\delta I_i$ as expressed by the equation (25) from the in-phase amplitude component data array $I_i$, and outputs a result of computing to a shift determining section 55. Also the signal shift amount computing section 54b computes, like the weightage section 44b, the orthogonal amplitude symbol time deviation $\delta Q_i$ as expressed by the equation (26) from the orthogonal amplitude component data array $Q_i$, and outputs a result of computing to the shift determining section 55.

The shift determining section 55 makes determination of shift as expressed by the equation (35) according to the in-phase symbol time deviation $\delta I_i$ and the orthogonal amplitude symbol time deviation $\delta Q_i$ outputted from the signal shift amount computing sections 54a, 54b respectively. Namely:

$$H_i = 1 \text{ when } \delta I_i \geq \epsilon \text{ or } \delta Q_i \geq \epsilon$$

$$H_i = 0 \text{ when } \delta I_i < \epsilon \text{ and } \delta Q_i < \epsilon \tag{35}$$

It should be noted that $\epsilon$ indicates a preset threshold value. When a result of determination indicates that $H_i$ is equal to zero, it indicates a state where signal shift does not occur and a phase inversion phenomenon has occurred.

An inverting/output section 56 outputs the phase detection data array $\gamma_i$ as expressed by the following equation (36) in an inverted form or in a not-inverted form according to a result of determination by the shift determining section 55. Namely:

$$\gamma_i = (\beta 3_i - \beta 3_{i-1}) \times (-1)^i \text{ when } H_i = 1$$

$$\gamma_i = -(\beta 3_i - \beta 3_{i-1}) \times (-1)^i \text{ when } H_i = 0 \tag{36}$$

Thus, the phase detection data array $\gamma_i$ outputted from the inverting/output section 56 always includes a signal frequency component s(t).

It should be noted that the synthesized amplitude deviation computing section 52 may compute the synthesized amplitude deviation $\beta 1_i$ as expressed by the equation (20), or the synthesized amplitude deviation $\beta 2_i$ as expressed by the equation (21).

Figure 13:
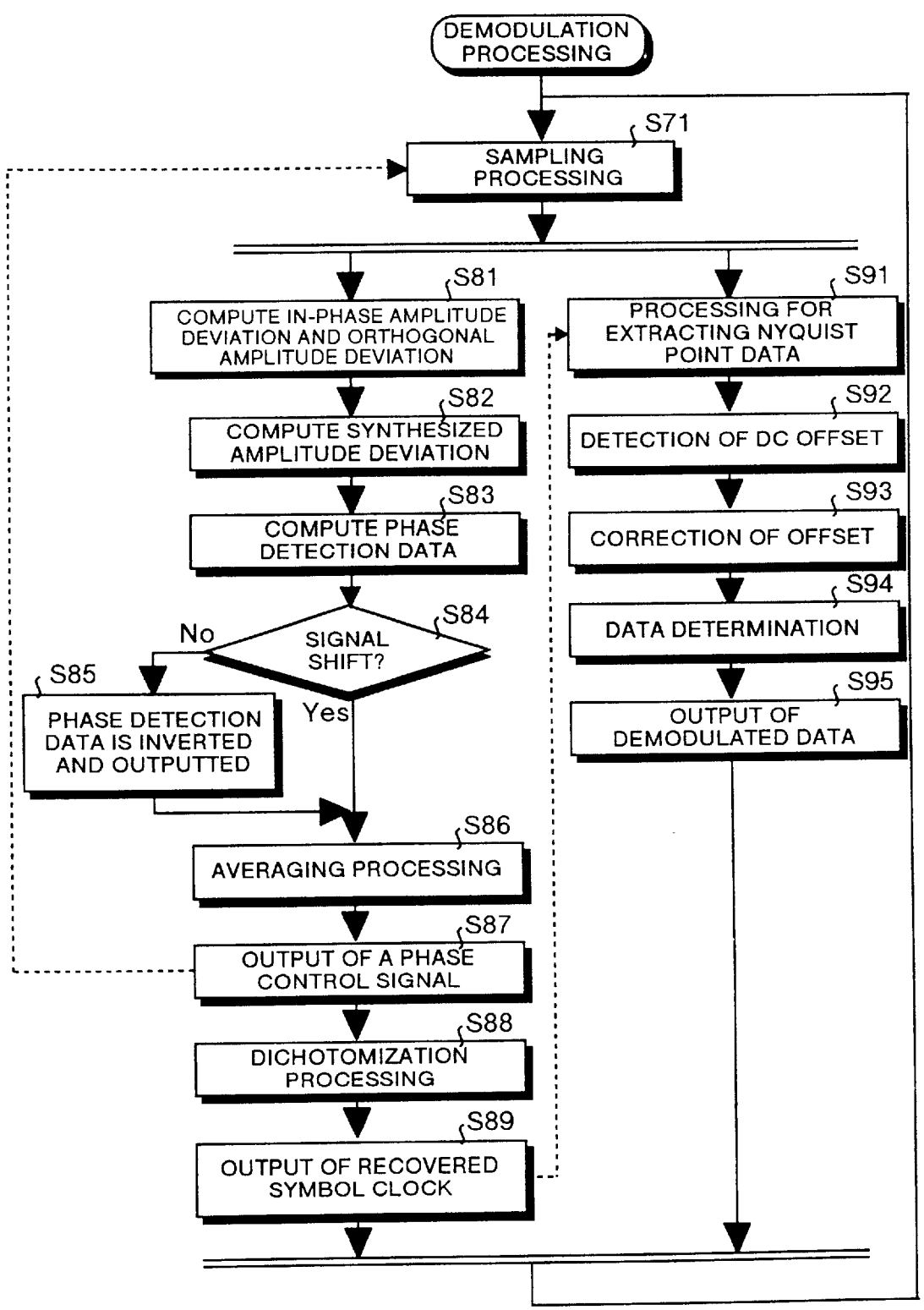
FIG. 13 is a flow chart showing the demodulation processing sequence executed by the demodulator according to Embodiment 3.

A series of operations for demodulation processing in the demodulator 3 are explained with reference to the flow chart shown in FIG. 13. At first the A/D converters 1a, 11b samples an in-phase component and an orthogonal component of a base band inputted from the frequency converter 2 according to the sampling clock SK, and outputs the sampled in-phase amplitude component data array $I_i$ and the sampled orthogonal amplitude component data array $Q_i$ to the timing recovery section 12 as well as to the Nyquist data extracting section 13 (step S71). Then the timing recovery processing (step S81 to step S89) by the timing recovery section 12 and data determination processing (step S91 to step S95) are executed concurrently.

In the timing recovery processing (step S81 to step S89), at first the in-phase amplitude deviation computing section 51a computes the in-phase amplitude deviation $|I_i - I_{i-1}|$, and the orthogonal amplitude deviation computing section 51b computes the orthogonal amplitude deviation $|Q_i - Q_{i-1}|$ (step S81) Further the synthesized amplitude deviation computing section 52 computes the synthesized amplitude deviation $\beta 3_i$ by adding the in-phase amplitude deviation $|I_i - I_{i-1}|$ to the orthogonal amplitude deviation $|Q_i - Q_{i-1}|$ (step S82). Further the difference computing section 52 computes the phase detection data array $\gamma_i$ from the synthesized amplitude deviation $\beta 3_i$ (step S83).

On the other hand, the signal shift amount computing sections 54a and 54b compute the in-phase amplitude symbol time deviation $\delta I_i$ and orthogonal amplitude symbol time deviation $\delta Q_i$. The shift determining section 55 makes determination as to whether a signal shift has occurred or not according to a result of computation above (step S84). When it is determined that a signal shift has not occurred (step S84, negative), the inverting/output section 56 outputs the phase detection data array $\gamma_i$ in an inverted form to the averaging section 22 (step S85), and when it is determined that a signal shift has occurred (step S84, affirmative), the inverting/output section 56 outputs the phase detection data array $\gamma_i$ in the not-inverted form to the averaging section 22.

The averaging section 22 computes an average value of the phase detection data array $\gamma_i$ and outputs a control signal $V_i$ for controlling the phase based on this average value to the phase controller 23 (step S86). The phase controller 23 provides phase control over the sampling clock SK according to the control signal $V_i$ (step S87). This phase-controlled sampling clock SK is used as the sampling clock SK for the A/D converters 11a and 11b for sampling subsequent data arrays in the base band signal, so that timing synchronicity is established. Then the dichotomizer 24 dichotomizes the phase-controlled sampling clock SK (step S88), outputs the dichotomized sampling clock SL as a recovered clock RC to the Nyquist data extracting section 13 and decoder 4 (step S89), and repeats the processing described above.

On the other hand, in parallel to the timing recovery processing (step S81 to step S89), data determination processing (step S91 to step S95) is executed. Namely, the Nyquist data extracting section 13 extracts data arrays $I_j$, $Q_j$, at the Nyquist points of the in-phase amplitude component data array $I_i$ and orthogonal amplitude component data array $Q_i$ at a timing of the recovered sampling clock RC (step S91), and the offset detector 14 outputs a DC offset component IDa of an in-phase component and a DC offset component QDa of an orthogonal amplitude component of the data arrays $I_j$, $Q_j$ at the Nyquist points to the offset correcting section 15 (step S92). Then the offset correcting section 15 corrects DC offsets of the data arrays $I_j$, $Q_j$ at the Nyquist points by subtracting the DC offset components IDa and QDa detected in the offset detector 14 from the data arrays $I_j$, $Q_j$ at the Nyquist points, and outputs the corrected data to the data determining section 16 (step S93). Further, the data determining section 16 determines data of the data arrays having been subjected to DC offset correction by the offset correcting section 15 (step S94) and outputs the corrected data as demodulated data DA to the decoder 4 (step S95). Then the same processing sequence described above is repeated.

When the demodulation processing is started, timing phase synchronicity is yet to be established between the sampling clock SK and recovered symbol clock RC in a baseband signal. However, the timing phase synchronicity is established by repeating the processing sequence from step S81 to step S89, and when the timing phase synchronicity has been established, the data determination processing (step S91 to S95) is correctly executed and the demodulated data is outputted.

The possibility of not occurring of a signal shift in one symbol is only in a data section, namely only when receiving a random pattern, so that the determination for signal shift may be performed only when receiving a random pattern.

With Embodiment 3 of the present invention, when the phase inversion phenomenon occurs, the phase detection data array $\gamma_i$ is outputted in an inverted form, so that, in addition to the effects provided in Embodiment 1 and Embodiment 2, all of the phase detection data arrays $\gamma_i$ can be used for timing phase control, and degradation of BER due to a timing phase error can further be reduced.

Next, Embodiment 4 of the present invention is described. In any of Embodiments 1 to 3 described above, a timing phase of the sampling clock SK is controlled by means of feedback control by the phase controller 23. However, in Embodiment 4 described below, the timing phase control and generation of the recovered symbol clock are executed by means of forward control using a free clock.

Figure 14:
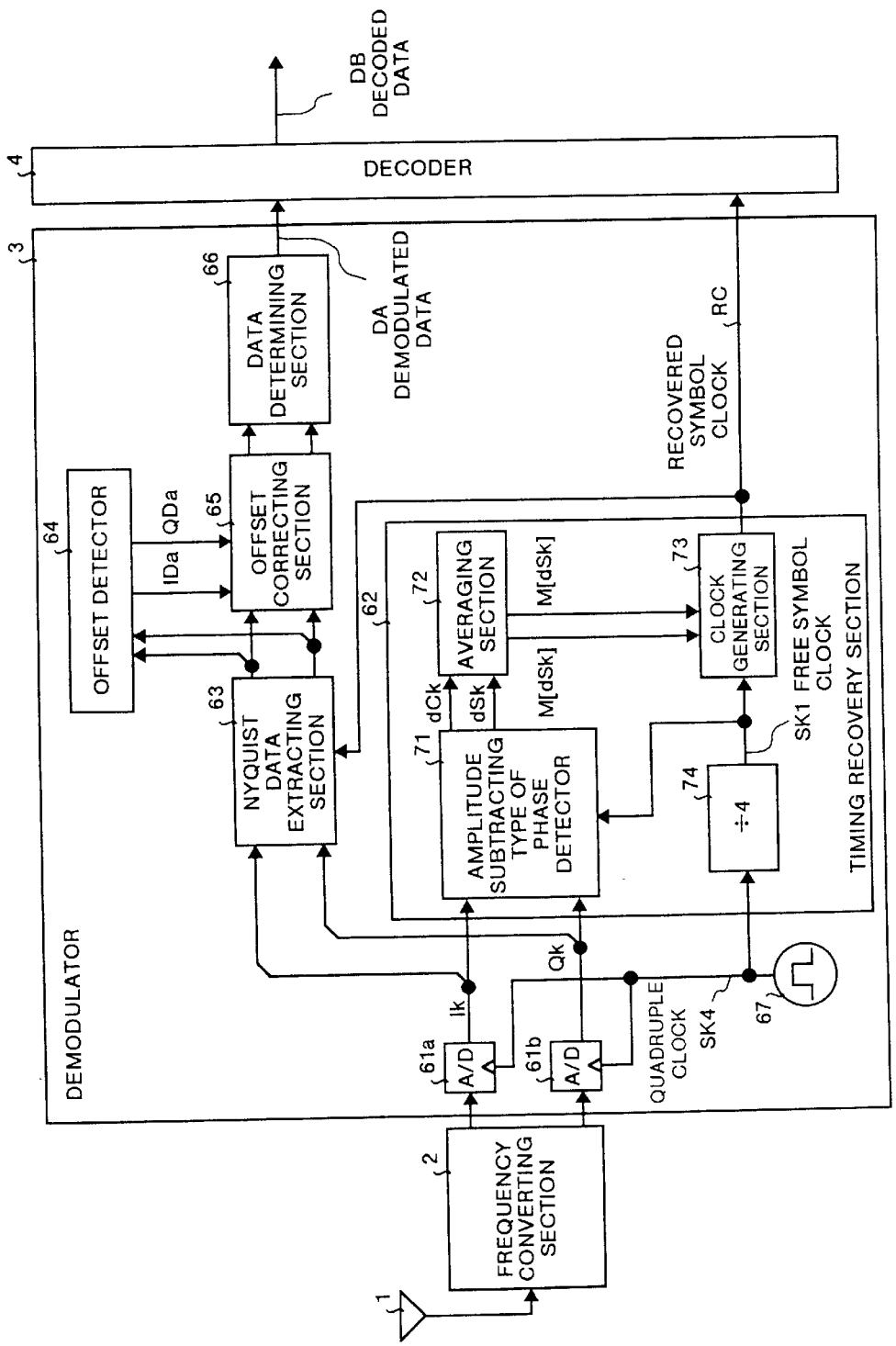
FIG. 14 is a view showing a general configuration of a receiver having a demodulator according to Embodiment 4 of the present invention; and especially shows detailed configuration of a demodulator employed in this receiver.

FIG. 14 is a view showing a general configuration of a receiver having a demodulator according to Embodiment 4 of the present invention, and especially shows detailed configuration of the demodulator employed in this receiver.

In FIG. 14, the antenna 1 receives an RF signal including a QPSK modulation signal, while the frequency converting section 2 subjects this RF signal to such processing as amplification, band restriction, and frequency conversion, and outputs a baseband signal comprising an in-phase component and an orthogonal component to the demodulator 3.

A/D converters 61a, 61b of the demodulator 3 sample an in-phase component and an orthogonal component of a baseband signal at the time $t=\gamma+kT/4$ according to a quadruple clock SK4 generated by a free clock generating section 67 respectively, and output sampled in-phase amplitude component data array $I_k$ and orthogonal amplitude component data array $Q_k$ to a timing recovery section 62 and a Nyquist data extracting section 63. Herein T indicates a symbol duration and $\tau$ indicates a timing error in a range of $-T/2 \leq \tau \leq T/2$. Here k is a natural number such as 1, 2, 3, ... It should be noted that sampling by the A/D converters 61a, 61b is executed at a first transitional edge of the quadruple clock SK4. Further, as sampling by the A/D converters 61a, 61b is executed at a first transitional edge of the quadruple clock SK4, the sampled in-phase amplitude component data array $I_k$ and orthogonal amplitude component data array $Q_k$ do not always contain data at the Nyquist points. In Embodiments 1 to 3, the sampled in-phase amplitude component data array $I_k$ and orthogonal amplitude component data array $Q_k$ after the timing phase synchronicity has been established through the timing recovery processing always contain data arrays sampled at the Nyquist point time.

The timing recovery section 62 computes a timing phase difference between the in-phase amplitude component data array $I_k$ and orthogonal amplitude component data array $Q_k$ outputted from the A/D converters 61a, 61b and a free symbol clock SK1 obtained by quartering the quadruple clock SK4 generated from the free clock generating section 67, and generates the recovered symbol clock RC using this timing phase difference.

The Nyquist data extracting section 63 interpolates the data arrays $I_j$, $Q_j$ by using the in-phase amplitude component data array $I_k$ and orthogonal amplitude component data array $Q_k$ sampled according to the quadruple clock SK4 and the recovered symbol clock RC outputted from the timing recovery section 62, and outputs the interpolated data arrays. It should be noted herein that j is a natural number such as 1, 2, 3, ...

In the interpolation by this Nyquist data extracting section 63, at first, assuming that time for a first transitional edge of the recovered symbol clock RS is ta, of the in-phase amplitude component data array $I_k$ and orthogonal amplitude component data array $Q_k$, data $I_m$, $Q_m$, $I_{m+1}$, $Q_{m+1}$ corresponding to the natural number m satisfying the following expression (37). Namely, data $I_m$, $Q_m$, $I_{m+1}$, $Q_{m+1}$ satisfying the equation, $$\tau+mT/4 \leq ta < \tau+(m+1) \times T/4 \qquad (37)$$

is selected.

Then the Nyquist data extracting section 63 computes the data arrays $I_j$, $Q_j$ by means of interpolation from the data $I_m$, $Q_m$, $I_{m+1}$, $Q_{m+1}$ as well as from the time of first transition of the recovered symbol clock RC. Namely, the Nyquist data extracting section 63 computes the data arrays $I_j$, $Q_j$ at the Nyquist points by executing primary interpolation as expressed by the following equations:

$$I_j = I_m + (I_{n+1} + I_m) \times (ta - \tau + mT/T)/(T/4)$$

$$Q_j = Q_m + (Q_{m+1} + Q_m) \times (ta - \tau + mT/T)/(T/4) \tag{38}$$

The offset detector 64 detect5 DC offset components IDa, QDa from the extracted data arrays $I_j$, $Q_j$ at the Nyquist points respectively, and outputs the detected DC offset components IDa, QDa to the offset correcting section 65. The DC offset components IDa, QDa can be detected by using a low-pass filter, and detection of the DC offset components IDa, QDa can be realized by using, for instance, a moving average circuit. When the offset detector 64 is formed with this moving average circuit, in-phase and orthogonal moving average values are the DC offset components IDa, QDa respectively.

The offset correcting section 65 corrects DC offsets of the data arrays $I_j$, $Q_j$ at the Nyquist points by subtracting the DC offset components IDa, QDa detected by the offset detector 64 from the data arrays $I_j$, $Q_j$ at the Nyquist points, and outputs the corrected data arrays to the data determining section 66.

The data determining section 66 makes data determination for the data arrays with DC offset corrected therein by the offset correcting section 65 and outputs the corrected data arrays as demodulated data DA to the decoder 4. The decoder 4 decodes the demodulated data DA. Data determination by the data determining section 66 is made with the coherent detection scheme or differential detecting scheme corresponding the modulating scheme.

Next, configuration of the timing recovery section 62 is explained with reference to FIG. 15 and FIG. 16. The timing recovery section 62 shown in FIG. 14 comprises a amplitude subtracting type of phase detector 71, a averaging section 72, a clock generating section 73, and a quartering section 74.

The quartering section 74 quarters the quadruple clock SK4 outputted from the free clock generating section 67, and outputs the quartered clock SK as a free symbol clock SK1 to the amplitude subtracting type of phase detector 71 and to the clock generating section 73.

Figure 15:
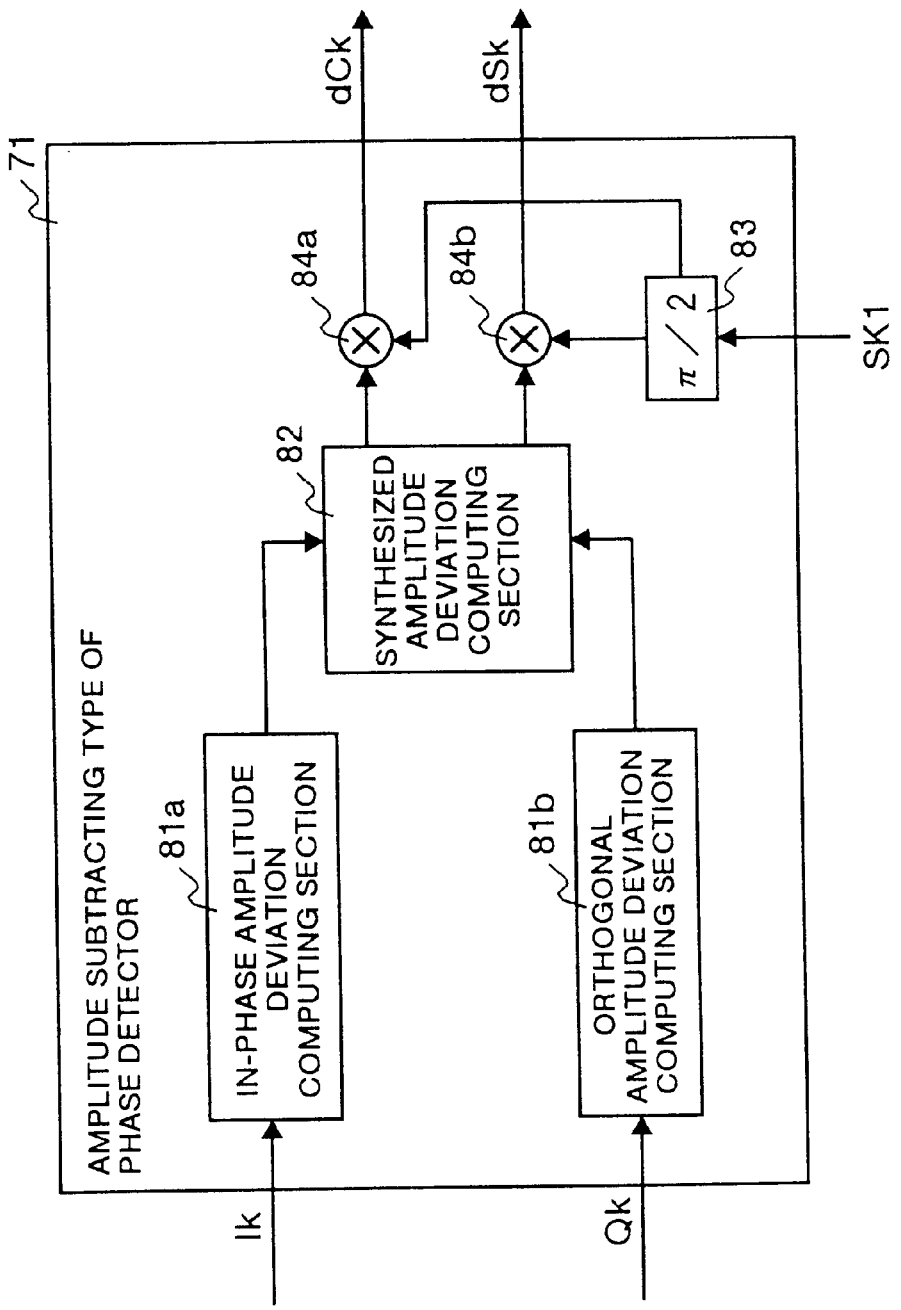
FIG. 15 is a view showing detailed configuration of an amplitude subtracting type of phase detector shown in FIG. 14.

The amplitude subtracting type of phase detector 71 has, as shown in FIG. 15, a in-phase amplitude deviation computing section 81*a*, a orthogonal amplitude deviation computing section 81*b*, a synthesized deviation computing section 82, a$\pi$/2 phase shifter 83, and multipliers 84*a*, 84*b*.

In FIG. 15, the in-phase amplitude deviation computing section 81*a* computes the in-phase amplitude deviation $|I_k - I_{k-2}|$, which is an absolute value of a deviation of the in-phase amplitude component data array $I_k$ sampled by the A/D converter 61*a*, while the orthogonal amplitude deviation computing section 81*b* computes an orthogonal amplitude deviation $|Q_k - Q_{k-2}|$ which is an absolute value of the orthogonal amplitude component data array $Q_k$ sampled by the A/D converter 61*b*. It should be noted that k is a natural number such as 1, 2, 3 . . . The sampling cycle is ¼ of one symbol duration.

The synthesized amplitude deviation computing section 82 computes a synthesized amplitude deviation $\beta 3_k$ as expressed by the following equation (39) by adding the in-phase amplitude deviation $|I_k - I_{k-2}|$ to the orthogonal amplitude deviation $|Q_k - Q_{k-2}|$. Namely, $$\beta 3_k = |I_k - I_{k-2}| + |Q_k - Q_{k-2}| \tag{39}$$

On the other hand, the $\pi/2$ phase shifter 83 separates a data array $SC_k$ for symbol complex frequency components of a free symbol clock SK1 to a sine section and a cosine section as expressed by the following equation (40). Namely, $$SC_k = \cos 2\pi f_s(kT/4) + \sin 2\pi f_s(kT/4) \tag{40}$$

The multipliers 84*a*, 84*b* perform multiplication as expressed by the following equation (41), and output data arrays $dC_k$, $dS_k$ after multiplication respectively. This multiplication is executed in order to compute a correlation value between the free symbol clock SK1 and synthesized amplitude deviation $\beta 3_k$, detect a timing error $\tau$ based on the free symbol clock SK1 as the reference from the correlation value and generate the recovered symbol clock RC with this timing error $\tau$ canceled therein.

$$dC_k = \beta 3_k \times \cos 2\pi f_s(kT/4)$$

$$dS_k = \beta 3_k \times \sin 2\pi f_s(kT/4) \tag{41}$$

Because k is 1, 2, 3, . . . , the value of $\cos 2\pi f_s(kT/4)$ in equation (41) is a simple value of [0, -1, 0, 1, 0, -1, 0, 1, . . . ], and the value of $\sin 2\pi f_s(kT/4)$ is also a simple value of [1, 0, -1, 0, 1, 0, -1, 0, . . . ], so that an operation for the equation (41) can be executed at a high speed.

It should be noted that the synthesized amplitude deviation $\beta 3_k$ may be the synthesized amplitude deviation $\beta 1_k$ as expressed by the equation (20) or may be the synthesized amplitude deviation $\beta 2_k$ as expressed by the equation (21).

The averaging section 72 computes and outputs the average value or accumulated value $M[dC_k]$ of the data array $dC_k$ after multiplication to the clock generating section 73, and also computes and outputs the average value or accumulated value $M[dS_k]$ of the data array $dS_k$ after multiplication also to the clock generating section 73. For computing this average value, for instance a moving average filter (FIR filter) or an infinite impulse type filter (IIR filter) may be used. Thus, when a time constant of a filter for this averaging section 72 (or a number of steps in the moving average when the averaging section is formed with the moving average filter) is made smaller, then rapid timing phase synchronization can be realized when receiving a preamble. On the other hand, when a time constant of a filter for this averaging section 72 (or a number of steps in the moving average when the averaging section is formed with the moving average filter) is made larger, then low phase jitter can be realized in a data section, namely when receiving a random pattern. It should be noted that the time constant or the number of steps may be set to a smaller value in the initial stage for receiving a preamble and then increased when receiving a random pattern after timing phase synchronicity is established.

Figure 16:
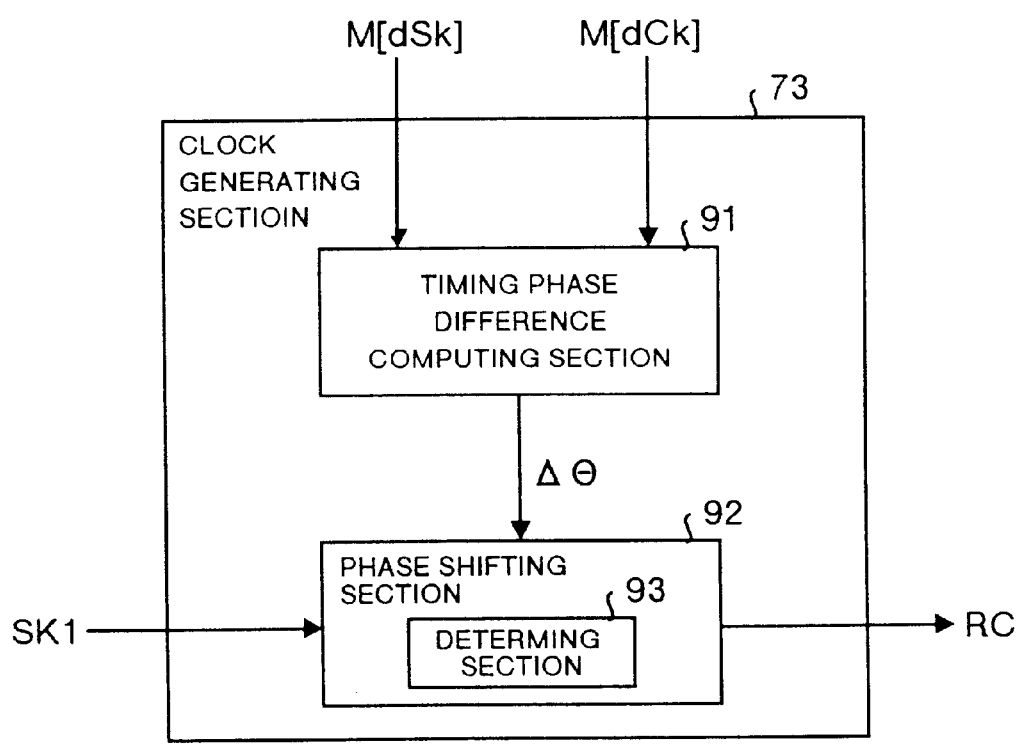
FIG. 16 is a view showing detailed configuration of a clock generating section shown in FIG. 14.

As shown in FIG. 16, the clock generating section 73 has a timing phase difference computing section 91 and a phase shifting section 92 including a determining section 93. The timing phase difference computing section 91 computes a timing phase difference $\Delta\theta$ from the average values $M[dC_k]$ and $M[dS_k]$ by using the following equation (42), and outputs the timing phase difference $\Delta\theta$ to the phase shifting section 92.

$$\Delta\theta = \tan^{-1}(M[dC_k]/M[dS_k]) \tag{42}$$

The phase shifting section 92 outputs a signal obtained by shifting the free symbol clock SK1 by $\Delta\theta$, in the case a signal delayed by $\Delta\theta$ as a recovered symbol clock RC to the Nyquist extracting section 63 and to the decoder 4.

Herein phase processing is executed by executing the orthogonal modulation processing as expressed by the equation (43) to prevent the clock phase from jumping when shifting a phase of the free symbol clock SK1 by Δθ. Namely, assuming that a symbol complex frequency component for the phase-shifted recovered symbol clock is RS(t), the following equation (43) is obtained:

$$RS(t)=\cos(-\Delta\theta)\times\cos 2\pi f_s t+\sin(-\Delta\theta)\times\sin 2\pi f_s t \qquad (43)$$

The determining section 93 executes two-valued determination by recognizing the logic as one when RS(t) is equal to or larger than one, or as zero when RS(t) is smaller than one, and prevents jumping of clock phase shift by generating a clock when the logic is one.

Figure 17:
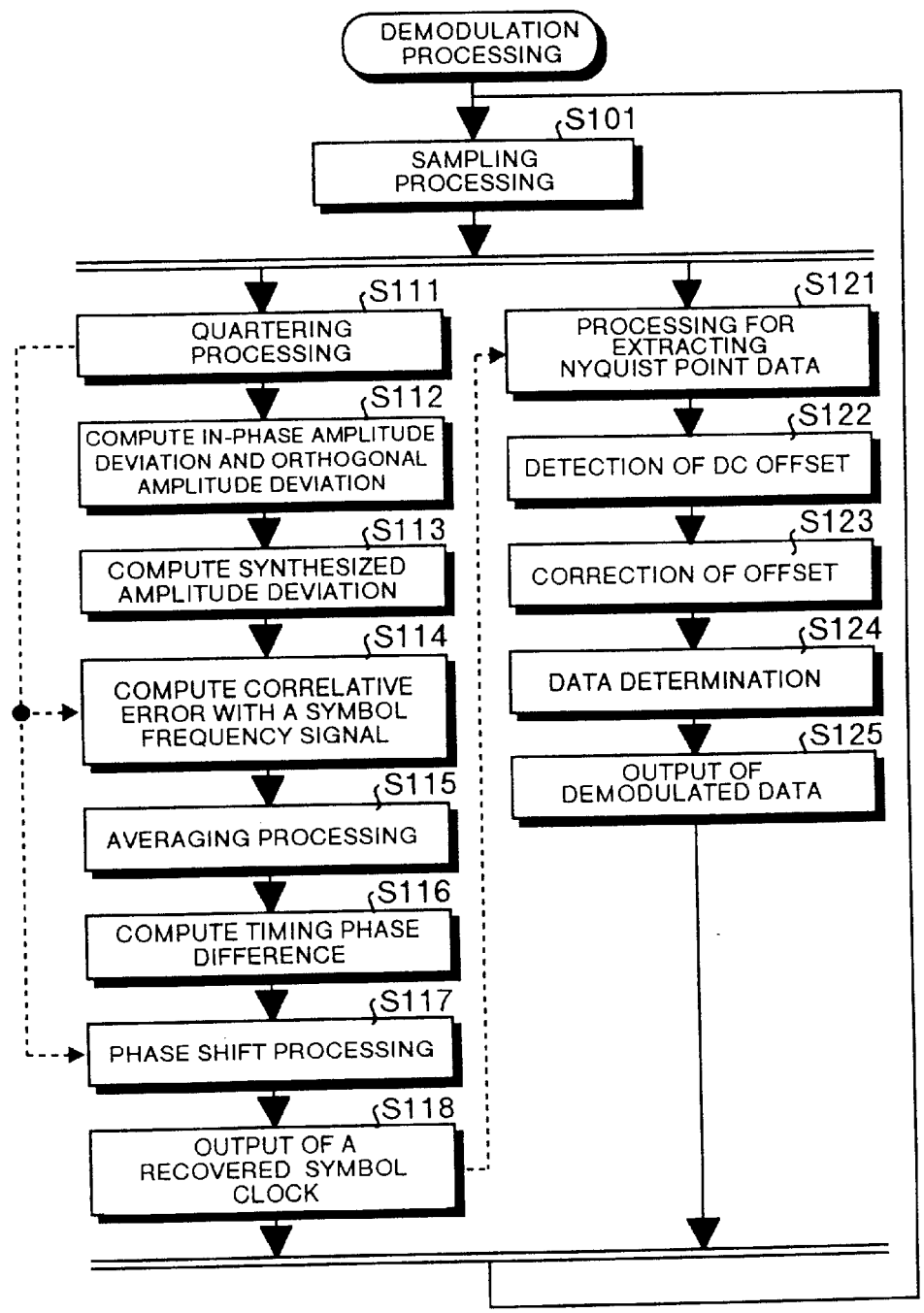
FIG. 17 is a flow chart showing the demodulation processing sequence executed by the demodulator shown in FIG. 14.

A series of operations for demodulation processing in the demodulator 3 are explained with reference to the flow chart shown in FIG. 17. At first the A/D converters 61a, 61b samples an in-phase component and an orthogonal component of a base band inputted from the frequency converting section 2 according to the quadruple clock SK4, and outputs the sampled in-phase amplitude component data array $I_k$ and the sampled orthogonal amplitude component data array $Q_k$ to the timing recovery section 62 as well as to the Nyquist data extracting section 63 (step S101). Then the timing recovery processing (step S111 to step S118) by the timing recovery section 62 and data determination processing (step S121 to step S125) are executed concurrently.

In the timing recovery processing (step S111 to Step S118), at first the quartering section 74 quarters the quadruple clock SK4, and outputs the quartered free symbol clock SK1 to the amplitude subtracting type of phase detector 71 as well as to the clock generating section 73 (step S111). Then the in-phase amplitude deviation computing section 81a computes the in-phase amplitude deviation $|I_k-I_{k-1}|$, while the orthogonal amplitude deviation computing section 81b computes the orthogonal amplitude deviation $|Q_k-Q_{k-1}|$ (step S112). Further, the synthesized amplitude deviation computing section 82 computes the synthesized deviation $\gamma 3_k$ by adding the in-phase amplitude deviation $|I_k-I_{k-1}|$ to the orthogonal amplitude deviation $|Q_k-Q_{k-1}|$ (step S113). Then the multipliers 84a, 84b compute data arrays $dC_k$, $dS_k$ respectively, which are timing errors of a symbol frequency included in this synthesized amplitude deviation $\beta 3_k$ according to the free symbol clock SK1, and outputs the data arrays $dC_k$, $dS_k$ to the averaging section 72 (step 114).

Then the averaging section 72 computes average values $M[dC_k]$, $M[dS_k]$ of the input data arrays $dC_k$, $dS_k$ respectively, and outputs the average values $M[dC_k]$, $M[dS_k]$ to the clock generating section 73 (step S115). The timing phase difference computing section 91 of the clock generating section 73 computes the timing phase difference Δθ from the average values $M[dC_k]$ and $M[dS_k]$ (step S116).

The phase shifting section 92 shifts a phase of the free symbol clock SK1 according to the timing phase difference Δθ (step S117), outputs the free symbol clock SK1 as a recovered symbol clock RC to the Nyquist data extracting section 63 and the decoder 4 (step S118). Then the operating sequence described above is repeated.

On the other hand, data determination processing (step S121 to S125) is executed in parallel to the timing recovery processing (step S111 to step S118). Namely, the Nyquist data extracting section 63 extracts data arrays $I_j$, $Q_j$ at the Nyquist points having been subjected to interpolation according to the in-phase amplitude data array $I_k$, and orthogonal amplitude component data array $Q_k$ as well as to the recovered symbol clock RC (step S121). The offset detector 64 outputs a DC offset component IDa for an in-phase component and a DC offset component QDa for an orthogonal component to the offset correcting section 65 (step S122). Then the offset correcting section 65 corrects the DC offsets of the data arrays $I_j$, $Q_j$ at the Nyquist points by subtracting the DC offset components IDa, QDa detected in the offset detector 64 from the data arrays $I_j$, $Q_j$ at the Nyquist points, and outputs the corrected data to the data determining section 66 (step S123). Then the data determining section 66 determines the data arrays each with a DC offset therein corrected by the offset correcting section (step S124) and outputs the corrected data as demodulated data DA to the decoder 4 (step S125). Then the operating sequence described above is repeated.

It is assumed in the Embodiment 4 described above that the baseband signal is within the input rage of the A/D converters 61a and 61b. However, but the configuration is not limited to this one, and the present invention can similarly be applied in a case where the frequency converting section 2 outputs a baseband signal amplified to a constant amplitude by using a limiter amplifier or the like.

Further, in Embodiment 4 described above, the synthesized amplitude deviations $\beta 1_k$ to $\beta 3_k$ are computed from an absolute value of a difference for a ½ symbol time interval as expressed by the equations (11) to (13). However, the synthesized amplitude deviations $\beta 1_k$ to $\ominus 3_k$ may be computed from an absolute value of a difference for a 1/n symbol time interval as expressed by the equations (22) to (24). It should be noted that in this case n is a natural number greater than 1.

In Embodiment 4, configuration of a receiver based on a communication system using a QPSK modulation system is described. However, the present invention can be applied to a modulation system having the characteristics such that a deviation of a baseband signal on average becomes slower near the Nyquist point and becomes sharper at ½ of the symbol duration from the Nyquist point such as BPSK modulation system, π/4 shift QPSK modulation system, or FSK modulation system.

Description of Embodiment 4 above assumes the preposition that all bits of the sampled in-phase amplitude component data array $I_k$ and orthogonal amplitude component data array $Q_k$ are used. However, only upper n bits of each of the data arrays $I_k$, $Q_k$ ($n\geq 1$) may be used. When only upper n bits are used, high speed processing can be realized with substantially the same precision.

With the Embodiment 4 of the present invention, the timing recovery section 62 detects a timing phase by acquiring an absolute value signal β3(t) including a symbol frequency component s(t) or an absolute value signals β1(t), β2(t) each equivalent to the former, so that rapid timing phase synchronization when receiving a preamble and low phase jitter when receiving a random pattern in a data section can be realized regardless of whether a DC offset is present in the baseband signal or of whether the amplitude of a baseband signal is limited to a specific range or not.

Figure 22:
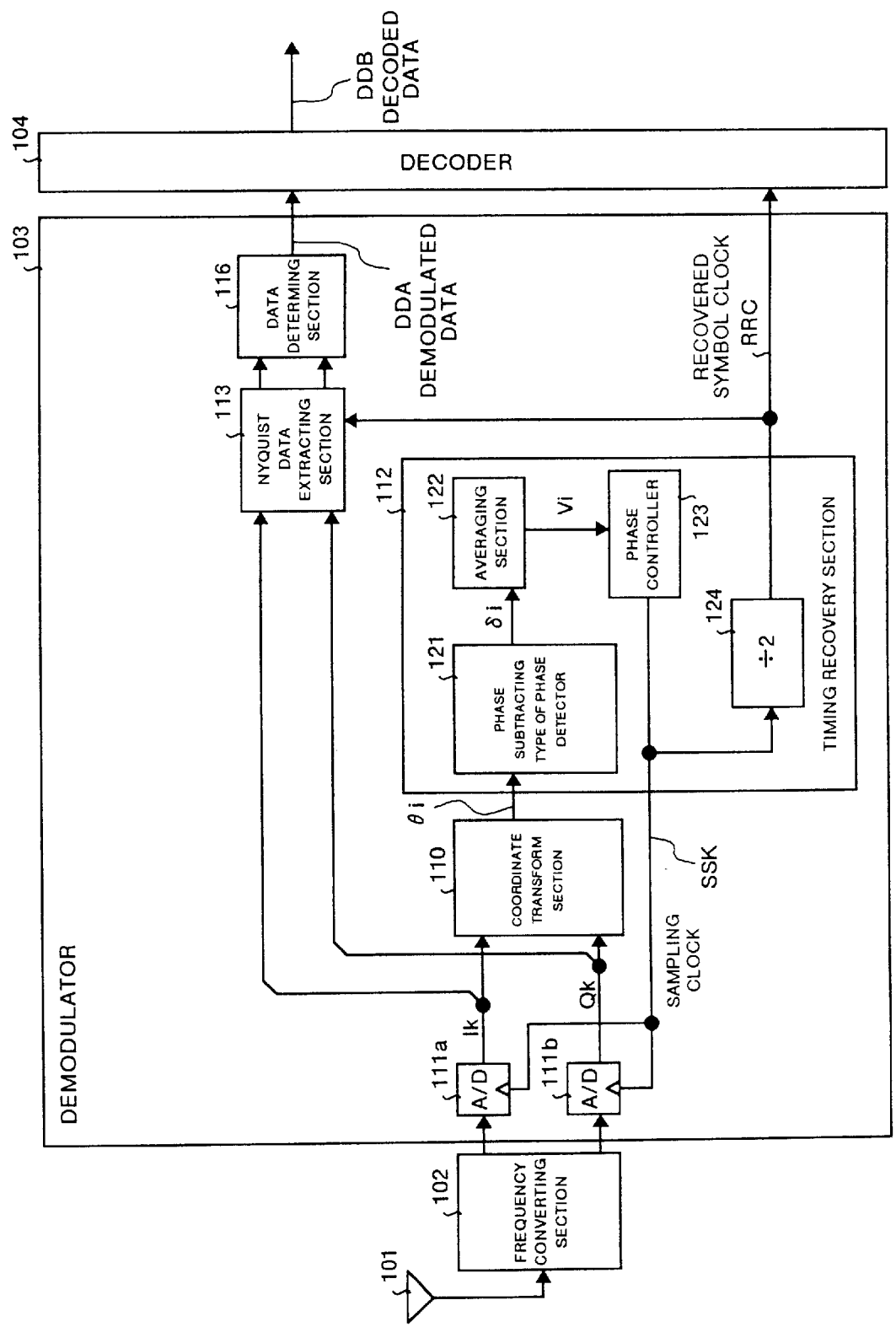
FIG. 22 is a view showing general configuration of a receiver having a conventional type of demodulator.
Figure 23:
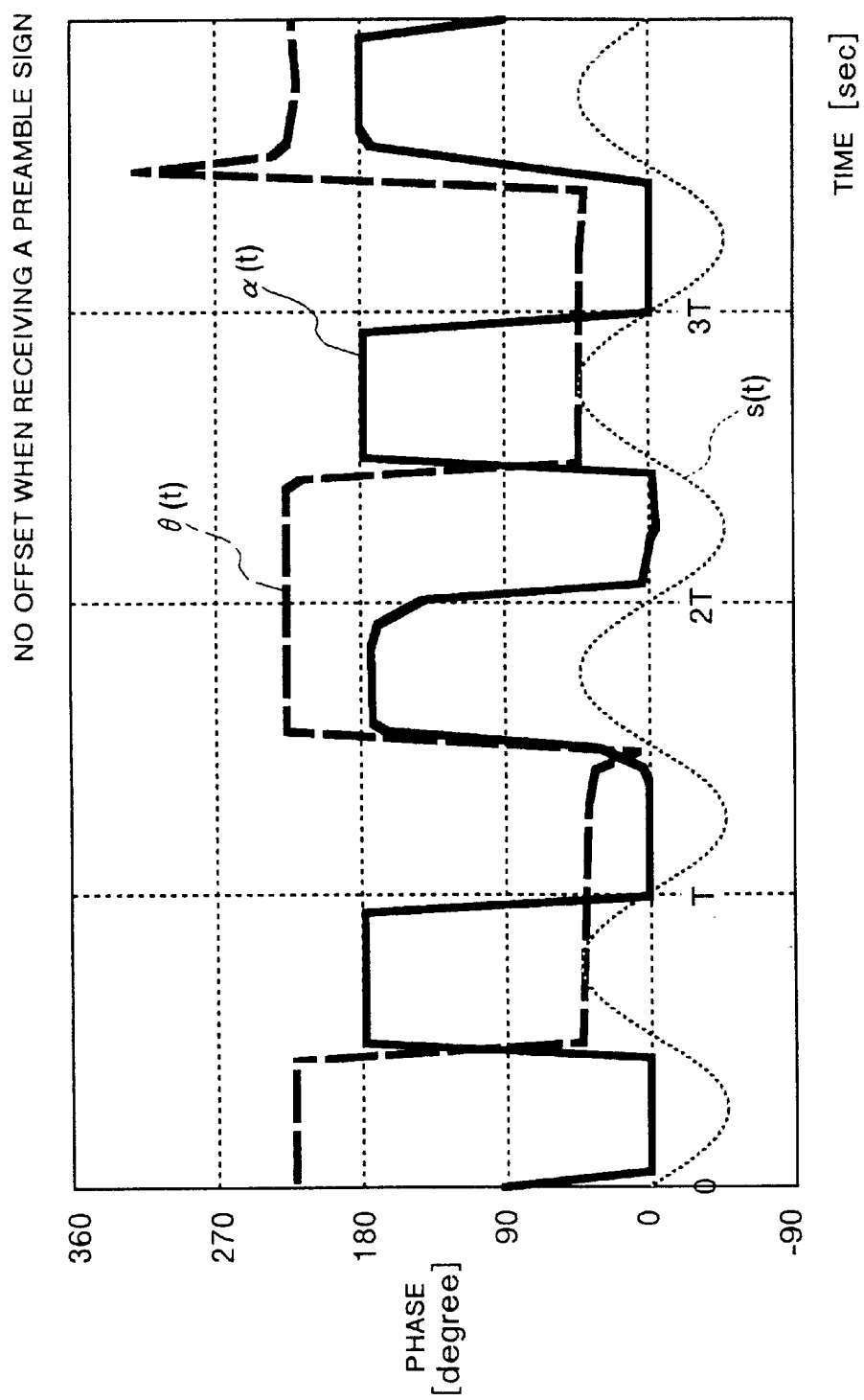
FIG. 23 is a view showing a temporal change in the phase of a baseband signal not including a DC offset when receiving a preamble and a temporal change in the phase deviation.
Figure 26:
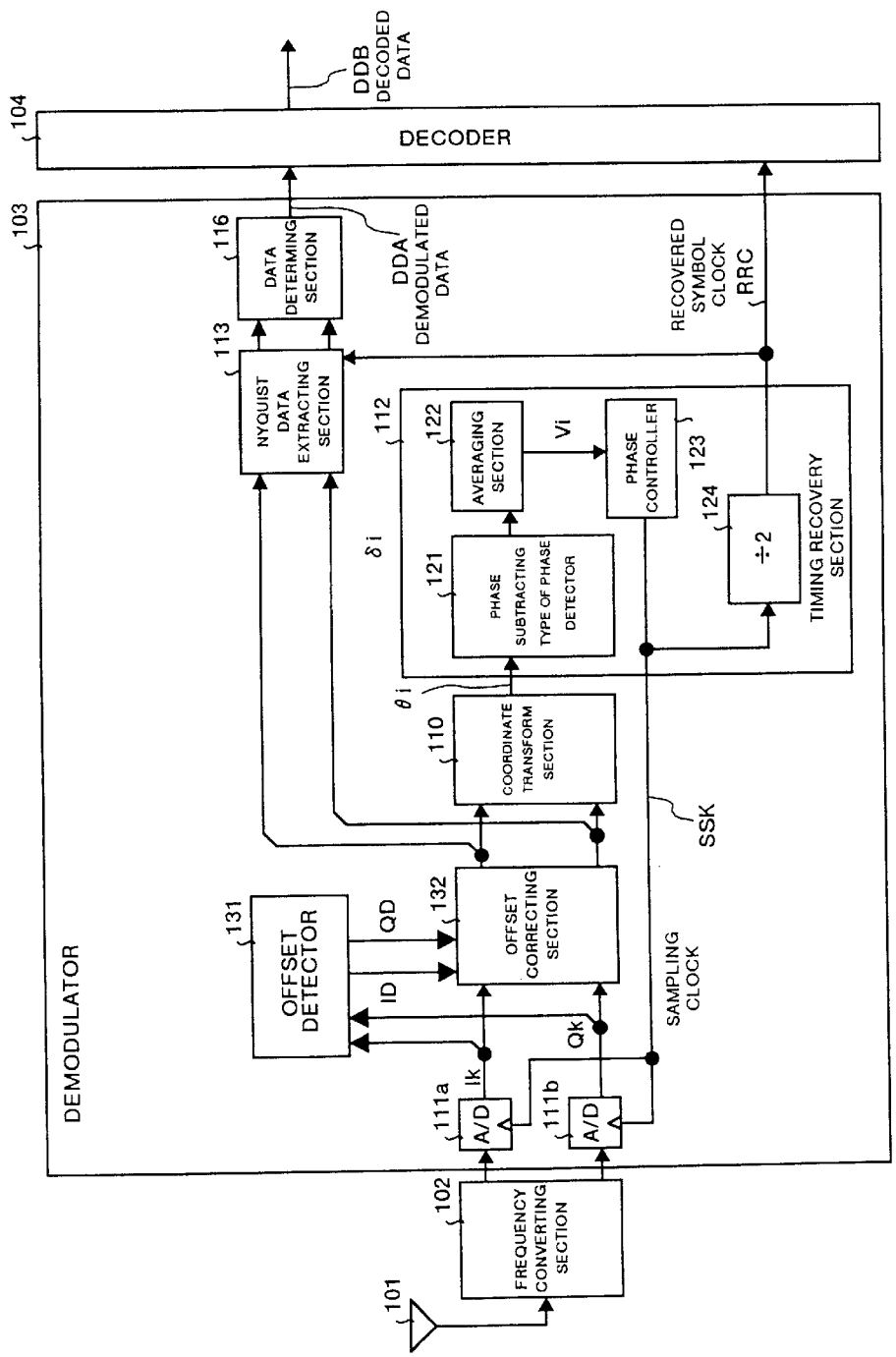
FIG. 26 is a general block diagram showing a receiver having the conventional type of demodulator with a mechanism for removing a DC offset included in a baseband signal.

Further, as a timing error can be estimated by executing an operation for correlation between an absolute value signal β3(t) computed by simple calculations such as addition and subtraction and the free symbol clock cycle SK1, so that it is not necessary to execute large scale processing like that with the coordinate transform section 110 as shown in FIG. 22 or FIG. 26, and downsizing of a demodulator or of a receiver using the same can be promoted.

Further, different from Embodiments 1 to 3, a recovered symbol clock is generated by means of feed forward control. Therefore, regardless of a value of a timing phase in the initial stage, the time required for timing phase synchronization is decided by a time constant for a filter in the averaging section 72 (or a number of filtering steps when formed with a moving average filter), so that a stable operation for timing phase synchronization can be realized.

The processing for timing phase synchronization and that for DC offset removal are executed concurrently inside the demodulator. Therefore, even if a DC offset is appended to a baseband signal, the time required until demodulation processing is performed correctly can be reduced, and for instance the transmission efficiency can be improved by means of reducing, for instance, preamble data.

Next, Embodiment 5 of the present invention is described. In the above Embodiment 4, a phase inversion phenomenon of a synthesized amplitude deviation $\beta 3_k$ is removed stochastically like in Embodiment 1 by averaging the data arrays $dC_k$, $dS_k$ after multiplication. However, in the Embodiment 5 described below, like in Embodiment 2, when a phase inversion phenomenon is detected, weightage is provided for removing the absolute value signal $\beta 3_k$ when the phase inversion phenomenon is detected, and the phase inversion phenomenon is removed without fail.

Figure 18:
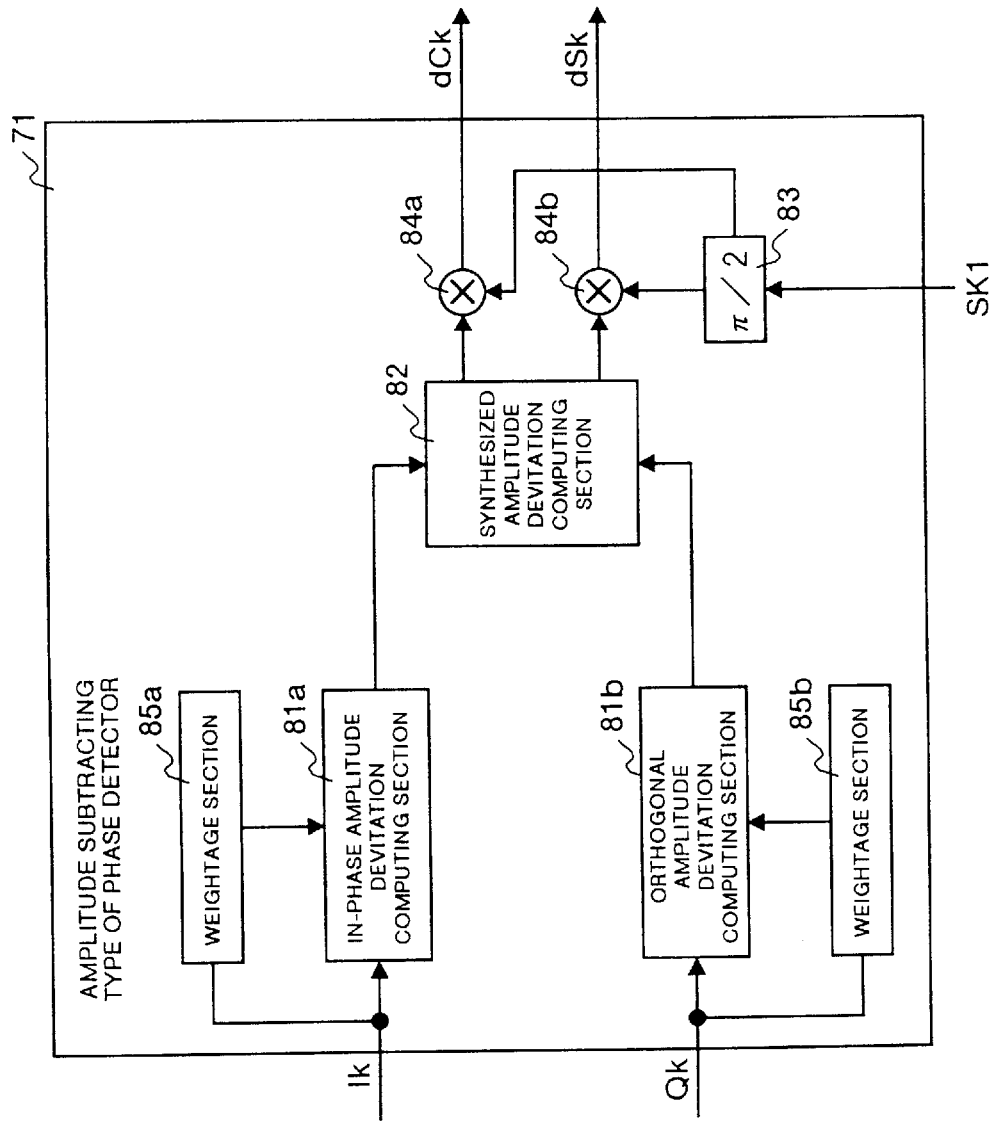
FIG. 18 is a view showing detailed configuration of an amplitude subtracting type of phase detector inside a demodulator according to Embodiment 5 of the present invention.

FIG. 18 is a block diagram showing configuration of the amplitude subtracting type of phase detector 71 according to Embodiment 5 of the present invention. The configuration other than the amplitude subtracting type of phase detector 71 is the same as those in Embodiment 4 shown in FIG. 14.

In FIG. 18, the amplitude subtracting type of phase detector 71 comprises, like in Embodiment 4, an in-phase amplitude deviation computing section 81a, an orthogonal amplitude deviation computing section 81b, a synthesized amplitude deviation computing section 82, a $\pi/2$ phase shifter 83, and multipliers 84a, 84b, and further has weightage sections 85a and 85b.

In FIG. 18, the in-phase amplitude deviation computing section 81a computes an in-phase amplitude deviation $|I_k-I_{k-2}|$ which is an absolute value of a deviation of the in-phase amplitude component data array $I_k$ sampled by the A/D converter 61a, while the orthogonal amplitude deviation computing section 81b computes an orthogonal amplitude deviation $|Q_k-Q_{k-2}|$ which is an absolute value of a deviation of the orthogonal amplitude component data array $Q_k$ sampled by the A/D converter 61b. It should be noted that k is a natural number such as 1, 2, 3, ... The sampling cycle is ¼ of the one symbol duration.

On the other hand, the weightage section 85a computes an in-phase symbol time deviation $\delta I_k$ as expressed by the equation (44) based on the in-phase amplitude component data array $I_k$. Namely, $\delta I_k=|I_k-I_{k-4}|$ when $i=4, 8, 12, \ldots$ $\delta I_k=\delta I_{k-1}$ when $i\neq 4, 8, 12, \ldots$ (44)

Also the weightage section 85b computes an orthogonal amplitude symbol time deviation $\delta Q_k$ as expressed by the following equation (45) according to the orthogonal amplitude component data array $Q_k$. Namely, $\delta Q_i=|Q_k-I_{k-4}|$ when $i=4, 8, 12, \ldots$ $\delta Q_k=\delta Q_{k-1}$ when $i\neq 4, 8, 12, \ldots$ (45)

Then the weighting section 85a provides weightage by multiplying the in-phase amplitude deviation $|I_k-I_{k-2}|$ computed by the in-phase amplitude deviation computing section 81a by the in-phase amplitude symbol time deviation $\delta I_k$, while the weightage section 85b provides weightage by multiplying the in-phase amplitude deviation $|Q_k-Q_{k-2}|$ computed by the orthogonal amplitude deviation computing section 81b by the orthogonal amplitude symbol time deviation $\delta I_k$.

The synthesized amplitude deviation computing section 82 adds the in-phase amplitude deviation $\delta I_k \times |I_k-I_{k-2}|$ and the orthogonal amplitude deviation $\delta Q_k \times |Q_k-Q_{k-2}|$ weighted by the weightage sections 85a, 85b respectively, and computes the synthesized amplitude deviation $\beta 3_k$ as expressed by the following equation (46). Namely, $\beta 3_k = \delta I_k \times |I_k-I_{k-2}| + \delta Q_k \times |Q_k-Q_{k-2}|$ (46)

In the data array for this synthesized amplitude deviation $\beta 3_k$, according to the data array for the synthesized amplitude deviation $\beta 3_k$ described in Embodiment 4, $\delta I_k$ or $\delta Q_k$ becomes zero when signal shift does not occur in one symbol, and as a result the in-phase amplitude deviation $|I_k-I_{k-2}|$ or orthogonal amplitude deviation $|Q_k-Q_{k-2}|$ is removed when signal shift does not occur.

Only the synthesized amplitude deviation $\beta 3_k$ with an inverted phase having been removed therefrom is inputted into the multipliers 84a, 84b, so that, even if processing for correlation is executed by multiplication, the data arrays $dC_k$, $dS_k$ each having a timing error are not outputted to the averaging section 72, and as a result low phase jitter is realized.

The synthesized amplitude deviations $\beta 1_k$, $\beta 2_k$ as expressed by the following equations (47) and (48) corresponding to the equations (28) and (29) respectively may be used. Namely, $\beta 1_k=(\delta I_k \times |I_k-I_{k-2}|^2+\delta Q_k \times |Q_k-Q_{k-2}|^2)^{1/2}$ (47)

$\beta 2_k=\delta I_k \times |I_k-I_{k-2}|^2+\delta Q_k \times |Q_k-Q_{k-2}|^2$ (48)

Downsizing of the processing circuit or high speed processing may be realized by simplifying the operations for computing the in-phase amplitude symbol time deviation $\delta I_k$ and orthogonal amplitude symbol time deviation $\delta Q_k$. A data array $IH_k$ (k=1, 2, 3, ...) obtained by subjecting the in-phase amplitude symbol time deviation $\delta I_k$ to two-valued determination is defined as expressed by the following equation (49). Namely;

$IH_k=1$ (when $\delta I_k \geq \epsilon$)

$IH_k=0$ (when $\delta I_k < \epsilon$) (49)

and the data array $QH_k$ (k=1, 2, 3, ...) obtained by subjecting the in-phase amplitude symbol time deviation $\delta Q_k$ to two-valued determination is defined as expressed by the following equation (50).

$QH_k=1$ (when $\delta Q_k \geq \epsilon$)

$QH_k=0$ (when $\delta Q_k < \epsilon$) (50)

It should be noted that $\epsilon$ is a preset threshold value. When the data arrays $IH_k$, $QH_k$ are zero, it indicates that signal shift has not occurred in one symbol, and that a phase inversion has occurred.

The weightage sections 85a, 85b give weight to the in-phase amplitude deviation $|I_k-I_{k-2}|$ and the orthogonal amplitude deviation $|Q_k-Q_{k-2}|$ by using the data arrays $IH_k$, $QH_k$. Following equations (51) to (53), corresponding to equations (46) to (48), are used to obtain the synthesized amplitude deviations $\beta 31_k$ to $\oplus 33_k$. Namely, $\beta 33_i = IH_i \times |I_i-I_{i-1}| + QH_i \times |Q_i-Q_{i-1}|$ (51)

$\beta 31_i = (IH_i \times |I_i-I_{i-1}|^2 + QH_i \times |Q_i-Q_{i-1}|^2)^{1/2}$ (52)

$\beta 32_i = IH_i \times |I_i-I_{i-1}|^2 + QH_i \times |Q_i-Q_{i-1}|^2$ (53)

The multipliers 84a, 84b generate the data arrays $dC_k$, $dS_k$ using the synthesized amplitude deviations $\beta31_k$ to $\beta33_k$ weighted using the data arrays $IH_k$, $QH_k$ having been subjected to two-valued determination, and output the data arrays $dC_k$, $dS_k$ to the averaging section 72.

Figure 19:
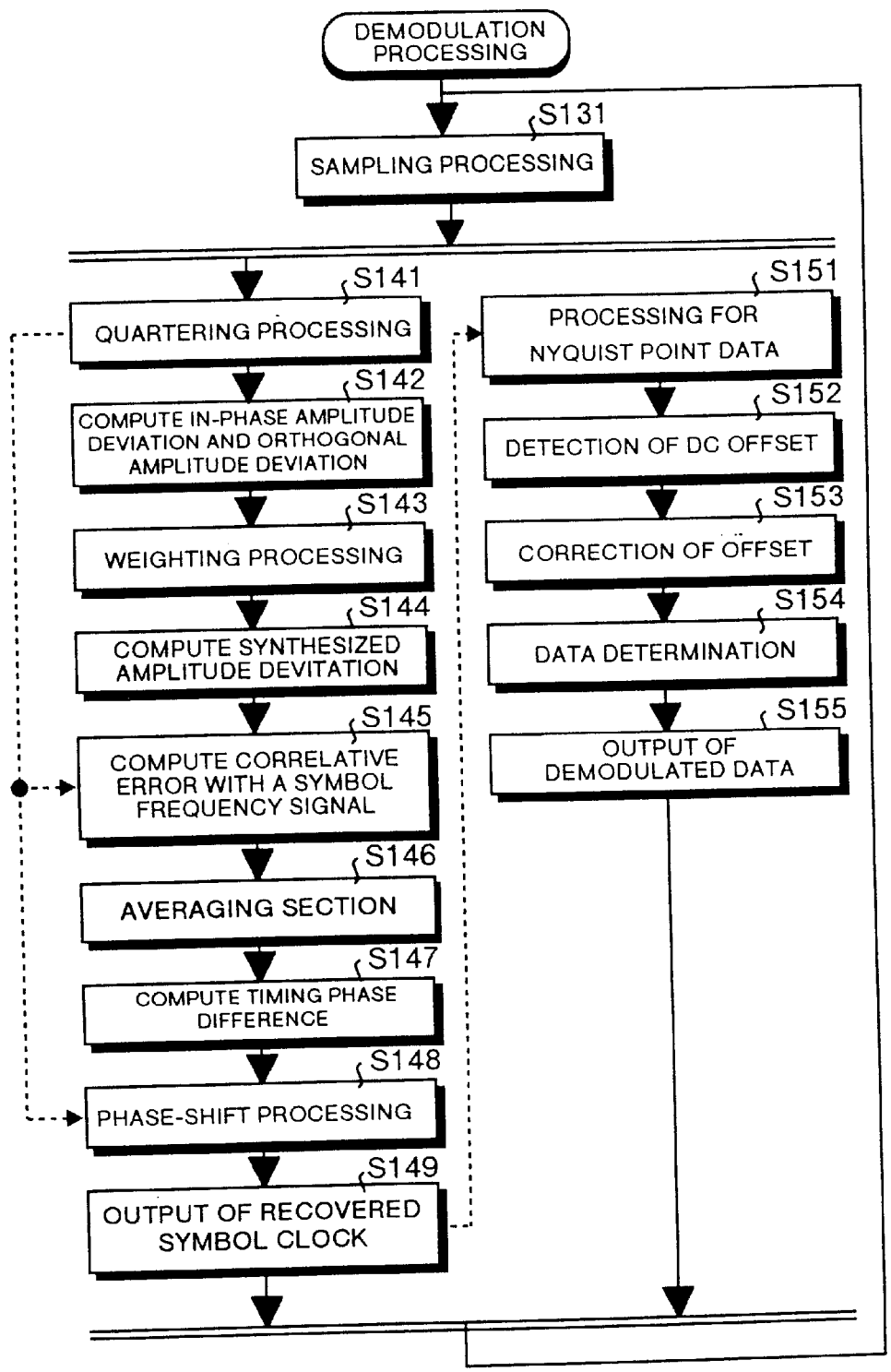
FIG. 19 is a flow chart showing the demodulation processing sequence executed by the demodulator according to Embodiment 5.

A series of operations for demodulation operation in the demodulator 3 are explained with reference to the flow chart shown in FIG. 19. At first, the A/D converters 61a, 61b sample an in-phase component and an orthogonal component of a baseband signal inputted from the frequency converting section 2 according to a quadruple clock SK4, and outputs the in-phase amplitude component data array $I_k$ and orthogonal amplitude component data array $Q_k$ to the timing recovery section 62 (step S131). Then the timing recovery processing (step S141 to step S149) by the timing recovery section 62 and data determination processing (step S151 to step S155) are executed concurrently.

In the timing recovery processing (step S141 to step S149), at first the quartering section 74 quarters the quadruple clock SK4, and outputs this quartered free symbol clock SK1 to the amplitude subtracting type of phase detector 71 and to the clock generating section 73 (step S141). Then the in-phase amplitude deviation computing section 81a computes the in-phase amplitude deviation $|I_k-I_{k-2}|$, while the orthogonal amplitude deviation computing section 81b computes the orthogonal amplitude component deviation $|Q_k-Q_{k-2}|$ (step S142). Then the weightage sections 85a, 85b provide weightage to the in-phase amplitude deviation $|I_k-I_{k-2}|$ and the orthogonal amplitude component deviation $|Q_k-Q_{k-2}|$ using the in-phase amplitude symbol time deviation $\delta I_k$ and orthogonal amplitude symbol time deviation $\delta Q_k$ respectively (step S143). Further, the synthesized amplitude deviation computing section 82 computes the synthesized amplitude deviation $\beta3_k$ by adding the weighted in-phase amplitude deviation $\delta I_k \times |I_k-I_{k-2}|$ and orthogonal amplitude deviation $\delta Q_k \times |Q_k-Q_{k-2}|$ (step S144). Then the multipliers 84a, 84b compute the data arrays $dC_k$, $dS_k$ each having a timing error of a symbol frequency included in the synthesized amplitude deviation $\beta3_k$ according to the free symbol clock SK1 as the reference, and outputs the data arrays $dC_k$, $dS_k$ to the averaging section 72 (step 145).

The averaging section 72 computes average values $M[dC_k]$, $M[dS_k]$ of the inputted data arrays $dC_k$, $dS_k$, and outputs these average values $M[dC_k]$, $M[dS_k]$ to the clock generating section 73 (step S146). The timing phase difference computing section 91 of the clock generating section 73 computes a timing phase difference $\Delta\theta$ according to these average values $M[dC_k]$, $M[dS_k]$ (step S147). The phase shifting section 92 shifts a phase of the free symbol clock SK1 according to the timing phase difference $\Delta\theta$ (step S148) and outputs the free symbol clock SK1 as a recovered symbol clock RC to the Nyquist data extracting section 63 and to the decoder 4 (step S149). Then the same processing described above is repeated.

On the other hand, in parallel to the timing recovery processing (step S141 to step S149), the data determination processing (step S151 to S155) is executed. Namely, the Nyquist data extracting section 63 extracts the data arrays $I_j$, $Q_j$ at the Nyquist points having been subjected to interpolation according to the in-phase amplitude component data array $I_k$ and orthogonal amplitude component data array $Q_k$ as well as to the recovered symbol clock RC (step S151). The offset detector 64 outputs a DC offset component IDa of an in-phase component and a DC offset component QDa of an orthogonal component according to the data arrays $I_j$, $Q_j$ at the Nyquist points to the offset correcting section 65 (step S152). Then the offset correcting section 65 corrects the DC offsets of the data arrays $I_j$, $Q_j$ at the Nyquist points by subtracting the DC offset components IDa, QDa detected in the offset detector 64 from the data arrays $I_j$, $Q_j$ at the Nyquist points, and outputs the corrected data to the data determining section 66 (step S153). Further, the data determining section 66 makes data determination for the data arrays with the DC offset corrected by the offset correcting section 65 (step S154) and outputs the corrected data as demodulated data DA to the decoder 4 (step S155). Then the same processing described above is repeated.

The possibility of not occurring of a signal shift in one symbol is only in a data section, namely only when receiving a random pattern, so that the processing for weightage described above may be executed only when receiving a random pattern. Namely, a determination step in which determination is made as to whether the weighting processing in step S143 is to be executed or not may be added, and when a preamble is received, the processing for weightage is not executed, and the processing for weightage is executed only when a random pattern is received.

In Embodiment 5 described above, in addition to the effects provided in Embodiment 4, phase jitter can further be reduced when receiving a random pattern, and demodulation processing can be realized in which degradation of BER due to a timing error is further reduced.

Next, Embodiment 6 of the present invention is described. In Embodiment 5 described above, the synthesized amplitude deviation $\beta3_k$ with phase inversion generated therein is removed by providing a weightage by the weightage sections 85a, 85b. However, in Embodiment 6, like in Embodiment 3, value of the synthesized amplitude deviation $\beta3_k$ when phase inversion has occurred is effectively utilized.

Figure 20:
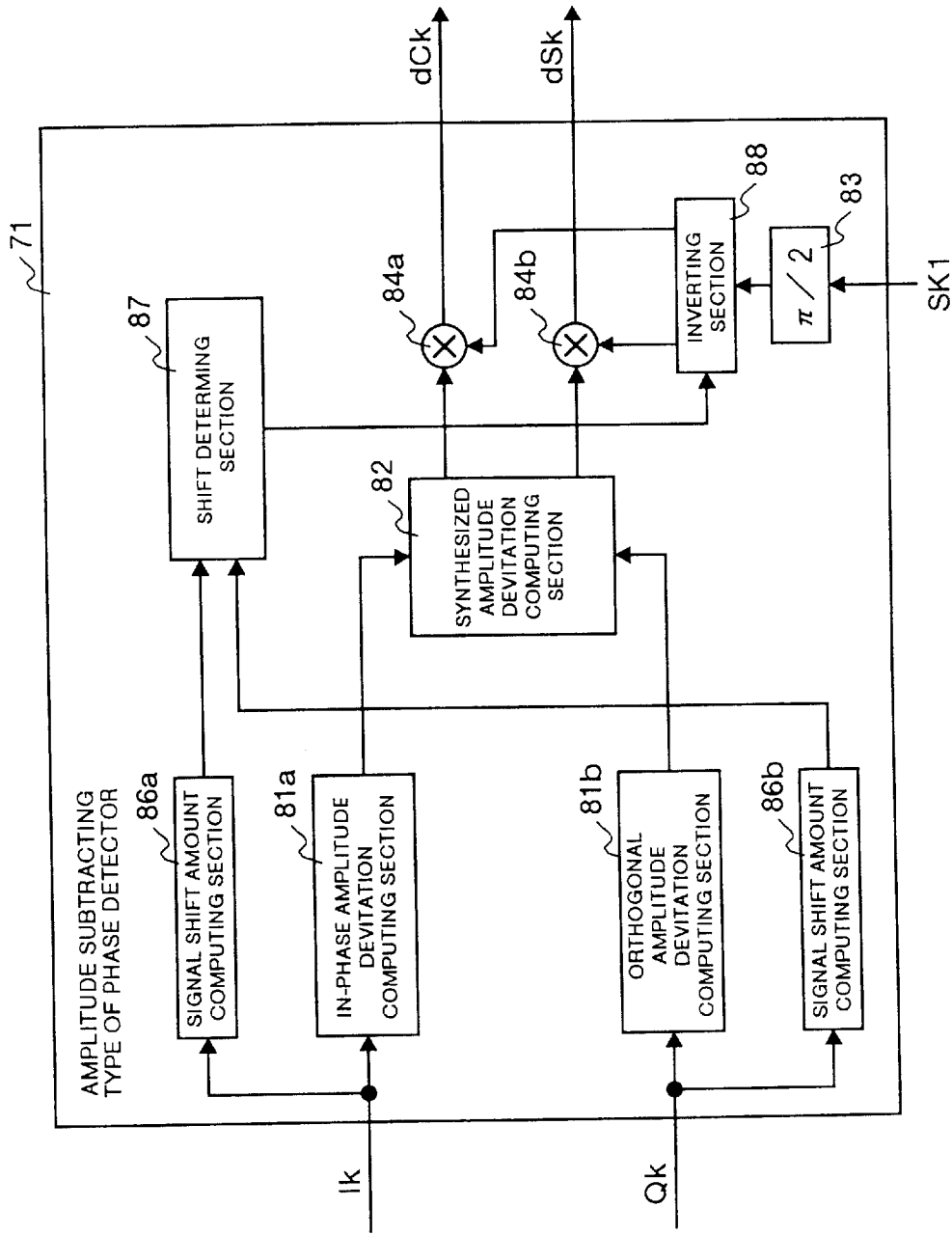
FIG. 20 is a view showing detailed configuration of an amplitude subtracting type of phase detector inside the demodulator according to Embodiment 6 of the present invention.

FIG. 20 is a block diagram showing configuration of the amplitude subtracting type of phase detector 71 according to Embodiment 6 of the present invention. The configuration other than this amplitude subtracting type of phase detector 71 is the same as that in Embodiment 4 shown in FIG. 14.

In FIG. 20, the amplitude subtracting type of phase detector 71 comprises, like in Embodiment 4, a in-phase amplitude deviation computing section 81a, a orthogonal amplitude deviation computing section 81b, a synthesized amplitude deviation computing section 82, a$\pi$/2 phase shifter 83, multipliers 84a, 84b, signal shift amount computing sections 86a, 86b, a shift determining section 87, and a inverting section 88.

In FIG. 20, the in-phase amplitude deviation computing section 81a computes the in-phase amplitude deviation $|I_k-I_{k-2}|$ which is an absolute value of a deviation of the in-phase amplitude component data array $I_k$ sampled by the A/D converter 61a, while the orthogonal amplitude deviation computing section 81b computes the orthogonal amplitude component deviation $|Q_k-Q_{k-2}|$ which is an absolute value of the orthogonal amplitude deviation computing data arrays $Q_k$ sampled by the A/D converter 61b. It should be noted that k is a natural number such as 1, 2, 3, . . . The sampling cycle is ¼ of one symbol duration.

The synthesized deviation computing section 82 computes the synthesized amplitude deviation $\beta3_k$ by adding the in-phase amplitude deviation $|I_k-I_{k-2}|$ to the orthogonal amplitude component deviation $|Q_k-Q_{k-2}|$, and outputs the synthesized amplitude deviation $\beta3_k$ to the multipliers 84a, 84b.

On the other hand, the signal shift amount computing section 86a computes the in-phase amplitude symbol time deviation $\delta I_k$ expressed by the equation (44) from the in-phase amplitude component data array $I_k$, and outputs the computed in-phase amplitude symbol time deviation $\delta I_k$ to the shift determining section 87. The signal shift amount computing section 86b computes the orthogonal amplitude symbol time deviation $\delta Q_k$ expressed by the equation (45) from the orthogonal amplitude component data $Q_k$, and outputs the computed orthogonal amplitude symbol time deviation $\delta Q_k$ to the shift determining section 87.

The shift determining section 87 determines the shift expressed by the following equation (54) from the in-phase amplitude symbol time deviation $\delta I_k$ and orthogonal amplitude symbol time deviation $\delta Q_k$ outputted from the signal shift amount computing sections 86a, 86b. Namely, $$H_k=1 \text{ when } \delta I_k \geq \epsilon \text{ or } \delta Q_k \geq \epsilon$$
$$H_k=0 \text{ when } \delta I_k < \epsilon \text{ and } \delta Q_k < \epsilon \quad (54)$$

Herein, k is a natural number such as 1, 2, 3, . . . , and $\epsilon$ is a preset threshold value. When a result of determination indicates that $H_k$ is equal to one, this means that signal shift has occurred and phase inversion has not occurred. When a result of determination indicates that $H_k$ is equal to zero, this means that signal shift has not occurred and phase inversion has occurred. The shift determining section 87 outputs a result of determination to the inverting section 88.

The inverting section 88 outputs the data arrays $dC_k$, $dS_k$ after multiplication as they are through the equation (41) when a result of determination by the shift determining section 87 indicates that $H_k$ is equal to one to the averaging section 72, and outputs the phase-inverted data arrays $dC_k$, $dS_k$ as expressed by the following equation (55) to the averaging section 72 when a result of determination by the shift determining section 87 indicates that $H_k$ is equal to zero. Namely, $$dC_k=\beta 3_k \times (-\cos 2\pi f_s(kT/4))$$
$$dS_k=\beta 3_k \times (-\sin 2\pi f_s(kT/4)) \quad (55)$$

Because the value of k is 1, 2, 3, . . . , the value of $-\cos 2\pi f_s$ (kT/4) in the equation (55) is any of 0, 1, 0, −1, 0, 1, 0, −1, . . . while the value of $-\sin 2\pi f_s$ (kT/4) in the same equation is any of −1, 0, 1, 0, −1, 0, 1, 0, . . . , so that the equation (55) is also a simple one like in the equation (41) and can be executed at a high speed.

It should be noted that the synthesized amplitude deviation computing section 82 may compute a synthesized amplitude deviation $\beta 1_k$ or the synthesized amplitude deviation $\beta 2_k$.

Figure 21:
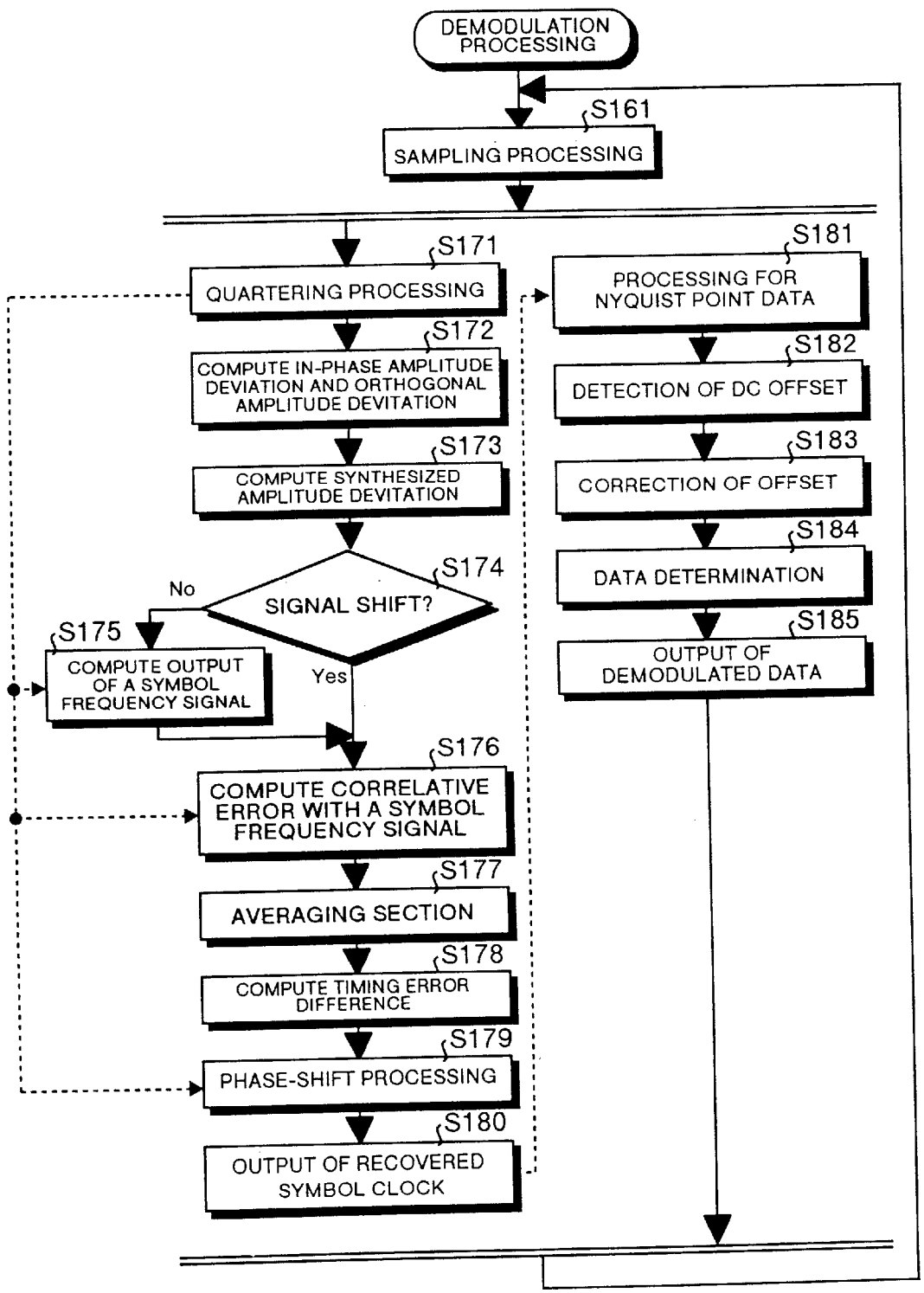
FIG. 21 is a flow chart showing the demodulation processing sequence executed by the demodulator according to Embodiment 6 of the present invention.

A series of operations for demodulation processing in the demodulator 3 are described with reference to the flow chart shown in FIG. 21. At first A/D converters 61a, 61b sample an in-phase component and an orthogonal component of a baseband signal inputted from the frequency converting section 2 according to the quadruple clock SK4, and output the sampled in-phase amplitude component data array $I_k$ and orthogonal amplitude data array $Q_k$ to the timing recovery section 62 (step S161). Then the timing recovery processing by the timing recovery section 62 (step S171 to step 180) and data determination processing (step S181 to step S185) are executed concurrently.

In the timing recovery processing (step S171 to step S180), at first the quartering section 74 quarters the quadruple clock SK4, and outputs the free symbol clock SK1 to the amplitude subtracting type of phase detector 71 and to the clock generating section 73 (step S171). Then the in-phase amplitude deviation computing section 81a of the amplitude subtracting type of phase detector 71 computes the in-phase amplitude deviation $|I_k-I_{k-2}|$, while the orthogonal amplitude deviation computing section 81b computes the orthogonal amplitude component deviation $|Q_k-Q_{k-2}|$ (step S172). Further, the synthesized amplitude deviation computing section 82 computes the synthesized amplitude deviation $\beta 3_k$ by adding the in-phase amplitude deviation $|I_k-I_{k-2}|$ to the orthogonal amplitude component deviation $|Q_k-Q_{k-2}|$ (step S173).

On the other hand, the signal shift amount computing sections 86a, 86b compute the in-phase amplitude symbol time deviation $\delta I_k$ and orthogonal amplitude symbol time deviation $\delta Q_k$, and output a result of computing to the shift determining section 87. The shift determining section 87 determines whether a signal shift has occurred in the baseband signal or not according to a result of computing (step S174). When a signal shift has not occurred in the baseband signal (step S174, negative), the inverting section 88 inputs the free symbol clock SK1 in an inverted form to the multipliers 84a, 84b, and when a signal shift has occurred in the baseband signal (step S174, affirmative), the inverting section 88 does not invert the free symbol clock SK1 and outputs the free symbol clock SK1 as it is to the multipliers 84a, 84b.

Then the multipliers 84a, 84b compute the data arrays $dC_k$ and $dS_k$ each having a timing error of a symbol frequency included in the synthesized amplitude deviation $\beta 3_k$ as a free symbol clock SK1, and outputs the computed data arrays $dC_k$ and $dS_k$ to the averaging section 72 (step S176).

The averaging section 72 computes average values M[$dC_k$] and M[$dS_k$], and outputs these average values M[$dC_k$] and M[$dS_k$] to the clock generating section 73 (step S177). The timing phase difference computing section in the clock generating section 73 computes a timing difference $\Delta\theta$ from the average values M[$dC_k$] and [$dS_k$] (step S178). The phase shifting section 92 phase-shifts the free symbol clock SK1 according to the timing difference $\Delta\theta$ and outputs the free symbol clock SK1 as a recovered symbol clock RC to the Nyquist data extracting section 63 as well as to the decoder 4 (step S180). Then the same processing described above is repeated.

On the other hand, in parallel to the timing recovery processing (step S171 to step S180), the data determination processing (step S181 to step 185) is executed. Namely, the Nyquist data extracting section 63 extracts the data arrays $I_j$, $Q_j$ at the Nyquist points having been subjected to interpolation processing according to the in-phase amplitude component data array $I_k$ and the orthogonal amplitude component data array $Q_k$ as well as to the recovered symbol clock RC (step S181), while the offset detector 64 outputs a DC offset component IDa for an in-phase component and a DC offset component QDa of an orthogonal component to the offset correcting section 65 (step S182). The offset correcting section 65 corrects the DC offsets of the data arrays $I_j$, $Q_j$ at the Nyquist points by subtracting the DC offset components IDa and QDa respectively detected by the offset detector 64 from the data arrays $I_j$, $Q_j$ at the Nyquist points and outputs the corrected data to the data determining section 66 (step S183). Further, the data determining section 66 determines data arrays with the DC offset corrected by the offset correcting section 65 therein (step S184) and outputs the corrected data as demodulated data DA to the decoder 4 (step S185). Then the same processing described above is repeated.

The possibility of not occurring of a signal shift in one symbol is only in a data section, namely only when receiving a random pattern, so that the shift determination processing described above may be executed only when receiving a random pattern.

With the Embodiment 6 of the present invention described above, in addition to the effects provided in Embodiment 4, the amplitude subtracting type of phase detector 71 outputs the inverted data arrays $dC_k$ and $dS_k$ to the averaging section when the phase inversion phenomenon occurs, so that phase jitter when receiving a random pattern can further be reduced, and demodulation processing can be realized in which degradation of BER due to a timing error is further reduced.

As explained above in the present invention, the in-phase amplitude deviation computing unit computes in-phase amplitude deviation which is an absolute value of a value obtained when the in-phase amplitude components at $1/n$ (where n is a natural number greater than 1) of a symbol duration of a baseband signal are subtracted from each other; the orthogonal amplitude deviation computing unit computes orthogonal amplitude deviation which is an absolute value of a value obtained when the orthogonal amplitude components at $1/n$ (where n is a natural number greater than 1) of a symbol duration of a baseband signal are subtracted from each other; and the synthesized amplitude deviation computing unit computes a synthesized amplitude deviation obtained by adding the in-phase amplitude deviation and the orthogonal amplitude deviation; and a timing phase of the baseband signal is detected according to the synthesized amplitude deviation. Therefore, timing phase can be detected with simple configuration and synthesized amplitude deviation can be calculated with simple addition or subtraction between an in-phase amplitude component and an orthogonal amplitude component. The result is that high speed processing and size and weight reduction of a mechanism for detecting phase can be realized.

In the present invention, the phase detecting unit outputs a phase detection signal indicating advance or delay in the timing phase of the baseband signal from a difference of a synthesized amplitude deviation at ½ of a symbol duration, which synthesized amplitude deviation is obtained by adding an in-phase amplitude deviation which is an absolute value of a value obtained when the in-phase amplitude components at ½ of a symbol duration of a baseband signal sampled at a sampling clock that is two times faster than a symbol rate are subtracted from each other to an orthogonal amplitude deviation which is an absolute value of a value obtained when the orthogonal amplitude components at ½ of a symbol duration of the baseband signal are subtracted from each other; the averaging unit outputs an average value of phase detection signals outputted from the phase detecting unit as a phase control signal; the phase control unit provides phase control over the sampling clock according to the phase control signal outputted from the averaging unit; and the dichotomizing unit dichotomizes the sampling clock having been subjected to phase control by the phase control unit and outputs this dichotomized clock as a recovered symbol clock. Therefore, regardless of whether a DC offset is present in a baseband signal or an amplitude of a baseband signal is limited or not, rapid timing phase synchronization when receiving a preamble and low phase jitter when receiving a random pattern in a data section can be realized. A synthesized amplitude deviation can be obtained with simple addition or subtraction, so that it is possible to minimize a circuit scale and further promote downsizing. Further, a delay time within a PLL feedback group can be made smaller which enables high speed processing. Further, the phase detecting unit operates by using information on in-phase and orthogonal amplitudes of a baseband signal sampled β (t) a rate two times higher than the symbol rate, so that a operating speed two times higher than the symbol rate can be realized and the phase detecting unit can easily be applied to a high speed radio communication system for multimedia with the symbol rate of several tens MHz or more.

In the present invention, the quartering unit quarters a free sampling clock which is four times faster than a symbol rate and outputs this quartered clock as a free symbol clock; the phase detecting unit a) obtains a synthesized amplitude deviation by adding an in-phase amplitude deviation which is an absolute value of a value obtained when the in-phase amplitude components at $1/n$ (where n is equal to 2 or 4) of a symbol duration of a baseband signal sampled at the free symbol clock are subtracted from each other to an orthogonal amplitude deviation which is an absolute value of a value obtained when the orthogonal amplitude components at $1/n$ (where n is equal to 2 or 4) of a symbol duration of a baseband signal are subtracted from each other, b) obtains a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and c) outputs the cosine multiplication signal and the sine multiplication signal as a phase detection signal indicating advance or delay in the timing phase of the baseband signal; the averaging unit outputs a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by the phase detecting unit; and the clock generating unit computes a timing phase which is a inverse tangent of the cosine multiplication control signal and the sine multiplication control signal of the phase control signals outputted from the averaging unit, and generates a recovered symbol clock by phase-shifting the free symbol clock by the timing phase. Therefore, regardless of whether a DC offset is present in a baseband signal or not or whether the amplitude of the baseband signal is limited or not, rapid timing phase synchronization when receiving a preamble and low phase jitter when receiving a random pattern can be realized. As the synthesized amplitude deviation can be obtained with simple addition and subtraction, so that a circuit scale can be made smaller and downsizing of the device can be promoted. Further, delay time within a PLL feedback loop can be reduced, which enables high speed processing. Further, a recovered symbol clock is generated with a feed forward, so that regardless of the value of the initial timing phase, a time required for timing phase synchronization is decided according to a time constant or the like of a filter in the averaging unit, which enables a stable timing phase synchronization operation.

In the present invention, the sampling unit samples a baseband signal with a sampling clock which is two times faster than a symbol rate; the phase detecting unit outputs a phase detection signal indicating advance or delay in the timing phase of the baseband signal from a difference of a synthesized amplitude deviation at ½ of a symbol duration, which synthesized amplitude deviation is obtained by adding an in-phase amplitude deviation which is an absolute value of a value obtained when the in-phase amplitude components at ½ of a symbol duration of the baseband signal are subtracted from each other to an orthogonal amplitude deviation which is an absolute value of a value obtained when the orthogonal amplitude components at ½ of a symbol duration of the baseband signal are subtracted from each other; an averaging unit outputs an average value of phase detection signals outputted from the phase detecting unit as a phase control signal; the phase control unit provides phase controls over a sampling clock used by the sampling unit according to the phase control signal outputted from the averaging unit; the dichotomizing unit dichotomizes the sampling clock phase-controlled by the phase control unit and outputs the dichotomized clock as a recovered symbol clock; the Nyquist point data extracting unit extracts Nyquist point data for the baseband signal sampled by the sampling unit using the recovered symbol clock; the offset detecting unit averages the Nyquist point data extracted by the Nyquist point data extracting unit and detects a DC offset from the average data; the correcting unit corrects the Nyquist point data by subtracting the DC offset detected in the offset detecting unit from the Nyquist point data extracted in the Nyquist point data extracting unit; and the determining unit determines data for the baseband signal according to the Nyquist point data corrected by the correcting unit. Therefore, regardless of whether a DC offset is present in a baseband signal or the amplitude of the baseband signal is limited or not, rapid timing phase synchronization when receiving a preamble and low phase jitter when receiving a random pattern in a data section can be realized and degradation of BER can also be reduced. As a synthesized amplitude deviation can be obtained with simple addition and subtraction, the circuit scale can be made smaller and downsizing of the device can be promoted. Further, as a delay time within a PLL feedback loop can be reduced, high speed processing becomes possible. Further, as the device operates using information on in-phase and orthogonal amplitudes of a baseband signal sampled at a rate two times higher than a symbol rate, so that operation speed two times faster than the symbol rate can be realized. Further, the demodulator according to the present invention can easily be applied to a high speed radio communication system for multimedia with the symbol rate of several tens MHz or more. Further, the processing for timing phase synchronization and processing for removing DC offset are concurrently executed in the demodulator, so that even when a DC of fset is present in the baseband signal, time required until demodulation is correctly executed can be shortened, and as a result the transmission efficiency can be improved.

In the present invention, the free clock unit generates a free sampling clock which is four times faster than a symbol rate; the quartering unit quarters the free sampling clock generated by the free clock unit and outputs the quartered clock as a free symbol clock; the sampling unit samples a baseband signal with the free sampling clock generated by the free clock unit; the phase detecting unit a) obtains a synthesized amplitude deviation by adding an in-phase amplitude deviation which is an absolute value of a value obtained when the in-phase amplitude components at 1/n (where n is equal to 2 or 4) of a symbol duration of a baseband signal sampled at the free symbol clock are subtracted from each other to an orthogonal amplitude deviation which is an absolute value of a value obtained when the orthogonal amplitude components at 1/n (where n is equal to 2 or 4) of a symbol duration of a baseband signal are subtracted from each other, b) obtains a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and c) outputs the cosine multiplication signal and the sine multiplication signal as a phase detection signal indicating advance or delay in the timing phase of the baseband signal; the averaging unit outputs a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by the phase detecting unit; the clock generating unit computes a timing phase which is a inverse tangent of the cosine multiplication control signal and the sine multiplication control signal of the phase control signals outputted from the averaging unit, and generates a recovered symbol clock by phase-shifting the free symbol clock by the timing phase; the Nyquist point data extracting unit extracts Nyquist point data for the baseband signal sampled by the sampling unit using the recovered symbol clock; the offset detecting unit averages the Nyquist point data extracted by the Nyquist point data extracting unit and detects a DC offset from the average data; the correcting unit corrects the Nyquist point data by subtracting the DC offset detected in the offset detecting unit from the Nyquist point data extracted in the Nyquist point data extracting unit; and the determining unit determines data for the baseband signal according to the Nyquist point data corrected by the correcting unit. Therefore, regardless of whether a DC offset is present in a baseband signal or the amplitude of the baseband signal is limited or not, rapid timing phase synchronization when receiving a preamble and low phase jitter when receiving a random pattern in a data section can be realized and degradation of BER can be reduced. As a synthesized amplitude deviation can be obtained with simple addition and subtraction, the circuit scale can be made smaller and downsizing of the device can be promoted. Further, as a delay time within a PLL feedback loop can be reduced, high speed processing becomes possible. Further, as the device operates using information on in-phase and orthogonal amplitudes of a baseband signal sampled at a rate two times higher than a symbol rate, so that operation speed two times faster than the symbol rate can be realized. Further, the demodulator according to the present invention can easily be applied to a high speed radio communication system for multimedia with the symbol rate of several tens MHz or more. Further, the processing for synchronizing a timing phase and processing for removing DC offset are concurrently executed in the demodulator, so that even when a DC offset is present in the baseband signal, time required until demodulation is correctly executed can be shortened, and as a result the transmission efficiency can be improved.

The phase detecting device, a timing recovery device, a demodulator, a receiver, a phase detecting method, a timing recovery method, a demodulating method, and a receiving method using the same are useful in various types of digital communications such as satellite communications, mobile communications, and are suited to a phase detecting device, a timing recovery device, a demodulator, and a receiver using the same each capable of realizing rapid timing phase synchronization in receiving a preamble and low phase jitter in receiving a random pattern and also capable of promoting downsizing of the whole device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A phase detector comprising:

an in-phase amplitude deviation computing unit for computing in-phase amplitude deviation which is an absolute value of a value obtained when the in-phase amplitude components at 1/n (where n is a natural number greater than 1) of a symbol duration of a baseband signal are subtracted from each other;

an orthogonal amplitude deviation computing unit for computing orthogonal amplitude deviation which is an absolute value of a value obtained when the orthogonal amplitude components at 1/n (where n is a natural number greater than 1) of a symbol duration of a baseband signal are subtracted from each other; and a synthesized amplitude deviation computing unit for computing a synthesized amplitude deviation obtained by adding the in-phase amplitude deviation and the orthogonal amplitude deviation; wherein a timing phase of the baseband signal is detected according to the synthesized amplitude deviation.

2. The phase detector according to claim 1 further comprising:

a difference computing unit for computing a difference between the synthesized amplitude deviations at ½ symbol time; wherein a phase detection signal indicating detection of advance or delay in the timing phase of the baseband signal is outputted according to the difference value.

3. The phase detector according to claim 1; wherein said synthesized amplitude deviation computing unit outputs a value obtained by adding a square of the in-phase amplitude deviation to a square of the orthogonal amplitude deviation as the synthesized amplitude deviation.

4. The phase detector according to claim 1; wherein said synthesized amplitude deviation computing unit outputs a square root of a value obtained by adding a square of the in-phase amplitude deviation to the orthogonal amplitude deviation as the synthesized amplitude deviation.

5. The phase detector according to claim 1 further comprising:

a first weightage unit for computing an in-phase amplitude symbol time deviation which is an absolute value of a value obtained when the in-phase amplitude components at symbol cycle time of a baseband signal are subtracted from each other, and providing a weightage to the in-phase amplitude deviation using the computed in-phase amplitude symbol time deviation; and a second weightage unit for computing an orthogonal amplitude symbol time deviation which is an absolute value of a value obtained when the orthogonal amplitude components at symbol cycle time of a baseband signal are subtracted from each other, and providing a weightage to the orthogonal amplitude deviation using the computed orthogonal amplitude symbol time deviation.

6. The phase detector according to claim 2 further comprising:

a first signal shift amount computing unit for computing an in-phase amplitude symbol time deviation which is an absolute value of a value obtained when the in-phase amplitude components at symbol cycle time of a baseband signal are subtracted from each other;

a second signal shift amount computing unit for computing an orthogonal amplitude symbol time deviation which is an absolute value of a value obtained when the orthogonal amplitude components at symbol cycle time of a baseband signal are subtracted from each other;

a shift determining unit for determining whether the in-phase amplitude symbol time deviation and the orthogonal amplitude symbol time deviation have a value which is less than a specified value or not; and an inverting unit for inverting the phase detection signal when it is determined by said shift determining unit that the in-phase amplitude symbol time deviation and the orthogonal amplitude symbol time deviation have a value which is less than the specified value and outputting this inverted phase detection signal.

7. The phase detector according to claim 1 further comprising:

a first multiplying unit for generating a cosine multiplication signal by multiplying the synthesized amplitude deviation by cosine of the free symbol frequency signal;

a second multiplying unit for generating a sine multiplication signal by multiplying the synthesized amplitude deviation by sine of the free symbol frequency signal; and a timing difference computing unit for computing a inverse tangent of the sine multiplication signal against the cosine multiplication signal and outputting the inverse tangent as a timing phase for the free symbol frequency signal against the baseband signal.

8. A timing recovery device comprising:

a phase detecting unit for outputting a phase detection signal indicating advance or delay in the timing phase of the baseband signal from a difference of a synthesized amplitude deviation at ½ of a symbol time, which synthesized amplitude deviation is obtained by adding an in-phase amplitude deviation which is an absolute value of a value obtained when the in-phase amplitude components at ½ of a symbol duration of a baseband signal sampled at a sampling clock that is two times faster than a symbol rate are subtracted from each other to an orthogonal amplitude deviation which is an absolute value of a value obtained when the orthogonal amplitude components at ½ of a symbol duration of the baseband signal are subtracted from each other;

an averaging unit for outputting an average value of phase detection signals outputted from said phase detecting unit as a phase control signal;

a phase control unit for providing phase control over the sampling clock according to the phase control signal outputted from said averaging unit; and a dichotomizing unit for dichotomizing the sampling clock having been subjected to phase control by said phase control unit and outputting this dichotomized clock as a recovered symbol clock.

9. The timing recovery device according to claim 8; wherein said phase detecting unit computes a value obtained by adding a square of the in-phase amplitude deviation to a square of the orthogonal amplitude deviation as the synthesized amplitude deviation.

10. The timing recovery device according to claim 8; wherein said phase detecting unit computes a square root of a value obtained by adding a square of the in-phase amplitude deviation to a square of the orthogonal amplitude deviation as the synthesized amplitude deviation.

11. The timing recovery device according to claim 8; wherein said phase detecting unit further comprises:

a first weightage unit for computing an in-phase amplitude symbol time deviation which is an absolute value of a value obtained when the in-phase amplitude components at symbol cycle time of a baseband signal are subtracted from each other, and providing a weightage to the in-phase amplitude deviation using the computed in-phase amplitude symbol time deviation; and a second weightage unit for computing an orthogonal amplitude symbol time deviation which is an absolute value of a value obtained when the orthogonal amplitude components at symbol cycle time of a baseband signal are subtracted from each other, and providing a weightage to the orthogonal amplitude deviation using the computed orthogonal amplitude symbol time deviation.

12. A timing recovery device comprising:

a quartering unit for quartering a free sampling clock which is four times faster than a symbol rate and outputting this quartered clock as a free symbol clock;

a phase detecting unit for
  a) obtaining a synthesized amplitude deviation by adding an in-phase amplitude deviation which is an absolute value of a value obtained when the in-phase amplitude components at 1/n (where n is equal to 2 or 4) of a symbol duration of a baseband signal sampled at the free symbol clock are subtracted from each other to an orthogonal amplitude deviation which is an absolute value of a value obtained when the orthogonal amplitude components at 1/n (where n is equal to 2 or 4) of a symbol duration of a baseband signal are subtracted from each other,
  b) obtaining a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and
  c) outputting the cosine multiplication signal and the sine multiplication signal as a phase detection signal indicating advance or delay in the timing phase of the baseband signal;

an averaging unit for outputting a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by said phase detecting unit; and a clock generating unit for computing a timing phase which is a inverse tangent of the cosine multiplication control signal and the sine multiplication control signal of the phase control signals outputted from said averaging unit, and generating a recovered symbol clock by phase-shifting the free symbol clock by the timing phase.

13. The timing recovery device according to claim 12; wherein said phase detecting unit computes a value obtained by adding a square of the in-phase amplitude deviation to a square of the orthogonal amplitude deviation as the synthesized amplitude deviation.

14. The timing recovery device according to claim 12; wherein said phase detecting unit computes a square root of a value obtained by adding a square of the in-phase amplitude deviation to a square of the orthogonal amplitude deviation as the synthesized amplitude deviation.

15. The timing recovery device according to claim 12; wherein said phase detecting unit comprises:

a first weightage unit for computing an in-phase amplitude symbol time deviation which is an absolute value of a value obtained when the in-phase amplitude components at symbol cycle time of a baseband signal are subtracted from each other, and providing a weightage to the in-phase amplitude deviation using the computed in-phase amplitude symbol time deviation; and a second weightage unit for computing an orthogonal amplitude symbol time deviation which is an absolute value of a value obtained when the orthogonal amplitude components at symbol cycle time of a baseband signal are subtracted from each other, and providing a weightage to the orthogonal amplitude deviation using the computed orthogonal amplitude symbol time deviation.

16. A demodulator comprising:

a sampling unit for sampling a baseband signal with a sampling clock which is two times faster than a symbol rate;

a phase detecting unit for outputting a phase detection signal indicating advance or delay in the timing phase of the baseband signal from a difference of a synthesized amplitude deviation at ½ of a symbol duration, which synthesized amplitude deviation is obtained by adding an in-phase amplitude deviation which is an absolute value of a value obtained when the in-phase amplitude components at ½ of a symbol duration of the baseband signal are subtracted from each other to an orthogonal amplitude deviation which is an absolute value of a value obtained when the orthogonal amplitude components at ½ of a symbol duration of the baseband signal are subtracted from each other;

an averaging unit for outputting an average value of phase detection signals outputted from said phase detecting unit as a phase control signal;

a phase control unit for providing phase controls over a sampling clock used by said sampling unit according to the phase control signal outputted from said averaging unit;

a dichotomizing unit for dichotomizing the sampling clock phase-controlled by said phase control unit and outputting the dichotomized clock as a recovered symbol clock;

a Nyquist point data extracting unit for extracting Nyquist point data for the baseband signal sampled by said sampling unit using the recovered symbol clock;

an offset detecting unit for averaging the Nyquist point data extracted by said Nyquist point data extracting unit and detecting a DC offset from the average data;

a correcting unit for correcting the Nyquist point data by subtracting the DC offset detected in said offset detecting unit from the Nyquist point data extracted in said Nyquist point data extracting unit; and a determining unit for determining data for the baseband signal according to the Nyquist point data corrected by said correcting unit.

17. A demodulator comprising:

a free clock unit for generating a free sampling clock which is four times faster than a symbol rate;

a quartering unit for quartering the free sampling clock generated by the free clock unit and outputting the quartered clock as a free symbol clock;

a sampling unit for sampling a baseband signal with the free sampling clock generated by said free clock unit;

a phase detecting unit for
- a) obtaining a synthesized amplitude deviation by adding an in-phase amplitude deviation which is an absolute value of a value obtained when the in-phase amplitude components at 1/n (where n is equal to 2 or 4) of a symbol duration of a baseband signal sampled at the free symbol clock are subtracted from each other to an orthogonal amplitude deviation which is an absolute value of a value obtained when the orthogonal amplitude components at 1/n (where n is equal to 2 or 4) of a symbol duration of a baseband signal are subtracted from each other,
- b) obtaining a cosine multiplication signal by multiplying the synthesized amplitude deviation by cosine of a frequency component of the free symbol clock and a sine multiplication signal by multiplying the synthesized amplitude deviation by sine of a frequency component of the free symbol clock, and
- c) outputting the cosine multiplication signal and the sine multiplication signal as a phase detection signal indicating advance or delay in the timing phase of the baseband signal;

an averaging unit for outputting a cosine multiplication control signal and a sine multiplication control signal as a phase control signal, which cosine multiplication control signal is the average of the cosine multiplication signal and which sine multiplication control signal is the average of the sine multiplication signal in the phase detection signal outputted by said phase detecting unit;

a clock generating unit for computing a timing phase which is a inverse tangent of the cosine multiplication control signal and the sine multiplication control signal of the phase control signals outputted from said averaging unit, and generating a recovered symbol clock by phase-shifting the free symbol clock by the timing phase;

a Nyquist point data extracting unit for extracting Nyquist point data for the baseband signal sampled by said sampling unit using the recovered symbol clock;

an offset detecting unit for averaging the Nyquist point data extracted by said Nyquist point data extracting unit and detecting a DC offset from the average data;

a correcting unit for correcting the Nyquist point data by subtracting the DC offset detected in said offset detecting unit from the Nyquist point data extracted in said Nyquist point data extracting unit; and a determining unit for determining data for the baseband signal according to the Nyquist point data corrected by said correcting unit.

\* \* \* \* \*